(12) United States Patent
Nishiura et al.

(10) Patent No.: US 9,834,683 B2
(45) Date of Patent: Dec. 5, 2017

(54) COMPOUND HAVING AZO SKELETON STRUCTURE, PIGMENT DISPERSANT, PIGMENT COMPOSITION, PIGMENT DISPERSION, AND TONER

(71) Applicant: CANON KABUSHIKI KAISHA, Tokyo (JP)

(72) Inventors: Chiaki Nishiura, Pittsburgh, PA (US); Yuki Tsujii, Tokyo (JP); Yasuaki Murai, Kawasaki (JP); Takayuki Toyoda, Yokohama (JP); Waka Hasegawa, Tokyo (JP); Masanori Seki, Yokohama (JP); Masashi Kawamura, Yokohama (JP); Masashi Hirose, Machida (JP); Ayano Mashida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/914,588

(22) PCT Filed: Aug. 27, 2014

(86) PCT No.: PCT/JP2014/073115
§ 371 (c)(1),
(2) Date: Feb. 25, 2016

(87) PCT Pub. No.: WO2015/030260
PCT Pub. Date: Mar. 5, 2015

(65) Prior Publication Data
US 2016/0208105 A1 Jul. 21, 2016

(30) Foreign Application Priority Data
Aug. 29, 2013 (JP) ................. 2013-178556

(51) Int. Cl.
| | | |
|---|---|---|
| G03G 9/09 | (2006.01) |
| C09B 67/46 | (2006.01) |
| C08F 8/30 | (2006.01) |
| C09B 67/22 | (2006.01) |
| C09B 69/10 | (2006.01) |
| G03G 9/087 | (2006.01) |
| C09D 11/037 | (2014.01) |
| C09D 11/106 | (2014.01) |
| C08F 212/08 | (2006.01) |
| C08F 8/14 | (2006.01) |

(52) U.S. Cl.
CPC .............. *C09B 67/009* (2013.01); *C08F 8/14* (2013.01); *C08F 8/30* (2013.01); *C08F 212/08* (2013.01); *C09B 67/0041* (2013.01); *C09B 67/0046* (2013.01); *C09B 69/106* (2013.01); *C09D 11/037* (2013.01); *C09D 11/106* (2013.01); *G03G 9/08788* (2013.01); *G03G 9/08791* (2013.01); *G03G 9/08795* (2013.01); *G03G 9/091* (2013.01); *G03G 9/0914* (2013.01); *G03G 9/0924* (2013.01); *C08F 2438/01* (2013.01); *C08F 2810/50* (2013.01)

(58) Field of Classification Search
CPC .... G03G 9/0924; G03G 9/091; C09B 67/009; C09B 69/106
See application file for complete search history.

(56) References Cited

U.S. PATENT DOCUMENTS

2015/0274853 A1* 10/2015 Nishiura .............. G03G 9/0924
430/108.22

FOREIGN PATENT DOCUMENTS

| JP | 03-113462 A | 5/1991 |
| JP | 6-148927 A | 5/1994 |
| JP | 2006-30760 A | 2/2006 |
| JP | 2009-501251 A | 1/2009 |
| JP | 2011-257707 A | 12/2011 |
| JP | 2012-067285 A | 4/2012 |
| JP | 2012-517487 A | 8/2012 |

* cited by examiner

*Primary Examiner* — Christopher Rodee
(74) *Attorney, Agent, or Firm* — Canon U.S.A., Inc. IP Division

(57) ABSTRACT

The present invention provides a compound and a pigment dispersant, each of which improves the dispersibility of various types of pigments in a non-aqueous solvent and also provides a pigment composition, a pigment dispersion, and a toner, each of which has a preferable coloring power. The compound includes a polymer which has a monomer unit having a specific structure and also includes a specific partial structure.

14 Claims, 3 Drawing Sheets

COMPOUND HAVING AZO SKELETON STRUCTURE, PIGMENT DISPERSANT, PIGMENT COMPOSITION, PIGMENT DISPERSION, AND TONER

TECHNICAL FIELD

The present invention relates to a compound having an azo skeleton structure, a pigment dispersant containing the above compound, a pigment composition containing the pigment dispersant, a pigment dispersion containing the pigment composition, and a toner.

BACKGROUND ART

In a pigment having a fine particle diameter, since an aggregation force between pigment particles tends to be high, the pigment is liable to be insufficiently dispersed in a medium, such as an organic solvent or a molten resin. When the dispersibility of the pigment is insufficient, and the pigment is in an aggregated state, the coloring power thereof is liable to degrade.

In order to improve the dispersibility of pigment, various pigment dispersants and various pigment compositions each containing a pigment dispersant have been proposed.

For example, in order to improve the dispersibility of a yellow pigment in toner, a toner containing a polymer compound having a pyridone azo skeleton, a yellow pigment, and a binder resin has been proposed (PTL 1).

In addition, in order to improve the dispersibility of an azo pigment, an azo compound including a styrene/acrylic-based high molecular portion has also been proposed (PTL 2).

In addition, in order to improve the dispersibility of carbon black in toner, a technique in which a block copolymer or a graft copolymer, each of which is formed by polymerizing a styrene-based monomer and an acrylic acid ester-based monomer, is contained in a toner has been proposed (PTL 3).

In addition, a method has been proposed in which by the use of a specific high molecular dispersant and a magenta pigment in combination, the dispersibility thereof is enhanced, and coloring properties and charging properties of a toner are improved (PTL 4).

Furthermore, in order to disperse a phthalocyanine pigment in toner, a toner has been proposed which contains a polymer including sodium styrene sulfonate as a monomer unit, a phthalocyanine pigment, and a binder resin (PTL 5).

CITATION LIST

Patent Literature

PTL 1 Japanese Patent Laid-Open No. 2011-257707
PTL 2 Japanese Patent Laid-Open No. 6-148927
PTL 3 Japanese Patent Laid-Open No. 2012-067285
PTL 4 Japanese Patent Laid-Open No. 2006-30760
PTL 5 Japanese Patent Laid-Open No. 03-113462

SUMMARY OF INVENTION

However, although the pigment dispersant disclosed in each of PTLs 1, 2, 4, and 5 has a good dispersion effect on specific pigments, those specific pigments are limited, and a dispersant having a sufficient effect on various types of pigments has not been obtained. In addition, although the azo pigment disclosed in PTL 3 has an effect of improving the dispersibility of many types of pigments to some extent, in order to satisfy a recent requirement for further improvement in output image quality, further improvement in dispersibility of pigment has been desired.

Hence, the present invention provides a compound and a pigment dispersant, each of which is able to improve the dispersibility of pigments of various colors, such as yellow, magenta, cyan, and black colors, in a non-aqueous solvent. In addition, the present invention also provides a pigment composition, a pigment dispersion, and a toner, each of which has a good coloring power.

To those ends, the present invention was made as described below. That is, according to a first aspect of the present invention, there is provided a compound including a partial structure represented by the following formula (1) and a polymer which has monomer units each represented by the following formula (2).

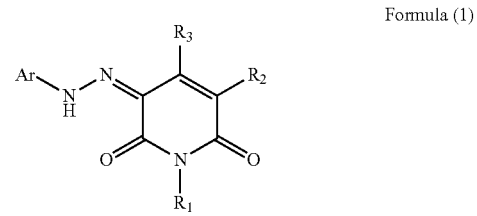

Formula (1)

[In the formula (1),

Ar represents an aryl group,

Ar and $R_1$ to $R_3$ satisfy at least one of the following conditions (i) and (ii):

(i) Ar has a linking group which is bonded to a carbon atom in the aryl group and is constituting a bonding moiety with the polymer; and (ii) at least one of $R_1$ to $R_3$ has a linking group constituting a bonding moiety with the polymer.

When $R_1$ has not the linking group, $R_1$ represents a hydrogen atom, an amino group, an alkyl group, a phenyl group, or an aralkyl group, when $R_2$ has not the linking group, $R_2$ represents a hydrogen atom, a sulfonic acid group, a $CONR_4R_5$ group, or a $COOR_6$ group, when $R_3$ has not the linking group, $R_3$ represents an alkyl group, a phenyl group, a hydroxyl group, a $NR_7R_8$ group, a $CONR_9R_{10}$ group, a $COOR_{11}$ group, a $CH_2COOR_{12}$ group, or a $C_2H_4COOR_{13}$ group, $R_4$, $R_5$, and $R_7$ to $R_{10}$ each independently represent a hydrogen atom, an alkyl group, a phenyl group, or an aralkyl group, and $R_6$ and $R_{11}$ to $R_{13}$ each independently represent a hydrogen atom, an alkyl group, a phenyl group, an aralkyl group, or a cation forming a salt with a carboxylic acid anion.]

Formula (2)

[In the formula (2), $R_{14}$ represents a hydrogen atom or an alkyl group, and $R_{15}$ represents a phenyl group, a carboxyl group, a carboxylic acid ester group, or a carboxylic acid amide group.]

In addition, a second aspect of the present invention relates to a pigment dispersant containing the compound described above.

In addition, a third aspect of the present invention relates to a pigment composition containing the pigment dispersant described above and a pigment.

In addition, a fourth aspect of the present invention relates to a pigment dispersion containing the pigment composition described above and a non-aqueous solvent.

In addition, a fifth aspect of the present invention relates to a toner including toner particles which contain a binder resin and a colorant, and the colorant includes the pigment composition described above.

The compound and the pigment dispersant of the present invention are able to improve the dispersibility of individual color pigments, such as yellow, magenta, cyan, and black pigments, in a non-aqueous solvent. In addition, the pigment composition, the pigment dispersion, and the toner of the present invention are able to have an excellent coloring power.

DESCRIPTION OF EMBODIMENTS

Figure 1:
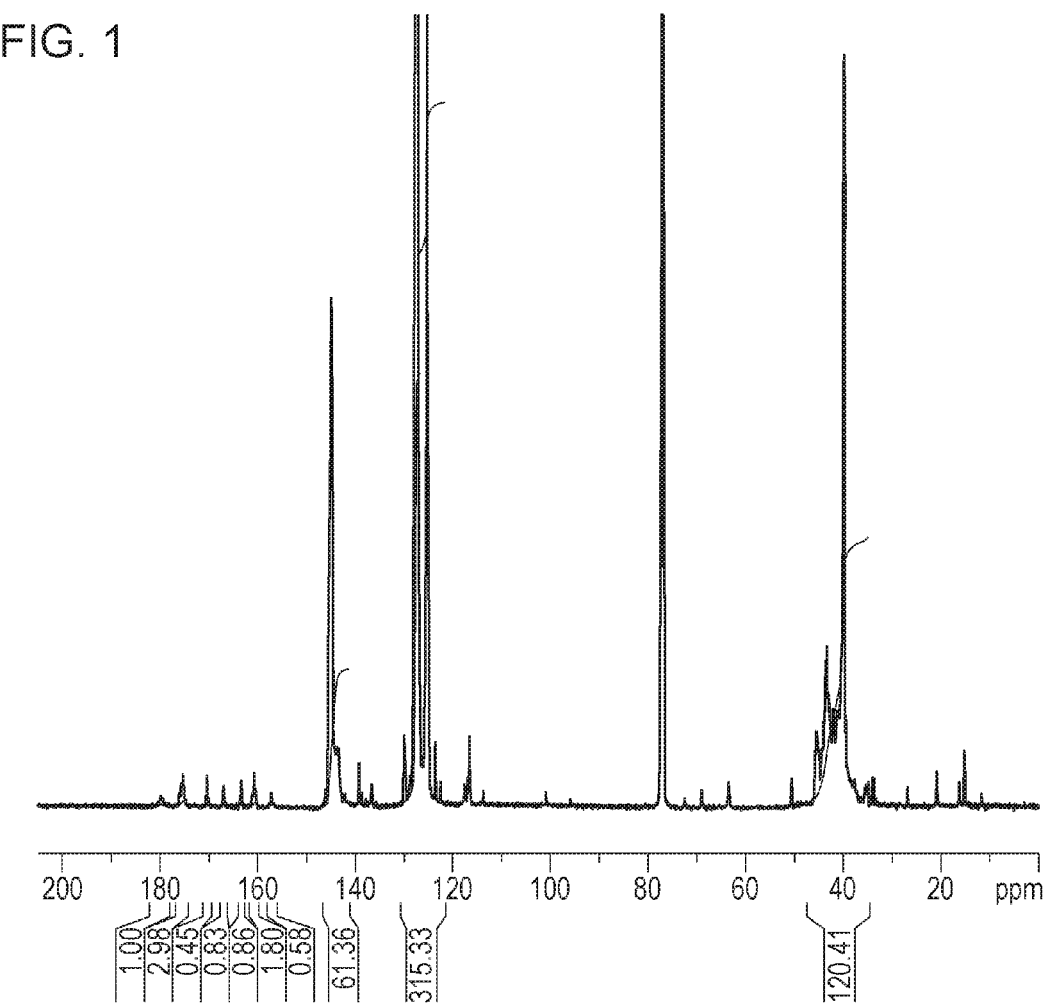
FIG. 1 is a view showing a $^{13}C$ NMR spectrum of a compound (101) of the present invention measured in $CDCl_3$ at room temperature and 150 MHz.

Hereinafter, the present invention will be described in detail with reference to preferable embodiments.

First, a compound of the present invention will be described.

The compound of the present invention is a compound including a partial structure represented by the following formula (1) and a polymer which has monomer units each represented by the following formula (2).

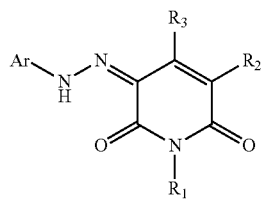

Formula (1)

[In the formula (1),
Ar represents an aryl group,
Ar and $R_1$ to $R_3$ satisfy at least one of the following conditions (i) and (ii):
  (i) Ar has a linking group which is bonded to a carbon atom in the aryl group and is constituting a bonding moiety with the polymer; and
  (ii) at least one of $R_1$ to $R_3$ has a linking group constituting a bonding moiety with the polymer.
When $R_1$ has not the linking group, $R_1$ represents a hydrogen atom, an amino group, an alkyl group, a phenyl group, or an aralkyl group, when $R_2$ has not the linking group, $R_2$ represents a hydrogen atom, a sulfonic acid group, a $CONR_4R_5$ group, or a $COOR_6$ group, when $R_3$ has not the linking group, $R_3$ represents an alkyl group, a phenyl group, a hydroxyl group, a $NR_7R_8$ group, a $CONR_9R_{10}$ group, a $COOR_{11}$ group, a $CH_2COOR_{12}$ group, or a $C_2H_4COOR_{13}$ group, $R_4$, $R_5$, and $R_7$ to $R_{10}$ each independently represent a hydrogen atom, an alkyl group, a phenyl group, or an aralkyl group, and $R_6$ and $R_{11}$ to $R_{13}$ each independently represent a hydrogen atom, an alkyl group, a phenyl group, an aralkyl group, or a cation forming a salt with a carboxylic acid anion.]

Formula (2)

[In the formula (2), $R_{14}$ represents a hydrogen atom or an alkyl group, and $R_{15}$ represents a phenyl group, a carboxyl group, a carboxylic acid ester group, or a carboxylic acid amide group.]

In addition, hereinafter, the partial structure represented by the above formula (1) may also be referred to as "azo skeleton structure" in some cases. In addition, the polymer having the monomer units each represented by the above formula (2) may also be referred to as "high molecular portion" in some cases. In addition, the compound including the polymer which has the monomer units each represented by the above formula (2) and the partial structure represented by the above formula (1) may also be referred to as "compound having an azo skeleton structure" in some cases. In addition, the linking group which is a part of the partial structure represented by the above formula (1) and which constitutes the bonding moiety with the polymer may be simply referred to as "linking group" in some cases.

Compound Having Azo Skeleton Structure

The compound having an azo skeleton structure represented by the above formula (1) will be described in detail.

The compound having an azo skeleton structure includes an azo skeleton structure which is represented by the above formula (1) and which has a high affinity to various pigments and a high molecular portion (polymer) having the monomer units which are each represented by the above formula (2) and which have a high affinity to a non-aqueous solvent.

Azo Skeleton Structure of Compound Having Azo Skeleton Structure

First, the azo skeleton structure will be described.

As the amino group represented by $R_1$ in the above formula (1), for example, there may be mentioned an amino group, a methyl amino group, an ethyl amino group, an N,N-dimethyl amino group, an N-ethyl-N-phenyl amino group, N,N-diphenyl amino group, an acetyl amino group, a benzoyl amino group, or a propionyl amino group.

As the alkyl group represented by $R_1$ in the above formula (1), for example, there may be mentioned a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group.

As the aralkyl group represented by $R_1$ in the above formula (1), for example, a benzyl group or a phenethyl group may be mentioned.

The amino group, the alkyl group, the phenyl group, and the aralkyl group represented by $R_1$ in the above formula (1) each may be further substituted by a substituent as long as the affinity to pigments is not considerably impaired. In this case, as the substituent which may be used, for example, an alkyl group, an alkoxy group, a halogen atom, a hydroxyl group, a cyano group, a trifluoromethyl group, a carboxyl group, a carboxylic acid ester group, or a carboxylic acid amide group may be mentioned.

Although $R_1$ in the above formula (1) may arbitrarily represent the linking group or one of the aforementioned hydrogen atom, amino group, alkyl group, phenyl group, and aralkyl group, in view of the affinity to pigments, $R_1$ preferably represents a hydrogen atom.

The sulfonic acid group represented by $R_2$ in the above formula (1) may be either a $SO_3H$ group or an ion pair formed from a sulfonate anion and a cation. As the cation, for example, an alkali metal ion or a quaternary ammonium ion may be mentioned. In addition, as the alkali metal ion, for example, a lithium ion, a sodium ion, or a potassium ion may be mentioned. In addition, as the quaternary ammonium ion, for example, a tetramethyl ammonium ion, a tetrabutyl ammonium ion, or a trimethyl stearyl ammonium ion may be mentioned.

As the alkyl group represented by $R_4$ and $R_5$ in the above formula (1), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_4$ and $R_5$ in the above formula (1), for example, a benzyl group or a phenethyl group may be mentioned.

The alkyl group, the phenyl group, and the aralkyl group represented by $R_4$ and $R_5$ in the above formula (1) each may be further substituted by a substituent as long as the affinity to pigments is not considerably impaired. In this case, as the substituent which may be used, for example, an alkyl group, an alkoxy group, a halogen atom, a hydroxyl group, a cyano group, a trifluoromethyl group, a carboxyl group, a carboxylic acid ester group, or a carboxylic acid amide group may be mentioned.

As the alkyl group represented by $R_6$ in the above formula (1), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_6$ in the above formula (1), for example, a benzyl group or a phenethyl group may be mentioned.

As the cation forming a salt with a carboxylic acid anion represented by $R_6$ in the above formula (1), for example, an alkali metal ion or a quaternary ammonium ion may be mentioned. As the alkali metal ion, for example, a lithium ion, a sodium ion, or a potassium ion may be mentioned. In addition, as the quaternary ammonium ion, for example, a tetramethyl ammonium ion, a tetrabutyl ammonium ion, or a trimethyl stearyl ammonium ion may be mentioned.

$R_2$ in the above formula (1) may arbitrarily represent the linking group or one of the aforementioned hydrogen atom, sulfonic acid group, $CONR_4R_5$ group, and $COOR_6$ group. Among those mentioned above, in view of the affinity to pigments, $R_2$ preferably represents a sulfonic acid group or a $CONR_4R_5$ group, and $R_4$ and $R_5$ in the $CONR_4R_5$ group each more preferably represent a hydrogen atom.

As the alkyl group represented by $R_3$ in the above formula (1), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the alkyl group represented by $R_7$ and $R_8$ in the above formula (1), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_7$ and $R_8$ in the above formula (1), for example, a benzyl group or a phenethyl group may be mentioned.

The alkyl group, the phenyl group, and the aralkyl group represented by $R_7$ and $R_8$ in the above formula (1) each may be further substituted by a substituent as long as the affinity to pigments is not considerably impaired. In this case, as the substituent which may be used, for example, an alkyl group, an alkoxy group, a halogen atom, a hydroxyl group, a cyano group, a trifluoromethyl group, a carboxyl group, a carboxylic acid ester group, or a carboxylic acid amide group may be mentioned.

As the alkyl group represented by $R_9$ and $R_{10}$ in the above formula (1), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_9$ and $R_{10}$ in the above formula (1), for example, a benzyl group or a phenethyl group may be mentioned.

The alkyl group, the phenyl group, and the aralkyl group represented by $R_9$ and $R_{10}$ in the above formula (1) each may be further substituted by a substituent as long as the affinity to pigments is not considerably impaired. In this case, as the substituent which may be used, for example, an alkyl group, an alkoxy group, a halogen atom, a hydroxyl group, a cyano group, a trifluoromethyl group, a carboxyl group, a carboxylic acid ester group, or a carboxylic acid amide group may be mentioned.

As the alkyl group represented by $R_{11}$ in the above formula (1), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_{11}$ in the above formula (1), for example, a benzyl group or a phenethyl group may be mentioned.

As the cation forming a salt with a carboxylic acid anion represented by $R_{11}$ in the above formula (1), for example, an alkali metal ion or a quaternary ammonium ion may be mentioned. As the alkali metal ion, for example, a lithium ion, a sodium ion, or a potassium ion may be mentioned. In addition, as the quaternary ammonium ion, for example, a tetramethyl ammonium ion, a tetrabutyl ammonium ion, or a trimethyl stearyl ammonium ion may be mentioned.

As the alkyl group represented by $R_{12}$ in the above formula (1), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_{12}$ in the above formula (1), for example, a benzyl group or a phenethyl group may be mentioned.

As the cation forming a salt with a carboxylic acid anion represented by $R_{12}$ in the above formula (1), for example, an alkali metal ion or a quaternary ammonium ion may be mentioned. As the alkali metal ion, for example, a lithium ion, a sodium ion, or a potassium ion may be mentioned. In addition, as the quaternary ammonium ion, for example, a tetramethyl ammonium ion, a tetrabutyl ammonium ion, or a trimethyl stearyl ammonium ion may be mentioned.

As the alkyl group represented by $R_{13}$ in the above formula (1), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_{13}$ in the above formula (1), for example, a benzyl group or a phenethyl group may be mentioned.

As the cation forming a salt with a carboxylic acid anion represented by $R_{13}$ in the above formula (1), for example, an alkali metal ion or a quaternary ammonium ion may be mentioned. As the alkali metal ion, for example, a lithium ion, a sodium ion, or a potassium ion may be mentioned. In addition, as the quaternary ammonium ion, for example, a tetramethyl ammonium ion, a tetrabutyl ammonium ion, or a trimethyl stearyl ammonium ion may be mentioned.

$R_3$ in the above formula (1) may arbitrarily represent a hydrogen atom, a substituent having a bonding moiety bonded to the polymer, or one of the aforementioned substituents. Among those mentioned above, in view of easy manufacturing, an alkyl group is preferable. In addition, in view of the affinity to pigments, an $NR_7R_8$ group or a $COOR_{11}$ group is preferable.

As the aryl group in Ar in the above formula (1), a phenyl group or a naphthyl group may be mentioned.

Ar in the above formula (1) may further have a substituent as long as the affinity to pigments is not considerably impaired. As this substituent for example, an alkyl group, a $COOR_{21}$ group, an $OR_{22}$ group, a $CONR_{23}R_{24}$ group, or the linking group may be mentioned. In this case, $R_{21}$ to $R_{24}$ each independently represent a hydrogen atom, an alkyl group, a phenyl group, or an aralkyl group. Among those mentioned above, in view of the affinity to pigments, Ar in the above formula (1) preferably has at least one linking group as the substituent, and it is more preferable that Ar in the above formula (1) has at least one linking group, and the other functional groups of Ar are all hydrogen atoms.

In view of easy manufacturing, among those mentioned above, Ar in the above formula (1) preferably represents a phenyl group. That is, the partial structure represented by the above formula (1) preferably indicates the structure represented by the following formula (3).

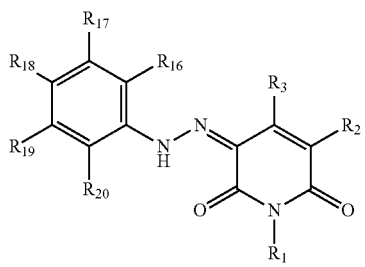

Formula (3)

[In the formula (3), $R_1$ to $R_3$ and $R_{16}$ to $R_{20}$ satisfy at least one of the following conditions (iii) and (iv):

(iii) at least one of $R_{16}$ to $R_{20}$ has a linking group constituting a bonding moiety with the polymer; and (iv) at least one of $R_1$ to $R_3$ has a linking group constituting a bonding moiety with the polymer.

When $R_1$ has not the linking group, $R_1$ represents a hydrogen atom, an amino group, an alkyl group, a phenyl group, or an aralkyl group, when $R_2$ has not the linking group, $R_2$ represents a hydrogen atom, a sulfonic acid group, a $CONR_4R_5$ group, or a $COOR_6$ group, when $R_3$ has not the linking group, $R_3$ represents an alkyl group, a phenyl group, a hydroxyl group, a $NR_7R_8$ group, a $CONR_9R_{10}$ group, a $COOR_{11}$ group, a $CH_2COOR_{12}$ group, or a $C_2H_4COOR_{13}$ group, $R_4$, $R_5$, and $R_7$ to $R_{10}$ each independently represent a hydrogen atom, an alkyl group, a phenyl group, or an aralkyl group, $R_6$ and $R_{11}$ to $R_{13}$ each independently represent a hydrogen atom, an alkyl group, a phenyl group, an aralkyl group, or a cation which forms a salt with a carboxylic acid anion, when $R_{16}$ to $R_{20}$ each has not the linking group, $R_{16}$ to $R_{20}$ each independently represent a hydrogen atom, an alkyl group, a $COOR_{21}$ group, an $OR_{22}$ group, or a $CONR_{23}R_{24}$ group, and $R_{21}$ to $R_{24}$ each independently represent a hydrogen atom, an alkyl group, a phenyl group, or an aralkyl group.]

In addition, $R_1$ to $R_3$ in the above formula (3) each indicate the same meaning as that of each of $R_1$ to $R_3$ in the above formula (1).

As the alkyl group represented by $R_{16}$ to $R_{24}$ in the above formula (3), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_{21}$ to $R_{24}$ in the above formula (3), for example, a benzyl group or a phenethyl group may be mentioned.

As the alkyl group represented by $R_{21}$ in the above formula (3), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_{21}$ in the above formula (3), for example, a benzyl group or a phenethyl group may be mentioned.

As the alkyl group represented by $R_{22}$ in the above formula (3), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_{22}$ in the above formula (3), for example, a benzyl group or a phenethyl group may be mentioned.

As the alkyl group represented by $R_{23}$ and $R_{24}$ in the above formula (3), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

As the aralkyl group represented by $R_{23}$ and $R_{24}$ in the above formula (3), for example, a benzyl group or a phenethyl group may be mentioned.

$R_6$ to $R_{20}$ in the above formula (3) may arbitrarily represent the linking group or one of the aforementioned hydrogen atom, alkyl group, $COOR_{21}$ group, $OR_{22}$ group, and $CONR_{23}R_{24}$ group. Among those mentioned above, in view of the affinity to pigments, at least one of $R_{16}$ to $R_{20}$ in the above formula (3) preferably represents the linking group, and the others each preferably represent a hydrogen atom.

In view of easy manufacturing, the partial structure represented by the above formula (3) is preferably bonded to the polymer at one or two positions.

In the compound having an azo skeleton structure, in view of the affinity to pigments and easy manufacturing, the linking group which is a part of the partial structure represented by the formula (1) and which constitutes the bonding moiety with the polymer preferably has a carboxylic acid ester bond or a carboxylic acid amide bond. In addition, when the polymer and the azo skeleton structure represented by the formula (1) or (3) are bonded to each other with a functional group, such as a carboxylic acid ester bond (—COO—), derived from the polymer, the bonding moiety including the functional group is referred to as the linking group.

In particular, as the linking group, for example, the following may be mentioned.

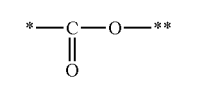 $L_1$

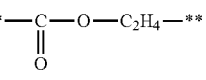 $L_2$

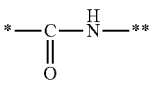 $L_3$

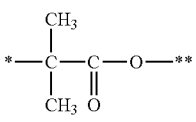 $L_4$

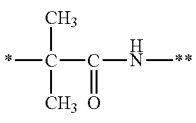 $L_5$

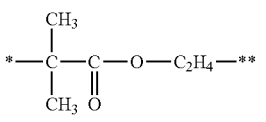 $L_6$

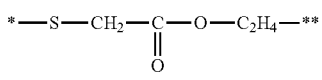 $L_7$

-continued

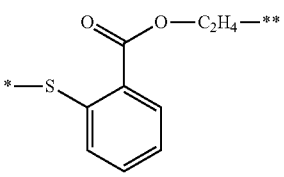 $L_8$

["*" in the above formulas $L_1$ to $L_8$ each represent a bonding position to a carbon atom in the high molecular portion having the monomer units each represented by the above formula (2). In addition, "**" in the above formulas $L_1$ to $L_9$ each represent a bonding position to a carbon atom in an aromatic ring of Ar of the partial structure represented by the above formula (1) or a bonding position to a carbon atom or a nitrogen atom in a heterocyclic ring including R; to $R_3$.]

High Molecular Portion of Compound Having Azo Skeleton Structure

Next, the high molecular portion having the monomer units each represented by the above formula (2) will be described.

As the alkyl group represented by $R_{14}$ in the above formula (2), for example, a linear, a branched, or a cyclic alkyl group, such as a methyl group, an ethyl group, an n-propyl group, an n-butyl group, an n-pentyl group, an n-hexyl group, an isopropyl group, an isobutyl group, a sec-butyl group, a tert-butyl group, or a cyclohexyl group, may be mentioned.

$R_{14}$ in the above formula (2) may arbitrarily represent one of the aforementioned hydrogen atom and alkyl group. Among those mentioned above, in view of polymerization characteristics of a polymerizable monomer which forms the monomer unit, a hydrogen atom or a methyl group is preferable.

As the carboxylic acid ester group represented by $R_{15}$ in the above formula (2), for example, there may be mentioned a linear or a branched ester group, such as a methyl ester group, an ethyl ester group, an n-propyl ester group, an isopropyl ester group, an n-butyl ester group, an isobutyl ester group, a sec-butyl ester group, a tert-butyl ester group, an octyl ester group, a nonyl ester group, a decyl ester group, an undecyl ester group, a dodecyl ester group, a hexadecyl ester group, an octadecyl ester group, an eicosyl ester group, a docosyl ester group, a 2-ethylhexyl ester group, a phenyl ester group, or a 2-hydroxyethyl ester group.

As the carboxylic acid amide group represented by $R_{15}$ in the above formula (2), for example, there may be mentioned a linear or a branched amide group, such as an N-methyl amide group, an N,N-dimethyl amide group, an N-ethyl amide group, an N,N-diethyl amide group, an N-isopropyl amide group, an N,N-diisopropyl amide group, an N-n-butyl amide group, an N,N-di-n-butyl amide group, an N-isobutyl amide group, an N,N-diisobutyl amide group, an N-sec-butyl amide group, an N,N-di-sec-butyl amide group, an N-tert-butyl amide group, an N-octyl amide group, an N,N-dioctyl amide group, an N-nonyl amide group, an N,N-dinonyl amide group, an N-decyl amide group, an N,N-didecyl amide group, an N-undecyl amide group, an N,N-diundecyl amide group, an N-dodecyl amide group, an N,N-didodecyl amide group, an N-hexadecyl amide group, an N-octadecyl amide group, an N-phenyl amide group, an N-(2-ethylhexyl)amide group, or an N,N-di(2-ethylhexyl) amide group.

The phenyl group, carboxyl group, carboxylic acid ester group, and carboxylic acid amide group represented by $R_{15}$ in the above formula (2) may be further substituted. As this substituent which may be used, for example, there may be mentioned an alkoxy group, such as a methoxy group or an ethoxy group; an amino group, such as an N-methyl amino group or an N,N-dimethyl amino group; an acyl group such as an acetyl group; or a halogen atom, such as a fluorine atom or a chlorine atom.

$R_{15}$ in the above formula (2) may arbitrarily represent one of the aforementioned phenyl group, carboxyl group, carboxylic acid ester group, and carboxylic acid amide group. Among those mentioned above, in view of dispersibility and compatibility of the compound having an azo skeleton structure in a medium, a phenyl group, a carboxylic acid ester group, or a carboxylic acid amide group is preferable.

The above high molecular portion is able to control the affinity to a dispersion medium by changing the ratio of the monomer unit represented by the above formula (2). When the dispersion medium is a non-polar solvent such as styrene, the ratio of the monomer unit in which $R_{15}$ in the above formula (2) represents a phenyl group is preferably increased in view of the affinity to the dispersion medium. In addition, when the dispersion medium is a solvent having a certain polarity, such as an acrylic acid ester, the ratio of the monomer unit in which $R_{15}$ in the above formula (2) represents a carboxyl group, a carboxylic acid ester group, or a carboxylic acid amide group is preferably increased in view of the affinity to the dispersion medium.

In order to improve the dispersibility of pigments, the molecular weight of the above high molecular portion is preferably 500 or more in terms of the number average molecular weight. In addition, in order to improve the affinity to a non-aqueous solvent, the number average molecular weight of the high molecular portion is preferably 200,000 or less. Furthermore, in view of easy manufacturing, the number average molecular weight of the high molecular portion is more preferably 2,000 to 50,000.

In addition, as disclosed in PCT Japanese Translation Patent Publication No. 2003-531001, a method has been known in which in a poly(oxyalkylene carbonyl) dispersant, the dispersibility can be improved by introducing branched aliphatic chains at terminals of the dispersant. In the high molecular portion of the present invention, when a telechelic high molecular portion is synthesized by a method, such as an ATRP method which will be described later, branched aliphatic chains may also be introduced at the terminals, and the dispersibility may be improved in some cases.

The positions of the azo skeleton structures of the compound having an azo skeleton structure may be randomly located in the compound or may be localized at one terminal thereof by forming one block or a plurality of blocks.

The number of the partial structures (azo skeleton structures) in the above compound having an azo skeleton structure is, in consideration of the balance between the affinity to pigments and the affinity to dispersion media, preferably 0.5 to 10 and more preferably 0.5 to 5 with respect to 100 monomer units forming the high molecular portion.

In addition, although the azo skeleton structure represented by the above formula (1) has tautomers represented by the following formulas (4) and (5), those tautomers are also within the scope of the present invention.

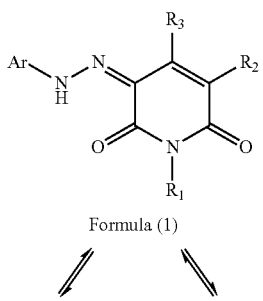

Formula (1)

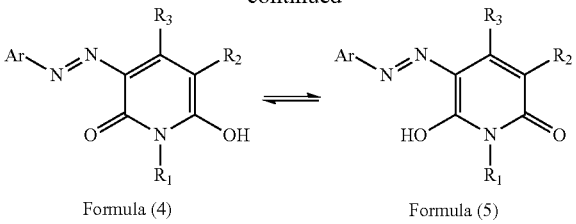

Formula (4)        Formula (5)

[$R_1$ to $R_3$ and Ar in the formulas (4) and (5) each indicate the same meaning as that of each of $R_1$ to $R_3$ and Ar in the formula (1).]

Method for Manufacturing Compound Having Azo Skeleton Structure

The compound having an azo skeleton structure may be synthesized in accordance with a known method.

In particular, as a method for manufacturing the above compound having an azo skeleton structure, for example, the following methods (i) to (iv) may be mentioned.

First, the method (i) will be described in detail with reference to the following scheme by way of example.

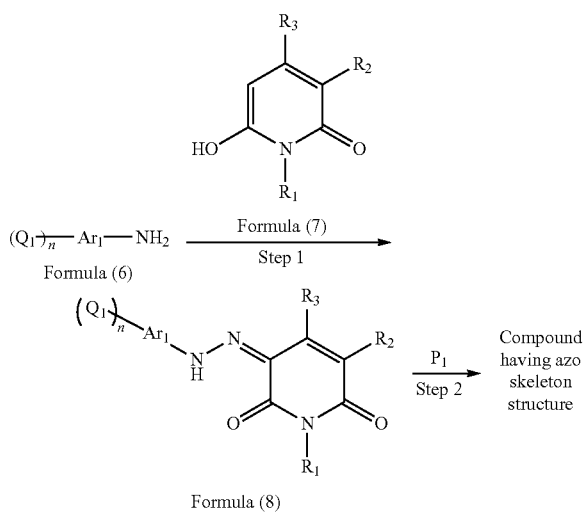

[$R_1$ to $R_3$ in formulas (7) and (8) each indicate the same meaning as that of each of $R_1$ to $R_3$ in the above formula (1). $Ar_1$ in a formula (6) and the formula (8) represents an arylene group. $P_1$ represents a high molecular portion obtained by polymerizing a polymerizable monomer which forms the monomer unit represented by the above formula (2). $Q_1$ in the formulas (6) and (8) represents a linking group which reacts with $P_1$ so as to link the partial structure represented by the above formula (1) and the high molecular portion represented by the above formula (2). n in the formulas (6) and (8) represents an integer value.]

According to the above scheme of the method (i) shown by way of example, an aniline derivative represented by the formula (6) is allowed to react with a compound (7) through a diazo coupling step 1 to synthesize an azo compound (8). Furthermore, by a condensation reaction or the like, the azo compound (8) and the high molecular portion $P_1$ are bonded to each other through a step 2, so that the compound having an azo skeleton structure described above can be synthesized.

First, the step 1 will be described.

A known method may be used in the step 1. In particular, first, the aniline derivative (6) is allowed to react in a methanol solvent, with a diazotizing agent, such as sodium nitrite or nitrosyl sulfuric acid, in the presence of an inorganic acid, such as hydrochloric acid or sulfuric acid, so as to synthesize a corresponding diazonium salt. Furthermore, this diazonium salt is coupled with the compound (7) so as to synthesize the azo compound (8).

Many types of the above aniline derivative (6) are available on the market and can be easily obtained. In addition, this aniline derivative may be easily synthesized by a known method.

Although this step 1 may be performed without using a solvent, in order to prevent rapid reaction progress, this step is preferably performed in the presence of a solvent. As the solvent, although any solvents may be used as long as not inhibiting the reaction, the following solvents may be mentioned by way of example.

That is, for example, an alcohol, such as methanol or ethanol; an ester, such as methyl acetate, ethyl acetate, or propyl acetate; an ether, such as diethyl ether, tetrahydrofuran, or dioxane; a hydrocarbon, such as benzene, toluene, xylene, hexane, or heptane; a halogen-containing hydrocarbon, such as dichloromethane, dichloroethane, or chloroform; an amide, such as N,N-dimethylformamide, N-methylpyrrolidone, or N,N-dimethylimidazolidinone; a nitrile, such as acetonitrile or propionitrile; an acid, such as formic acid, acetic acid, or propionic acid; or water may be mentioned.

In addition, if necessary, at least two types of solvents mentioned above may be used by mixing, and in accordance with the solubility of the substrate, a mixing ratio may be arbitrarily determined when a mixed solvent is used. Although the usage of the above solvent may be arbitrarily determined, in consideration of the reaction rate, the usage is preferably set to 1.0 to 20 times the mass of the compound represented by the above formula (6).

This step 1 is generally performed in a temperature range of −50° C. to 100° C. and is generally completed within 24 hours.

Next, a method for synthesizing the high molecular portion $P_1$ used in the step 2 will be described.

In the synthesis of the high molecular portion $P_1$, a known polymerization method may be used [for example, by Krzysztof Matyjaszewski and one other, "Chemical Reviews" (USA), American Chemical Society, 2001, vol. 101, pp. 2,921 to 2,990].

In particular, as a polymerization method to synthesize the high molecular portion, although radical polymerization, cation polymerization, and anion polymerization may be mentioned by way of example, among those mentioned above, radical polymerization is preferably used in view of easy manufacturing.

The radical polymerization may be performed by irradiation of radiation or laser beams, the use of a radical polymerization initiator, the use of a photopolymerization initiator together with light irradiation, and/or heating.

As the radical polymerization initiator, any material which can generate radicals and can initiate a polymerization reaction may be used, and a compound which generates radicals by heat, light, radiation, or an oxidation-reduction reaction may be selected. For example, there may be mentioned an azo polymerization initiator, an organic peroxide polymerization initiator, an inorganic peroxide polymerization initiator, an organometallic compound polymerization initiator, and a photopolymerization initiator may be mentioned. In more particular, the following polymerization initiators may be mentioned by way of example.

That is, azo polymerization initiators, such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and 4,4'-azobis(4-cyanovaleric acid); organic peroxide polymerization initiators, such as benzoyl peroxide, di-tert-butyl peroxide, tert-butylperoxyisopropyl carbonate, tert-hexyl peroxybenzoate, and tert-butyl peroxybenzoate; inorganic peroxide polymerization initiators, such as potassium peroxide and ammonium peroxide; redox initiators, such as a hydrogen peroxide-ferrous-based compound, a benzoyl peroxide-dimethyl aniline-based compound, and a cerium (IV) salt-alcohol-based compound; and photopolymerization initiators, such as a benzophenone, a benzoin ether, an acetophenone, and a thioxanthone, may be mentioned by way of example.

At least two of those radical polymerization initiators may be used in combination, if necessary.

The usage of the polymerization initiator is, with respect to 100 parts by mass of the polymerizable monomer, preferably adjusted in a range of 0.1 to 20 parts by mass so as to obtain a copolymer having a targeted molecular weight distribution.

In addition, the high molecular portion represented by the above $P_1$ may be manufactured by any one of solution polymerization, suspension polymerization, emulsion polymerization, dispersion polymerization, precipitation polymerization, and bulk polymerization. Among those mentioned above, solution polymerization is preferably performed in a solvent which dissolves individual components used in manufacturing. As the solvent, either a polar organic solvent or a non-polar organic solvent may be used. As the polar solvent, for example, there may be mentioned an alcohol, such as methanol, ethanol, or 2-propanol; a ketone, such as acetone or methyl ethyl ketone; an ether, such as tetrahydrofuran or diethyl ether; an ethylene glycol monoalkyl ether or an acetate thereof; a propylene glycol monoalkyl ether or an acetate thereof; and a diethylene glycol monoalkyl ether. As the non-polar organic solvent, for example, toluene or xylene may be mentioned. In addition, those solvents may be used alone or in combination by mixing. Among those mentioned above, solvents having a boiling point in a range of 100° C. to 180° C. are more preferably used alone or in combination by mixing.

A preferable temperature range of the polymerization temperature may vary depending on the type of polymerization initiator to be used and is not particularly limited; however, in particular, polymerization is generally performed in a temperature range of −30° C. to 200° C. and more preferably in a temperature range of 40° C. to 180° C.

Furthermore, the molecular weight distribution and the molecular structure of the high molecular portion represented by the above $P_1$ can be controlled by known methods. In particular, a high molecular portion $P_1$ having controlled molecular weight distribution and molecular structure can be manufactured, for example, by a method which uses an addition-fragmentation chain transfer agent (Japanese Patent Nos. 4254292 and 3721617); an NMP method which uses dissociation and association of amine oxide radicals [for example, by Craig J. Hawker, and two others, "Chemical Reviews", (USA), American Chemical Society, 2001, Vol. 101, pp. 3,661 to 3,688]; an ATRP method in which polymerization is performed using a heavy metal and a ligand together with a halogen compound functioning as a polymerization initiator [for example, by Masami Kamigaito, and two others, "Chemical Reviews", (USA), American Chemical Society, 2001, Vol. 101, pp. 3,689 to 3,746]; an RAFT method which uses a dithiocarboxylic acid ester and/or a xanthate compound as a polymerization initiator (for example, PCT Japanese Translation Patent Publication No.

2000-515181); an MADIX method (for example, International Publication No. 99/05099 pamphlet); or a DT method [for example, by Atsushi Goto, six others, "Journal of The American Chemical Society", (USA), American Chemical Society, 2003, Vol. 125, pp. 8,720 to 8,721].

Next, the step 2 will be described.

In the step 2, a know method may be used. In particular, by the use of a high molecular portion $P_1$ having a carboxyl group and an azo compound (8) having a hydroxyl group, the compound having an azo skeleton structure in which the linking group has a carboxylic acid ester bond can be synthesized. In addition, by the use of the high molecular portion $P_1$ having a carboxyl group and an azo compound (8) having an amino group, the compound having an azo skeleton structure in which the linking group has a carboxylic acid amide bond can be synthesized. In particular, for example, there may be mentioned a method which uses 1-ethyl-3-(3-dimethylamino propyl)carbodiimide hydrochloric acid salt or the like (for example, by Melvin S. Newman, one other, "The Journal of Organic Chemistry", (USA), American Chemical Society, 1961, Vol. 26, No. 7, pp. 2,525 to 2,528) and a Schotten-Baumann method (for example, by Norma 0. V. Sonntag, "Chemical Reviews", (USA), American Chemical Society, 1953, Vol. 52, No. 2, pp. 237-416).

Although this step 2 may be carried out without using s solvent, in order to prevent rapid reaction progress, this step is preferably performed in the presence of a solvent. As the solvent, any solvents may be used as long as not inhibiting the reaction, and for example, the following may be mentioned.

That is, an ether, such as diethyl ether, tetrahydrofuran, or dioxane; a hydrocarbon, such as benzene, toluene, xylene, hexane, or heptane; a halogen-containing hydrocarbon, such as dichloromethane, dichloroethane, or chloroform; an amide, such as N,N-dimethylformamide, N,N-dimethylacetamide, N-methylpyrrolidone, or N,N-dimethylimidazolidinone; or a nitrile, such as acetonitrile or propionitrile, may be mentioned by way of example.

In addition, in accordance with the solubility of the substrate, at least two of the above solvents may be used by mixing. When the solvents are to be used by mixing, a mixing ratio therebetween may be arbitrarily determined. Although the usage of the solvent may be arbitrarily determined, in view of the reaction rate, the amount is preferably in a range of 1.0 to 20 times the mass of the compound represented by the general formula (6).

This step 2 is generally performed at a temperature range of 0° C. to 250° C. and is generally completed within 24 hours.

Next, the method (ii) will be described in detail with reference to the following scheme by way of example.

Method (ii)

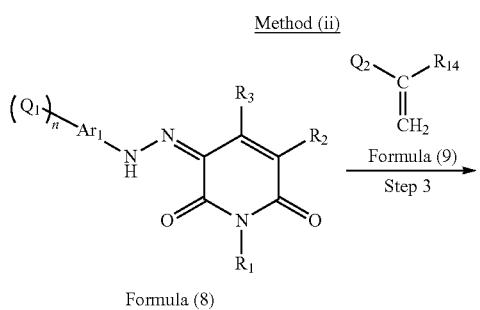

Formula (8)

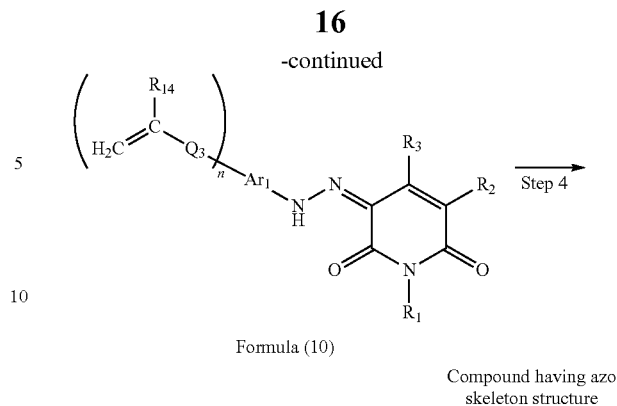

Formula (10)

Compound having azo skeleton structure

[$R_1$ to $R_3$, $Ar_1$, $Q_1$, and n in a formula (8) each indicate the same meaning as that of each of $R_1$ to $R_3$, $Ar_1$, $Q_1$, and n in the above formula (8) in the scheme of the above method (i). $Q_2$ in a formula (9) represents a substituent which reacts with $Q_1$ in the formula (8) to form $Q_3$ in a formula (10). $R_{14}$ in the formulas (9) and (10) indicates the same meaning as that of $R_{14}$ in the above formula (2). $Q_3$ represents a linking group which is formed by a reaction between $Q_1$ in the formula (8) and $Q_2$ in the formula (9) and which links the partial structure represented by the above formula (1) and the high molecular portion represented by the above formula (2).]

According to the scheme of the method (ii) shown above by way of example, first, through a step 3 in which the azo compound represented by the formula (8) is allowed to react with a vinyl group-containing compound represented by the formula (9), an azo compound (10) having a polymerizable functional group is synthesized. Furthermore, through a step 4 in which the azo compound (10) having a polymerizable functional group is copolymerized with a polymerizable monomer forming the monomer unit represented by the above formula (2), the compound having an azo skeleton structure can be synthesized.

First, the step 3 will be described.

In the step 3, by the use of a method similar to that of the step 2 in the method (i), the azo compound (10) having a polymerizable functional group can be synthesized. In particular, by the use of a vinyl group-containing compound (9) in which $Q_2$ represents a carboxyl group and an azo compound (8) in which $Q_1$ represents a hydroxyl group, an azo compound (10) in which $Q_3$ represents a linking group having a carboxylic acid ester bond can be synthesized. In addition, by the use of the vinyl group-containing compound (9) in which $Q_2$ represents a carboxyl group and an azo compound (8) in which $Q_1$ represents an amino group, an azo compound (10) in which $Q_3$ represents a linking group having a carboxylic acid amide bond can be synthesized.

Various types of vinyl group-containing compound (9) are available on the market and can be easily obtained. In addition, this compound may be easily synthesized by a known method.

Next, the step 4 will be described. In the step 4, by copolymerization between the compound (10) having a polymerizable functional group and the polymerizable monomer forming the monomer unit represented by the above formula (2), the compound having an azo skeleton structure represented by the above formula (1) can be synthesized. For the synthetic method of the step 4, a method similar to that of the synthesis of the high molecular portion $P_1$ of the above method (i) may be used.

Next, a method (iii) will be described in detail with reference to the following scheme by way of example.

Method (iii)

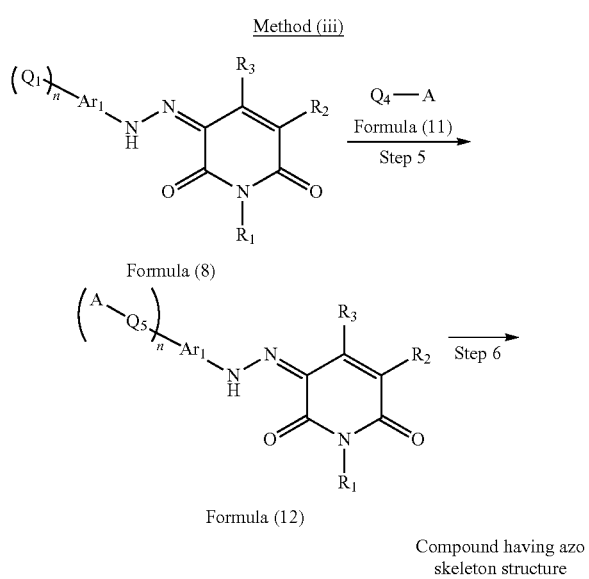

Formula (12)

Compound having azo skeleton structure

[$R_1$ to $R_3$, $Ar_1$, $Q_1$, and n in a formula (8) each indicate the same meaning as that of each of $R_1$ to $R_3$, $Ar_1$, $Q_1$, and n in the formula (8) in the scheme of the above method (i). $Q_5$ in a formula (12) represents a linking group which is formed by a reaction between $Q_1$ in the formula (8) and $Q_4$ in a formula (11) and which links the partial structure represented by the above formula (1) and the high molecular portion represented by the above formula (2). A represents a chlorine atom, a bromine atom, or a iodine atom.]

According to the scheme of the method (iii) shown above by way of example, first, through a step 5 in which an azo compound represented by the formula (8) is allowed to react with a halogen atom-containing compound represented by the formula (11), an azo compound (12) including a halogen atom is synthesized. Furthermore, through a step 6 in which a polymerizable monomer forming the monomer unit represented by the above formula (2) is polymerized using the azo compound (12) including a halogen atom as a polymerization initiator, the compound having an azo skeleton structure can be synthesized.

First, the step 5 will be described.

In the step 5, by the use of a method similar to that of the step 2 of the above method (i), the azo compound (12) including a halogen atom can be synthesized. In particular, by the use of a halogen atom-containing compound (11) in which $Q_4$ represents a substituent having a carboxyl group and an azo compound (8) in which $Q_1$ represents a substituent having a hydroxyl group, the azo compound (12) including a halogen atom can be synthesized. In addition, by the use of the halogen atom-containing compound (11) in which $Q_4$ represents a substituent having a carboxyl group and an azo compound (8) in which $Q_1$ represents a substituent having an amino group, the azo compound (12) including a halogen atom can be synthesized.

As the halogen atom-containing compound (11) having a carboxyl group described above, for example, the following may be mentioned.

That is, chloroacetic acid, α-chloropropionic acid, α-chlorobutyric acid, α-chloroisobutyric acid, α-chlorovaleric acid, α-chloroisovaleric acid, α-chlorocaproic acid, α-chlorophenylacetic acid, α-chlorodiphenylacetic acid, α-chloro-α-phenylpropionic acid, α-chloro-β-phenylpropionic acid, bromoacetic acid, α-bromopropionic acid, α-bromobutyric acid, α-bromoisobutyric acid, α-bromovaleric acid, α-bromoisovaleric acid, α-bromocaproic acid, α-bromophenylacetic acid, α-bromodiphenylacetic acid, α-bromo-α-phenylpropionic acid, α-bromo-β-phenylpropionic acid, iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-α-phenylpropionic acid, α-iodo-β-phenylpropionic acid, β-chlorobutyric acid, β-bromoisobutyric acid, iododimethyl methylbenzoate, and 1-chloroethyl benzoate may be mentioned by way of example. In addition, the acid halides and the acid anhydrides of those mentioned above may also be used as described above in the present invention.

As a halogen atom-containing compound (11) having a hydroxyl group, for example, there may be mentioned 1-chloroethanol, 1-bromoethanol, 1-iodoethanol, 1-chloropropanol, 2-bromopropanol, 2-chloro-2-propanol, 2-bromo-2-methylpropanol, 2-phenyl-1-bromoethanol, or 2-phenyl-2-iodoethanol.

Next, the step 6 will be described.

In the step 6, by the use of the ATRP method in the method (i), the azo compound (12) including a halogen atom and the polymerizable monomer forming the above monomer unit (2) are polymerized, so that the compound having an azo skeleton structure can be synthesized.

Although a metal catalyst used in the ATRP method is not particularly limited, at least one type of transition metal selected from those of the Groups 7 to 11 of the periodic table is preferable. In a redox catalyst (redox conjugated complex) in which a low valence complex and a high valence complex change reversibly, as a low valence metal to be practically used, the following may be mentioned.

That is, $Cu+$, $Ni^0$, $Ni^+$, $Ni^{2+}$, $Pd^0$, $Pd^+$, $Pt^0$, $Pt^+$, $Pt^{2+}$, $Rh^+$, $Rh^{2+}$, $Rh^{3+}$, $Co^+$, $Co^{2+}$, $Ir^0$, $Ir^+$, $Ir^{2+}$, $Ir^{3+}$, $Fe^{2+}$, $Ru^{2+}$, $Ru^{3+}$, $Ru^{4+}$, $Ru^{5+}$, $Os^{2+}$, $Os^{3+}$, $Re^{2+}$, $Re^{3+}$, $Re^{4+}$, $Re^{6+}$, $Mn^{2+}$, and $Mn^{3+}$ may be mentioned by way of example. Among those mentioned above, $Cu^+$, $Ru^{2+}$, $Fe^{2+}$, or $Ni^{2+}$ is preferable, and in particular, $Cu^+$ is more preferable in view of easy availability. As a monovalent copper compound, for example, cuprous chloride, cuprous bromide, cuprous iodide, or cuprous cyanide may be preferably used.

As the ligand to be used in the ATRP method, an organic ligand is generally used. In particular, 2,2'-bipyridyl or a derivative thereof, 1,10-phenanthroline or a derivative thereof, tetramethylethylenediamine, N,N,N',N'',N''-pentamethyldiethylenetriamine, tris(dimethylaminoethyl)amine, triphenylphosphine, or tributylphosphine may be mentioned by way of example. Among those mentioned above, in particular, an aliphatic polyamine, such as N,N,N',N'',N''-pentamethyldiethylenetriamine, is preferable in view of easy manufacturing.

Next, a method (iv) will be described in detail with reference to the following scheme by way of example. In the method (iv), a high molecular portion which has the monomer units each represented by the above formula (2) and which is bonded in advance to an aryl group having an amino group and an intermediate which is a pyridone analog are separately synthesized and are then processed by diazocoupling, so that a compound having an azo skeleton structure is synthesized.

Method (iv)

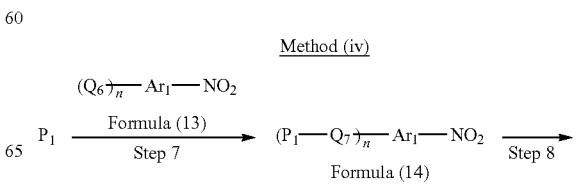

Formula (14)

-continued

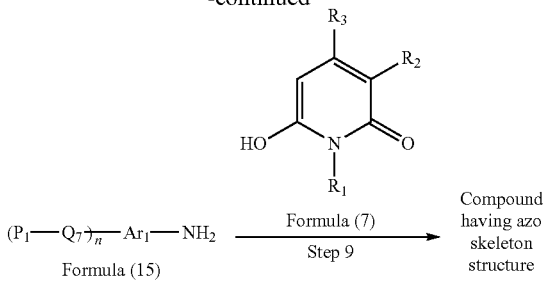

[$P_1$ indicates the same meaning as that of $P_1$ of the above method (i). $Ar_1$ and n in formulas (13) to (15) each indicate the same meaning as each of $Ar_1$ and n in the formula (8) in the scheme of the above method (i). $Q_6$ in the formula (13) represents a substituent which reacts with $P_1$ to form $Q_7$ shown in the formula (14). $Q_7$ in the formulas (14) and (15) represents a linking group which is formed by a reaction between $Q_6$ in the formula (13) and $P_1$ and which links the partial structure represented by the above formula (1) and the high molecular portion represented by the above formula (2).]

According to the above scheme shown by way of example, first, through a step 7 in which a nitrile group-containing arylene group (13) is introduced in the high molecular portion $P_1$, a high molecular portion (14) having a nitrile group-containing arylene group is synthesized. Next, through a step 8 in which the high molecular portion (14) having a nitrile group-containing arylene group is reduced, a high molecular portion (15) having an amino group-containing arylene group is synthesized. Furthermore, through a step 9 in which the high molecular portion (15) having an amino group-containing arylene group is diazo-coupled with an intermediate (7) which is a pyridone analog, the compound having an azo skeleton structure is synthesized.

First, the step 7 will be described.

In the step 7, by the use of a method similar to that of the step 2 of the above method (i), the high molecular portion (14) having a nitro group-containing arylene group can be synthesized. For example, by a reaction between a high molecular portion $P_1$ having a carboxyl group and a nitro group-containing arylene group (13) in which $Q_6$ represents a hydroxyl group, a high molecular portion (14) having a nitro group-containing arylene group in which the linking group is a carboxylic acid ester bond can be synthesized. In addition, by a reaction between the high molecular portion $P_1$ having a carboxyl group and a nitro group-containing arylene group (13) in which $Q_6$ represents an amino group, a high molecular portion (14) having a nitro group-containing arylene group in which the linking group is a carboxylic acid amide bond can be synthesized.

Various types of compound represented by the above formula (13) are available on the market and can be easily obtained. In addition, the compound represented by the above formula (13) can be easily synthesized by a known method.

Next, the step 8 will be described.

For the step 8, a known method may be used. In particular, as a method which uses a metal compound or the like, for example, there may be used a method disclosed in "Experimental Chemistry Course" (Jikken Kagaku Kouza, in Japanese), Maruzen Co., Ltd., Second edition, Volume 17-2, pp. 162 to 179. In addition, as a catalytic hydrogenation method, for example, there may be used a method disclosed in "New Experimental Chemistry Course" (Shin Jikken Kagaku Kouza, in Japanese), Maruzen Co., Ltd., First edition, Vol. 15, pp. 390 to 448 or a method disclosed, for example, in International Publication No. 2009/060886.

Although this step 8 may be carried out without using a solvent, in order to prevent rapid reaction progress, this step is preferably performed in the presence of a solvent. As the solvent, any solvents may be used as long as not inhibiting the reaction, and for example, the following may be mentioned.

That is, an alcohol, such as methanol, ethanol, or propanol; an ester, such as methyl acetate, ethyl acetate, or propyl acetate; an ether, such as diethyl ether, tetrahydrofuran, or dioxane; a hydrocarbon, such as benzene, toluene, xylene, hexane, or heptane; or an amide, such as N,N-dimethylformamide, N-methylpyrrolidone, or N,N-dimethylimidazolidinone, may be mentioned by way of example.

In addition, if necessary, at least two of the above solvents may be used by mixing, and when the solvents are to be used by mixing, a mixing ratio may be arbitrarily determined. Although the usage of the solvent may be arbitrarily determined in accordance with the solubility of the substrate, in view of the reaction rate, an amount in a range of 1.0 to 20 times the mass of the compound represented by the above formula (14) is preferable.

This step is generally performed at a temperature range of 0° C. to 250° C. and is generally completed within 24 hours.

In the step 8, by the use of a method similar to that of the step 2 in the above method (i), the high molecular portion (15) having an amino group-containing arylene group can be synthesized.

Next, the step 9 will be described.

In the step 9, by the use of a method similar to that of the step 1 of the above method (i), the compound having an azo skeleton structure can be synthesized.

General isolation and purification methods may be applied to the compounds each having an azo skeleton structure obtained in the individual methods and the compounds represented by the above formulas (8), (10), (12), (14), and (15). As the isolation and the purification methods, for example, a re-crystallization method and a re-precipitation method, each of which uses an organic solvent, and a column chromatography using silica gel may be mentioned by way of example. When purification is performed using one of those methods mentioned above or at least two thereof in combination, a compound having a high purity can be obtained.

Identification and Quantity Determination of Compound

The identification and quantitative determination of the compound obtained in the above step and represented by each of the above formulas (8), (10), (12), (14), and (15) are preformed using a nuclear magnetic resonance analysis [ECA-400, manufactured by JEOL Ltd., Avance-600, manufactured Bruker BioSpin K.K.], ESI-TOF MS (LC/MSD TOF, manufactured by Agilent Technologies, Inc.), and a HPLC analysis [LC-20A, manufactured by SHIMADZU CORP.].

The identification and quantitative determination of the compound having an azo skeleton structure obtained in each of the above methods are preformed using a high-speed GPC [HLC8220GPC, manufactured by Tosoh Corp.], a nuclear magnetic resonance analysis [ECA-400, manufactured by JEOL Ltd., Avance-600, manufactured Bruker BioSpin K.K.], and acid value measurement based on JIS K-0070 (automatic titration measurement apparatus COM-2500, manufactured by Hiranuma Sangyo Co., Ltd.).

Pigment Dispersant and Pigment Composition

Next, the pigment dispersant and the pigment composition of the present invention will be described.

Since the compound having an azo skeleton structure described above has a high affinity to various types of pigments and also has a high affinity to a non-aqueous solvent, the pigment dispersant of the present invention preferably contains this compound having an azo skeleton structure. In this case, as the pigment dispersant, the compound having an azo skeleton structure may be used alone, or at least two types thereof may be used in combination.

In addition, the pigment composition of the present invention contains the above compound having an azo skeleton structure and a pigment. This pigment composition may be used for a paint, an ink, a toner, and a resin molded article.

As a yellow pigment contained in the pigment composition of the present invention, a pigment may be appropriately selected from the yellow pigments described, for example, in "Organic Pigments Handbook" published in 2006 (written and published by Isao Hashimoto). In particular, a monoazo pigment, a bisazo pigment, a polyazo pigment, an isoindoline pigment, a condensed azo pigment, an azomethine pigment, an anthraquinone pigment, or a quinoxaline pigment may be mentioned by way of example. Among those mentioned above, a monoazo pigment, a bisazo pigment, a polyazo pigment, and an isoindoline pigment may be preferably used. Furthermore, among those mentioned above, since having a high affinity to the compound having an azo skeleton structure of the present invention, an acetoacetanilide pigment, such as C.I. Pigment Yellow 74, 83, 93, 128, 155, 175, or 180, or an isoindoline pigment, such as C.I. Pigment Yellow 139 or 185, is preferable. In particular, since a high dispersion effect can be obtained by the compound having an azo skeleton structure of the present invention, C.I. Pigment Yellow 155 or 185 is more preferable.

The yellow pigments mentioned above may be used alone, or at least two types thereof may be used by mixing.

As a yellow colorant contained in the pigment composition of the present invention, as long as not degrading the dispersibility of the pigment, a known yellow colorant may be used together with the above yellow pigment.

As the colorant to be used together therewith, for example, a condensed azo compound, an isoindoline compound, an anthraquinone compound, an azo metal complex, a methine compound, a quinophthalone compound, and an allylamide compound may be mentioned.

In particular, for example, there may be used C.I. Pigment Yellow 12, 13, 14, 15, 17, 62, 94, 95, 97, 109, 110, 111, 120, 127, 129, 139, 147, 151, 154, 168, 174, 176, 181, 191, 194, 213, or 214; C.I. Vat Yellow 1, 3, or 20; Mineral Fast Yellow, Navel Yellow, Naphthol Yellow S, Hansa Yellow G, or Permanent Yellow NCG; or C.I. Solvent Yellow 9, 17, 24, 31, 35, 58, 93, 100, 102, 103, 105, 112, 162, or 163.

As a magenta pigment contained in the pigment composition of the present invention, a pigment may be appropriately selected from the magenta pigments described for example, in "Organic Pigments Handbook" published in 2006 (written and published by Isao Hashimoto). In particular, a quinacridone pigment, a monoazonaphthol pigment, a disazonaphthol pigment, a perylene pigment, a thioindigo pigment, a diketopyrrolopyrrole pigment, a naphthol AS pigment, or a BONA lake pigment may be mentioned. Among those mentioned above, a quinacridone pigment, a diketopyrrolopyrrole pigment, a naphthol AS pigment, and a BONA lake pigment are preferable.

Furthermore, among the magenta pigments mentioned above, the following compounds are preferable since having a high affinity to the compound having an azo skeleton structure of the present invention. That is, a quinacridone pigment represented by the following formula (16), a diketopyrrolopyrrole pigment represented by the following formula (17), and a naphthol AS pigment and a BONA lake pigment, each of which is represented by the following formula (18), are preferable.

Formula (16)

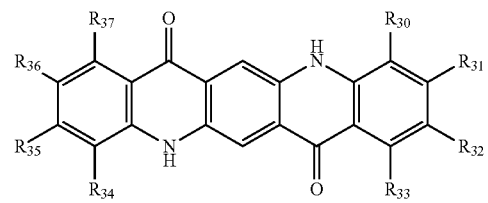

[In the formula (16), $R_{30}$ to $R_{37}$ each independently represent a hydrogen atom, a chlorine atom, or a methyl group.]

Formula (17)

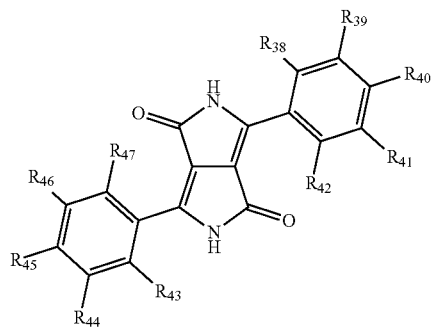

[In the formula (17), $R_{38}$ to $R_{47}$ each independently represent a hydrogen atom, a chlorine atom, a t-butyl group, a cyano group, or a phenyl group.]

Formula (18)

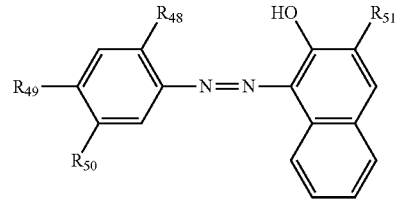

[In the formula (18), $R_{48}$ to $R_{50}$ each independently represent a hydrogen atom, a methoxy group, a methyl group, a nitro group, a chlorine atom, a N,N-dimethylaminosulfonyl group, a sulfonic acid group, a sulfonic acid salt group, or a $CONHR_{52}$ group; $R_{51}$ represents an amino group, a carboxylic acid group, a carboxylic acid salt group, or a $CONHR_{53}$ group; and $R_{52}$ and $R_{53}$ each independently represent a hydrogen atom or a phenyl group.]

As the quinacridone pigment represented by the above formula (16), for example, C.I. Pigment Red 202, 122, 192, or 209 may be mentioned.

$R_{30}$ to $R_{37}$ in the above formula (16) may arbitrarily represent one of the aforementioned substituents. Among those mentioned above, in view of the affinity to the compound having an azo skeleton structure of the present invention, $R_{30}$, $R_{32}$ to $R_{34}$, $R_{36}$ and $R_{37}$ each preferably represent a hydrogen atom, and $R_{31}$ and $R_{35}$ each independently represent a hydrogen atom, a chlorine atom, or a methyl group.

As the diketopyrrolopyrrole pigment represented by the above formula (17), for example, C.I. Pigment Red 255, 254, or 264 may be mentioned.

$R_{38}$ to $R_{47}$ in the above formula (17) may arbitrarily represent one of the aforementioned substituents. Among those mentioned above, in view of the affinity to the compound having an azo skeleton structure of the present invention, $R_{38}$, $R_{39}$, $R_{41}$ to $R_{44}$, $R_{46}$, and $R_{47}$ each preferably represent a hydrogen atom, and $R_{40}$ and $R_{45}$ each preferably represent a hydrogen atom or a phenyl group.

As the Naphthol AS pigment represented by the above formula (18), for example, C.I. Pigment Red 2, 3, 5, 6, 7, 23, 150, 146, 184, or 269 may be mentioned.

As the BONA lake pigment represented by the above formula (18), for example, C.I. Pigment Red 48:2, 48:3, 48:4 or 57:1 may be mentioned.

In $R_{48}$ to $R_{51}$ in the above formula (18), in view of the affinity to the compound having an azo skeleton structure of the present invention, at least one of $R_{48}$ to $R_{50}$ preferably represents a $CONHR_{52}$ group, and $R_{51}$ preferably represent a $CONHR_{53}$ group. $R_{53}$ preferably represents a hydrogen atom in view of the affinity to the compound having an azo skeleton structure of the present invention.

In the present invention, a quinacridone pigment, such as C.I. Pigment Red 122 or 202, and a Naphthol AS pigment, such as C.I. Pigment Red 255, 264, or 150, are particularly preferable in view of the affinity to the compound having an azo skeleton structure of the present invention.

The above magenta pigments may be used alone, or at least two types thereof may be used by mixing.

As a magenta colorant to be contained in the pigment composition of the present invention, as long as not degrading the dispersibility of the pigment, a known magenta colorant may be used together with the aforementioned magenta pigment.

As the magenta colorant to be used together therewith, for example, a condensed azo compound, an anthraquinone compound, a basic dye lake compound, a benzimidazolone compound, a thioindigo compound, and a perylene compound may be mentioned.

In particular, C.I. Pigment Red 81:1, 144, 166, 169, 177, 185, 220, 221, or 238 may be mentioned.

As a cyan pigment to be contained in the pigment composition of the present invention, a phthalocyanine pigment represented by the following formula (19) may be preferably used.

Formula (19)

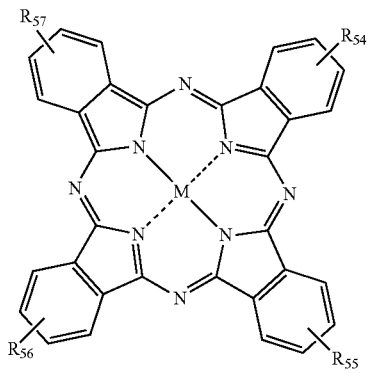

[In the formula (19), $R_{54}$ to $R_{57}$ each independently represent a hydrogen atom, an alkyl group, a sulfonic acid group, or a sulfonic acid salt group, and M represents a metal atom or a hydrogen atom.]

As the phthalocyanine pigment represented by the above formula (19), for example, there may be mentioned C.I. Pigment Blue 15, 15:1, 15:2, 15:3, 15:4, 15:5, 15:6, 16, 17, 17:1, 68, 70, 75, 76, or 79.

Among those mentioned above, in view of the affinity to the compound having an azo skeleton structure of the present invention, C.I. Pigment Blue 15, 15:1, 15:2, 15:3, 15:4, 15:5, or 15:6 is more preferable.

The pigments mentioned above may be used alone, or at least two types thereof may be used by mixing.

As a cyan colorant to be contained in the pigment composition of the present invention, as long as not degrading the dispersibility of the pigment, a known cyan colorant may be used together with the aforementioned pigment.

As the cyan colorant to be used together therewith, for example, there may be mentioned C.I. Pigment Blue 1, 1:2, 1:3, 2, 2:1, 2:2, 3, 4, 5, 6, 7, 8, 9, 9:1, 10, 10:1, 11, 12, 13, 14, 18, 19, 20, 21, 22, 23, 24, 24:1, 25, 26, 27, 28, 29, 30, 31, 32, 33, 34, 35, 36, 36:1, 52, 53, 56, 56:1, 57, 58, 59, 60, 61, 61:1, 62, 63, 64, 65, 66, 67, 69, 71, 72, 73, 74, 77, 78, 80, 81, 82, 83, or 84.

In addition, a colorant other than the cyan colorant may also be used in order to adjust the hue. For example, when C.I. Pigment Green 7 is mixed with C.I. Pigment Blue 15:3, the color purity of cyan can be improved.

As a black colorant to be contained in the pigment composition of the present invention, carbon black may be preferably used.

Although carbon black used in the present invention is not particularly limited, for example, carbon black obtained by a manufacturing method, such as a thermal method, an acetylene method, a channel method, a furnace method, or a lamp black method, may be used.

Although the average primary particle diameter of the carbon black used in the present invention is not particularly limited, in view of the hue, the average primary particle diameter is preferably 14 to 80 nm and more preferably 25 to 50 nm.

In addition, the average primary particle diameter of carbon black may be measured by taking an enlarged photo thereof using a scanning electron microscope.

Although a DBP oil absorption amount of the carbon black used in the present invention is not particularly limited, the amount is preferably 30 to 200 mL/100 g and more preferably 40 to 150 mL/100 g. When the DBP oil absorption amount of the carbon black is in the above range, the coloring power of a printed image can be further improved.

In addition, the DBP oil absorption amount of carbon black indicates the amount of DBP (dibutyl phthalate) absorbed by 100 g of carbon black and may be measured in accordance with "JIS K6217".

In addition, the pH of carbon black is not particularly limited as long as not remarkably degrading the dispersibility of carbon black in the compound having an azo skeleton structure.

In addition, the pH of carbon black may be measured with a pH electrode using a mixed liquid containing carbon black and distilled water.

Although the specific surface area of carbon black is not particularly limited, 300 $m^2/g$ or less is preferable, and 100 $m^2/g$ or less is more preferable. When the specific surface area of carbon black is in the above range, the addition amount of the compound having an azo skeleton structure can be further decreased.

In addition, the specific surface area of carbon black is a BET specific surface area and may be measured in accordance with "JIS K4652".

The above carbon black may be used alone, or at least two types thereof may be used by mixing.

As a black colorant used in the present invention, as long as not degrading the dispersibility of the carbon black, a known black colorant may be used together with the above carbon black.

As the black colorant to be used together therewith, for example, there may be mentioned C.I. Pigment Black 1, 10, or 31; C.I. Natural Black 1, 2, 3, 4, 5, or 6; or activated carbon may be mentioned.

Furthermore, the black colorant to be contained in the pigment composition of the present invention may be used together with a known magenta colorant, cyan colorant, or yellow colorant for color toning.

In addition, since pigments other than the yellow pigment, magenta pigment, cyan pigment, or carbon black as described above may also be used as long as having an affinity to the pigment dispersant of the present invention, the pigments which can be used in the present invention are not limited to those mentioned above.

Pigments which are not processed by purification, control of crystalline system and particle diameter, and surface treatment, that is, crude pigments, may also be used as long as being formed from raw materials corresponding to the pigments mentioned above. In addition, as long as not remarkably degrading the effect of the compound having an azo skeleton structure, a processed pigment composition may also be used.

A composition ratio [(pigment):(compound having an azo skeleton structure)] of the pigment in the pigment composition to the compound having an azo skeleton structure on a mass basis is preferably 100:0.1 to 100:100 and more preferably 100:0.5 to 100:20. When the composition ratio of the pigment to the compound having an azo skeleton structure is within the above range, the pigment dispersibility is further improved.

The pigment composition may be manufactured by either a wet method or a dry method. Since the compound having an azo skeleton structure of the present invention has a high affinity to a non-aqueous solvent, a wet method which can easily manufacture a uniform pigment composition is preferable. In particular, the pigment composition may be formed as described below.

A pigment dispersant is dissolved in a dispersion medium together with a resin as needed, and while stirring is preformed, a pigment powder is gradually added thereto so as to be sufficiently blended well with the medium. Furthermore, by a dispersing machine, such as a kneader, a roll mill, a ball mill, a paint shaker, a dissolver, an attritor, a sand mill, or a high-speed mill, a mechanical sharing force is applied. As a result, the pigment dispersant can be adsorbed on the surface of the pigment, and the pigment can be finely dispersed in the form of stable and uniform fine particles.

To the pigment composition of the present invention, auxiliary agents may be further added during manufacturing.

For example, a surfactant, a dispersant, a filler, a standardizing agent, a resin, a wax, an antifoaming agent, an antistatic agent, an anti-dust agent, an extender, a shading colorant, a preservative, a dry suppressing agent, a rheology controller, a wetting agent, an antioxidant, a UV absorber, and a photostabilizer may be used alone, or at least two thereof may be used in combination. In addition, the pigment dispersant of the present invention may be added in advance when a crude pigment is manufactured.

Pigment Dispersion

Next, a pigment dispersion of the present invention will be described.

The pigment dispersion of the present invention contains the pigment composition and a non-aqueous solvent functioning as a dispersion medium. The pigment dispersion may be either a dispersion in which the above pigment composition is dispersed in a non-aqueous solvent or a dispersion in which individual constituent elements of the pigment composition are dispersed in a non-aqueous solvent. For example, the pigment dispersion may be formed as described below.

A pigment dispersant and a resin are dissolved as needed in a dispersion medium, and while stirring is preformed, a pigment or a pigment composition powder is gradually added thereto so as to be sufficiently blended with the dispersion medium. Furthermore, by a dispersing machine, such as a ball mill, a paint shaker, a dissolver, an attritor, a sand mill, or a high-speed mill, when a mechanical sharing force is applied, the pigment can be dispersed in the form of stable and uniform fine particles.

The non-aqueous solvent functioning as a dispersion medium of the pigment dispersion of the present invention is selected in accordance with targeted application of the pigment dispersion and is not particularly limited. For example, there may be mentioned an ester, such as methyl acetate, ethyl acetate, or propyl acetate; a hydrocarbon, such as hexane, octane, petroleum ether, cyclohexane, benzene, toluene, or xylene; or a halogenated hydrocarbon, such as carbon tetrachloride, trichloroethylene, or tetrabromoethane.

The non-aqueous solvent functioning as a dispersion medium of the pigment dispersion of the present invention may be a polymerizable monomer. As the polymerizable monomer, for example, the following may be mentioned.

That is, styrene, α-methylstyrene, α-ethylstyrene, o-methylstyrene, m-methylstyrene, p-methylstyrene, p-methoxystyrene, p-phenylstyrene, p-chlorostyrene, 3,4-dicholorstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinyl naphthalene, acrylonitrile, methacrylonitrile, and acryl amide may be mentioned by way of example.

Among those mentioned above, in view of the affinity to the compound having an azo skeleton structure of the present invention, as the non-aqueous solvent, styrene is preferable.

A resin which can be dissolved in the non-aqueous solvent may be selected in accordance with targeted application of the pigment dispersion and is not particularly limited. For example, a polystyrene resin, a styrene copolymer, a poly (acrylic acid) resin, a poly(methacrylic acid) resin, a polyacrylate resin, a polymethacrylate resins, an acrylate copolymer, a methacrylate copolymer, a polyester resin, a poly(vinyl ether) resin, a poly(vinyl alcohol) resin, a poly(vinyl butyral) resin, a polyurethane resin, and a polypeptide resin may be mentioned. In addition, at least two types of those resins may be used by mixing.

Toner

Next, a toner will be described.

A toner of the present invention includes toner particles containing a binder resin and a colorant. In this case, since the above pigment composition is used as the colorant, the dispersibility of the pigment in the toner particles is maintained in a preferable state, so that a toner having a high coloring power can be obtained.

As the binder resin, a known resin which is generally used may be used.

In particular, for example, there may be mentioned a styrene-methacrylic acid copolymer, a styrene-acrylic acid copolymer, a polyester resin, an epoxy resin, and a styrene-butadiene copolymer.

In addition, the toner particles may be directly obtained by polymerizing a polymerizable monomer in accordance with a polymerization method, and as the polymerizable monomer used in this case, the following may be mentioned.

That is, a styrene monomer, such as styrene, α-methylstyrene, α-ethylstyrene, o-methylstyrene, m-methylstyrene, p-methylstyrene, o-ethylstyrene, m-ethylstyrene, or p-ethylstyrene; a methacrylate monomer, such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, or amide methacrylate; an acrylate monomer, such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, or amide acrylate; or an olefin monomer, such as butadiene, isoprene, or cyclohexene, may be mentioned by way of example.

Those mentioned above may be used alone or may be appropriately mixed together so as to have a theoretical glass transition temperature (Tg) in a range of 40° C. to 75° C. [see "Polymer Handbook" edited by J. Brandrup, E. H. Immergut (USA), third edition, John Wiley & Sons, 1989, pp. 209 to 277]. Since the theoretical glass transition temperature is set in the range described above, the storage stability and durable stability of the toner and the clearness of a full color image can be further improved.

As the binder resin, when a non-polar resin, such as a polystyrene, and a polar resin, such as a polyester resin or a polycarbonate resin, are used in combination, distribution of additives, such as a colorant, a charge control agent, and a wax, in the toner particles can be controlled. For example, when toner particles are directly formed by a suspension polymerization method, during a polymerization reaction from a dispersion step to a polymerization step, the polar resin is added. The polar resin is added in accordance with the balance in polarity between a polymerizable monomer composition to be formed into the toner particles and an aqueous medium. As a result, for example, since a thin layer of the polar resin is formed on the surface of the toner particle, the resin concentration can be controlled so as to be changed continuously from the surface of the toner particle to the inside thereof. In this case, when a polar resin having an interaction with the above compound having an azo skeleton structure, colorant, and charge control agent is used, the colorant can be preferably distributed in the toner particle.

Furthermore, in the present invention, in order to increase the mechanical strength of the toner particles and at the same time, to control the molecular weight of the binder resin, a cross-linking agent may be used when the binder resin is synthesized.

As this cross-linking agent, a bifunctional cross-linking agent and a cross-linking agent having at least three functions may be used.

As the bifunctional cross-linking agent, for example, there may be mentioned divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400, and #600, dipropylene glycol diacrylate, polypropylene glycol diacrylate, polyester diacrylate, and dimethacylates which are obtained from the above diacrylates by using a dimethacrylate function group instead of the diacrylate function group.

As the cross-linking agent having at least three functions, for example, there may be mentioned pentaerythritol triacrylate, trimethylolethane triacrylate, trimethylolpropane triacrylate, tetramethylolmethane tetraacrylate, oligoester acrylate, and methacrylates thereof; 2,2-bis(4-(methacryloxy)phenyl)propane, diallyl phthalate, triallyl cyanurate, triallyl isocyanurate, and triallyl trimellitate.

In view of the fixing properties and the offset resistance of the toner, with respect to 100 parts by mass of the above polymerizable monomer, the amount of the cross-linking agent is preferably 0.05 to 10 parts by mass and more preferably 0.1 to 5 parts by mass.

Furthermore, in the present invention, in order to prevent the adhesion of the toner to a fixing member, a wax may also be used when the binder resin is synthesized.

As the wax, for example, there may be mentioned a petroleum wax or a derivative thereof, such as a paraffin wax, a microcrystalline wax, or petrolatum; a montan wax or a derivative thereof; a hydrocarbon wax by a Fischer-Tropsch method or a derivative thereof; a polyolefin wax or a derivative thereof, such as a polyethylene wax; or a natural wax or a derivative thereof, such as a carnauba wax or a candelilla wax. The derivatives mentioned above also include an oxide, a block copolymer with a vinyl monomer, and a graft modified product. In addition, an alcohol such as a higher aliphatic alcohol, a fatty acid, such as stearic acid or palmitic acid, a fatty acid amide, a fatty acid ester, a hardened castor oil or its derivative, a vegetable wax, or an animal wax may also be mentioned. Those waxes mentioned above may be used alone or in combination.

With respect to 100 parts by mass of the binder resin, the addition amount of the above wax is preferably 2.5 to 15.0 parts by mass and more preferably 3.0 to 10.0 parts by mass. When the addition amount of the wax is within the range described above, the fixing properties and the charging properties can be further improved. In addition, in order to control the optimum frictional charge amount in accordance with a toner developing system, a charge control agent may be contained in the toner particles, if necessary.

In order to control the optimum frictional charge amount in accordance with a developing system, the toner may contain a charge control agent.

As the charge control agent, a known agent may be used. Among known agents, a charge control agent which has a high charging speed and which can stably maintain a predetermined charge amount is preferable. Furthermore, when the toner particles are directly manufactured from a polymerizable monomer by a polymerization method, such as a suspension polymerization method, a charge control agent which has a low polymerization inhibition property and which contains substantially no substances soluble in an aqueous medium is particularly preferable.

As the charge control agent, a negative-charging charge control agent and a positive-charging charge control agent may be used.

As the negative-charging charge control agent, for example, the following may be used.

That is, for example, there may be mentioned a polymer or a copolymer having a sulfonic acid group, a sulfonic acid salt group, or a sulfonic acid ester group; or a salicylic acid derivative or a metal complex thereof.

In addition, as the positive-charging charge control agent, for example, the following may be used.

That is, a nigrosine or a nigrosine modified by a fatty acid metal salt or the like, a guanidine compound, an imidazole compound, or a quaternary ammonium salt, such as tributyl benzyl ammonium-1-hydroxy-4-naphthol sulfonate or tetrabutylammonium tetrafluoroborate, may be mentioned by way of example.

Those charge control agents may be used alone or in combination.

In the toner of the present invention, as a fluidizing agent, an inorganic fine powder may be added to the toner particles. As the inorganic fine powder, for example, silica, titanium oxide, alumina, or a composite oxide thereof may be used, and in addition, powders obtained by performing a surface treatment on those mentioned above may also be used.

Method for Manufacturing Toner Particles

As a method for manufacturing toner particles, a pulverization method, a suspension polymerization method, suspension granulation method, and an emulsion polymerization method, which have been used, may be mentioned by way of example. In view of environmental load in manufacturing and controllability of particle diameter, among the methods mentioned above, in particular, the toner particles are preferably formed by a suspension polymerization method or a suspension granulation method.

For example, toner particles manufactured by a suspension polymerization method may be manufactured as described below.

First, a colorant containing the pigment composition of the present invention, a polymerizable monomer, a wax component, a polymerization initiator, and the like are mixed together to prepare a polymerizable monomer composition. Next, this polymerizable monomer composition is dispersed in an aqueous medium to form particles of the polymerizable monomer composition. Subsequently, the polymerizable monomer in the particles of the polymerizable monomer composition is polymerized in the aqueous medium to obtain the toner particles.

The above polymerizable monomer composition is preferably prepared in such a way that after a dispersion in which the above colorant is dispersed in a first polymerizable monomer is obtained, this dispersion is mixed with a second polymerizable monomer. That is, after the above pigment composition is sufficiently dispersed in the first polymerizable monomer, this dispersion is mixed with the second polymerizable monomer together with other toner materials, so that the pigment can be more preferably dispersed in the toner particles.

As the polymerization initiator used in the above suspension polymerization, a known polymerization initiator may be mentioned. For example, an azo polymerization initiator, an organic peroxide polymerization initiator, an inorganic peroxide polymerization initiator, an organic metal compound polymerization initiator, or a photopolymerization initiator may be mentioned. For example, an azo polymerization initiator, such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), or dimethyl 2,2'-azobis(isobutyrate); an organic peroxide polymerization initiator, such as benzoyl peroxide, di-tert-butyl peroxide, tert-butyl peroxyisopropylmonocarbonate, tert-hexyl peroxybenzoate, or tert-butyl peroxybenzoate; or an inorganic peroxide polymerization initiator, such as potassium persulfate, or ammonium persulfate, may be mentioned. Those polymerization initiators may be used alone or in combination.

The addition amount of the above polymerization initiator is, with respect to 100 parts by mass of the polymerizable monomer, preferably in a range of 0.1 to 20 parts by mass and more preferably in a range of 0.1 to 10 parts by mass.

Although the type of polymerization initiator mentioned above may slightly vary depending on the polymerization method, in consideration of the 10-hour half-life temperature, the polymerization initiators mentioned above may be used alone, or at least two thereof may be used by mixing.

The aqueous medium used in the above suspension polymerization preferably contains a dispersion stabilizer. As the dispersion stabilizer, known inorganic and organic dispersion stabilizers may be used.

As the inorganic dispersion stabilizer, for example, there may be mentioned calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, or alumina.

As the organic dispersion stabilizer, for example, there may be mentioned a poly(vinyl alcohol), a gelatin, a methyl cellulose, a methyl hydroxypropyl cellulose, an ethyl cellulose, a sodium carboxymethyl cellulose, or a starch.

In addition, a nonion, an anion, and a cation surfactant may also be used. For example, there may be mentioned sodium dodecyl sulfate, sodium tetradecyl sulfate, sodium pentadecyl sulfate, sodium octyl sulfate, sodium oleate, sodium laurate, potassium stearate, and calcium oleate.

Among the above dispersion stabilizers, a poor water soluble inorganic dispersion stabilizer which is soluble in an acid is preferably used. In addition, when an aqueous medium is prepared by using a poor water soluble inorganic dispersion stabilizer, with respect to 100 parts by mass of the polymerizable monomer, the amount of this dispersion stabilizer is preferably set in a range of 0.2 to 2.0 parts by mass. When the amount of the dispersion stabilizer is set to satisfy the above range, droplet stability of the polymerizable monomer composition in the aqueous medium is improved. In addition, the aqueous medium is preferably prepared using 300 to 3,000 parts by mass of water with respect to 100 parts by mass of the polymerizable monomer composition.

In addition, when an aqueous medium in which the above poor water soluble inorganic dispersion stabilizer is dispersed is prepared, in order to obtain dispersion stabilizer particles having a fine and uniform particle size, the above poor water soluble inorganic dispersion stabilizer is preferably generated and prepared in water under high-speed stirring conditions. For example, in the case in which calcium phosphate is used as the dispersion stabilizer, when an aqueous sodium phosphate solution and an aqueous calcium chloride solution are mixed together under high-speed stirring conditions to form fine particles of calcium phosphate, a preferable dispersion stabilizer can be obtained.

When the toner particles of the present invention are manufactured by a suspension granulation method, preferable toner particles may also be obtained. Since a manufacturing process of the suspension granulation method includes no heating step, compatibility between a resin and a wax component, which occurs when a low melting-point wax is used, can be suppressed, and hence, a decrease in glass transition temperature caused by this compatibility can be prevented. In addition, in the suspension granulation method, since the degree of freedom of selecting a toner material to be used as the binder resin is high, a polyester resin which is generally considered advantageous for the fixing properties may be easily used as a primary component. Hence, when a toner having a resin composition to which a suspension polymerization method cannot be applied is manufactured, this suspension granulation method is an advantageous manufacturing method.

The toner particles manufactured by the above suspension granulation method are formed, for example, by the following way. First, a colorant containing the pigment composition of the present invention, a binder resin, a wax, and the like are mixed together in a solvent to prepare a solvent composition. Next, this solvent composition is dispersed in an aqueous medium to form particles of the solvent composition, so that a toner particle suspension liquid is obtained. Subsequently, the suspension liquid thus obtained is heated or is placed under a reduced pressure condition to remove the solvent, so that the toner particles can be obtained.

The solvent composition in the above step is preferably prepared by mixing a second solvent with a dispersion in which the above colorant is dispersed in a first solvent. That is, since the above colorant is sufficiently dispersed in the first solvent and is then mixed with the second solvent together with other toner materials, the pigment can be more preferably dispersed in the tonner particles.

As the solvent which can be used in the above suspension granulation method, for example, the following may be mentioned.

That is, a hydrocarbon, such as toluene, xylene, or hexane; a halogen-containing hydrocarbon, such as methylene chloride, chloroform, dichloroethane, trichloroethane, or carbon tetrachloride; an alcohol, such as methanol, ethanol, butanol, or isopropyl alcohol; a polyalcohol, such as ethylene glycol, propylene glycol, diethylene glycol, or triethylene glycol; a cellosolve, such as methyl cellosolve or ethyl cellosolve; a ketone, such as acetone, methyl ethyl ketone, or methyl isobutyl ketone; an ether, such as benzyl alcohol ethyl ether, benzyl alcohol isopropyl ether, or tetrahydrofuran; or an ester, such as methyl acetate, ethyl acetate, or butyl acetate, may be mentioned by way of example.

Those mentioned above may be used alone, or at least two types thereof may be used by mixing. Among those mentioned above, in order to easily remove the solvent in the above toner particle suspension liquid, a solvent which has a low boiling point and which can sufficiently dissolve the above binder resin is preferably used.

The usage of the solvent is, with respect to 100 parts by mass of the binder resin, preferably in a range of 50 to 5,000 parts by mass and more preferably in a range of 120 to 1,000 parts by mass.

The aqueous medium used in the above suspension granulation method preferably contains a dispersion stabilizer. As the dispersion stabilizer, known inorganic and organic dispersion stabilizers may be used. As the inorganic dispersion stabilizer, for example, calcium phosphate, calcium carbonate, aluminum hydroxide, calcium sulfate, or barium carbonate may be mentioned. As the organic dispersion stabilizer, for example, there may be mentioned a water-soluble polymer, such as a poly(vinyl alcohol), a methyl cellulose, a hydroxyethyl cellulose, an ethyl cellulose, a sodium carboxymethyl cellulose, a sodium polyacrylate, or a sodium polymethacrylate; an anionic surfactant, such as sodium dodecylbenzenesulfonate, sodium octadecyl sulfate, sodium oleate, sodium laurate, or potassium stearate; a cationic surfactant, such as lauryl amine acetate, stearyl amine acetate, or lauryl trimethyl ammonium chloride; or an amphoteric surfactant, such as lauryl dimethyl amine oxide; or a nonion surfactant, such as polyoxyethylene alkyl ether, a polyoxyethylene alkylphenyl ether, or a polyoxyethylene alkylamine.

The usage of the above dispersion stabilizer is, with respect to 100 parts by mass of the binder resin, preferably in a range of 0.01 to 20 parts by mass in view of the droplet stability of the solvent composition in the aqueous medium.

In the present invention, the weight average particle diameter (hereinafter referred to as "D4" in some cases) of the toner is preferably 3.0 to 15.0 μm and more preferably 4.0 to 12.0 μm. When the weight average particle diameter of the toner is in the above range, the charging stability is improved, and even if a large number of sheets are continuously developed, fogging and toner scattering can be further suppressed. In addition, reproducibility of a half tone portion is also improved, and the surface irregularities of an obtained image can be easily reduced.

In addition, the ratio (hereinafter also referred to as "D4/D1") of D4 to the number average particle diameter (hereinafter referred to as "D1") is preferably 1.35 or less and more preferably 1.30 or less. When D4/D1 is in the above range, the generation of fogging and the decrease in transfer efficiency can be further suppressed, and an image having a high resolution can be easily obtained.

In addition, methods for adjusting D4 and D1 of the toner may vary depending on the method for manufacturing toner particles. For example, in the case of the suspension polymerization method, the adjustment may be performed by controlling the concentration of the dispersion stabilizer used in the preparation of the aqueous medium, the reaction stirring rate, the reaction stirring time, and/or the like.

The toner of the present invention may be either a magnetic toner or a non-magnetic toner. When being used as a magnetic toner, the toner particles forming the toner of the present invention may be mixed with a magnetic substance. As the magnetic substance mentioned above, a known substance may be used, and for example, iron oxides, such as magnetite, maghemite, and ferrite, may be mentioned.

The average particle diameter of those magnetic substances is preferably 0.1 to 2 μm and more preferably 0.1 to 0.3 μm. As for magnetic characteristics at a magnetic field of 795.8 KA/m, the coercive force, the saturation magnetization, and the remnant magnetization are preferably 1.6 to 12 KA/m, 5 to 200 $Am^2/kg$ (preferably 50 to 100 $Am^2/kg$), and 2 to 20 $Am^2/kg$, respectively, in view of developing properties of the toner.

The addition amount of the magnetic substance mentioned above is, with respect to 100 parts by mass of the binder resin, preferably 10 to 200 parts by mass and more preferably 20 to 150 parts by mass.

EXAMPLES

Hereinafter, although the present invention will be described in more detail with reference to Examples and Comparative Examples, the present invention is not limited thereto as long as without departing from the scope thereof. In addition, in the following description, "part(s)" and "%" are each on a mass basis unless described otherwise.

Hereinafter, measurement methods used in this manufacturing example will be described.

(1) Measurement of Molecular Weight

The molecular weight of the compound having an azo skeleton structure was calculated based on polystyrene conversion by a size exclusion chromatography (SEC). The measurement of the molecular weight by SEC was performed as described below.

After a sample was added to the following eluent so as to have a sample concentration of 1.0% and was left stand still at room temperature for 24 hours, this solution was filtrated with a solvent-resistance membrane filter having a pore diameter of 0.2 μm to form a sample solution, and the solution thus obtained was measured under the following conditions.

Apparatus: high-speed GPC apparatus "HLC-8220GPC" [manufactured by Tosoh Corp.]
Column: two LF-804's in series
Eluent: THF
Flow rate: 1.0 mL/min
Oven temperature: 40° C.
Injection volume of sample: 0.025 mL In addition, for calculation of the molecular weight of the sample, a molecular weight calibration curve prepared using standard polystyrene resins [manufactured by Tosoh Corp., TSK standard polystyrenes F-850, F-450, F-288, F-128, F-80, F-40, F-20, F-10, F-4, F-2, F-1, A-5000, A-2500, A-1000, and A-500] was used.

(2) Acid Value Measurement

The acid value of the compound having an azo skeleton structure can be obtained by the following method.

A basic operation is based on JIS K-0070.

1) A sample in an amount of 0.5 to 2.0 g is precisely measured. The mass in this case is represented by M (g).
2) The sample is charged in a beaker having a volume of 50 mL, and 25 mL of a mixed solution of tetrahydrofuran/ethanol (2/1) is added thereto to form a solution.
3) Titration is performed using an ethanol solution containing 0.1 mol/L of KOH by a potentiometric titrator [for example, automatic titration measurement apparatus "COM-2500", manufactured by Hiranuma Sangyo Co., Ltd. may be used.].
4) The usage of the KOH solution in this step is represented by S (mL). At the same time, the blank is also measured, and the usage of the KOH solution in this case is represented by B (mL).
5) The acid value is calculated from the following equation. f represents the factor of the KOH solution.

$$\text{Acid Value [mg KOH/g]} = \frac{(S - B) \times f \times 5.61}{M}$$

(3) Composition Analysis

The structural determination of the high molecular portion and that of the compound having an azo skeleton structure were performed using the following apparatus.

$^1$H NMR: ECA-400 (deuterium chloroform used as solvent), manufactured by JEOL Ltd.

$^{13}$C NMR: FT-NMR AVANCE-600 (deuterium chloroform used as solvent), manufactured by Bruker BioSpin K.K.

In addition, in $^{13}$C NMR measurement, the quantification and the composition analysis were performed in accordance with a reverse gate decoupling method using chromium (III) acetylacetonate as a relaxation reagent.

Example 1

By the following method, a compound having an azo skeleton structure shown below was obtained.

Manufacturing Example of Compound (101) Having Azo Skeleton Structure

A compound (101) having an azo skeleton structure represented by the structure shown below was manufactured in accordance with the following scheme.

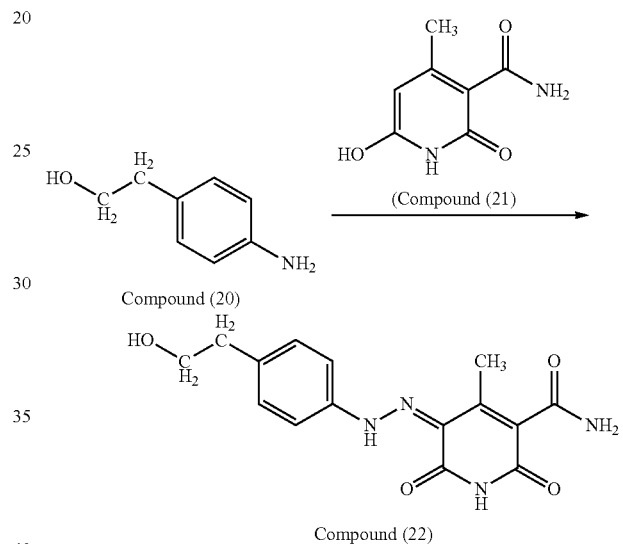

First, 15.0 parts of methanol, 15.0 parts of water, and 12.2 parts of concentrated hydrochloric acid were added to 5.00 parts of a compound (20), and a mixture thus prepared was iced to 10° C. or less. A mixture prepared by dissolving 2.77 parts of sodium nitrite in 10.0 parts of water was added to the solution thus prepared, and a reaction was performed therebetween for 1 hour at the same temperature as described above (diazonium salt solution). To a solution containing 50.0 parts of methanol, 50.0 parts of water, and 17.9 parts of sodium acetate, 6.13 parts of a compound (21) was added and was then iced to 10° C. or less. The above diazonium salt solution was dripped to this solution thus prepared and was allowed to react therewith for 2 hours at 10° C. or less. After the reaction was completed, 50.0 parts of water was added to the reaction solution thus obtained and was stirred for 30 minutes. Subsequently, a solid component was recovered by filtration and was then purified by a re-crystallization method using N,N-dimethylformamide, so that 9.36 parts of a compound (22) was obtained (yield: 89.2%).

Next, 100 parts of a polypropylene glycol monomethyl ether was refluxed at a liquid temperature of 120° C. or more by heating while nitrogen purge was performed. To this solution, a mixture containing 120 parts of styrene, 10 parts of acrylic acid, and 1.00 part of tert-butyl peroxybenzoate was dripped over 3 hours. Incidentally, tert-butyl peroxybenzoate was an organic peroxide polymerization initiator and was sold under the trade name, Perbutyl Z, manufactured by NOF Corp. After the dripping was completed, and the solution was then stirred for 3 hours, ordinary pressure distillation was performed until the liquid temperature was increased to 170° C., and after the liquid temperature reached 170° C., distillation was performed at a reduced pressure of 1 hPa for 1 hour to remove the solvent, thereby obtaining a resin solid material. This solid material was dissolved in tetrahydrofuran and was purified by re-precipitation using n-hexane, so that 120 parts of a compound (23) was obtained (yield: 92.5%).

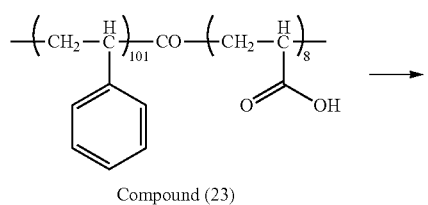

Compound (23)

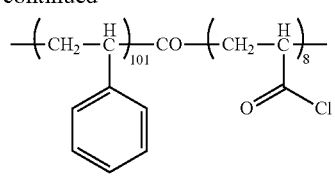

Compound (24)

[In addition, in the above structures, "co" is a mark indicating that the sequence of individual monomer units forming the copolymer is disordered.]

Furthermore, after 15.0 parts of the compound (23) was dissolved in 300 parts of chloroform, 10.0 parts of thionyl chloride was dripped thereto, and stirring was performed for 24 hours. Subsequently, the reaction solution was condensed to remove chloroform and excessive thionyl chloride. An obtained resin solid material was recovered, so that a compound (24) was obtained.

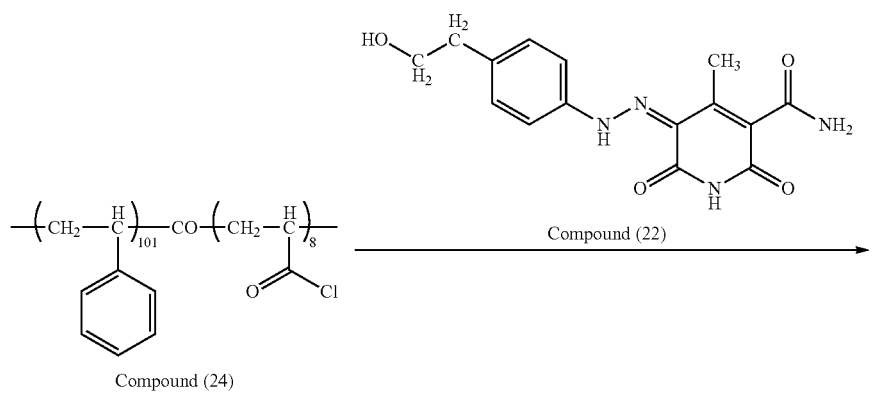

Compound (24)

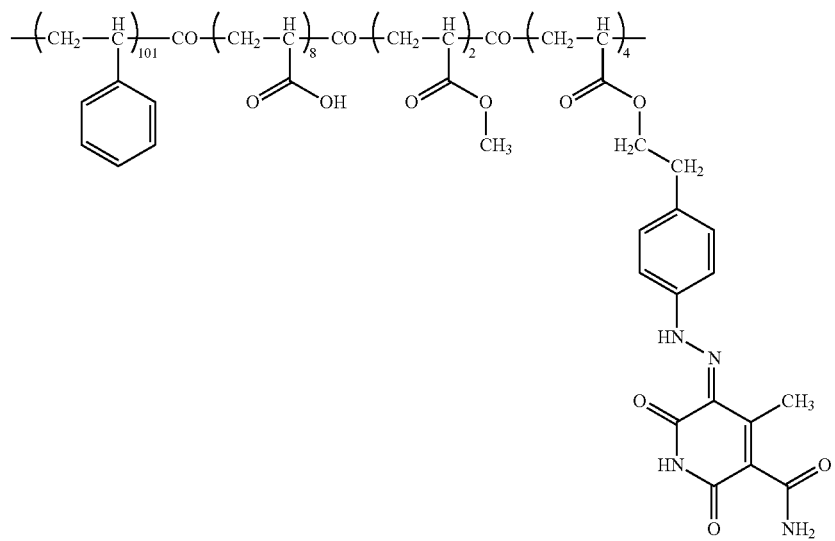

Compound (101)

Next, after 10.0 parts of the compound (24) was dissolved in 65.0 parts of N,N-dimethylacetamide, 1.60 parts of the compound (22) was added thereto, and stirring was performed at 65° C. for 7 hours. Subsequently, 20.0 parts of methanol was added, and stirring was performed at 65° C. for 1 hour. After cooled to room temperature, the reaction solution was condensed by filtration. The residue was purified by re-precipitation using 500 parts of methanol, so that 9.80 parts of the compound (101) having an azo skeleton structure was obtained.

In addition, it was confirmed using the apparatuses described above that the compound thus obtained had the structure of the compound (101) having an azo skeleton structure. Hereinafter, analytical results are shown.

Analytical Results of Compound (101) Having Azo Skeleton Structure

[1] Result of molecular weight measurement (GPC): number average molecular weight (Mn)=12,886
[2] Result of acid value measurement: 8.8 mgKOH/g
[3] Result of $^{13}$C NMR (150 MHz, CDCl$_3$, room temperature) (see FIG. 1): δ[ppm]=179.76 (2C), 175.86 (2C), 175.27 (4C), 170.40, 166.98, 163.31, 160.69 (4C), 157.29, 147.70-140.18 (101C), 139.26 (4C), 136.71 (4C), 131.15-121.74, 47.25-34.96

From the data analysis result of the above $^{13}$C NMR and the measurement result of the above number average molecular weight, when the number of the monomer units forming the compound (101) having an azo skeleton structure was calculated, the numbers of the styrene units, the acrylic acid units, the methyl acrylate units, and the azo skeleton structural units were 101, 2, 2, and 4, respectively.

Manufacturing Example of Compound (141) Having Azo Skeleton Structure

A compound (141) having an azo skeleton structure represented by the structure shown below was manufactured in accordance with the following scheme.

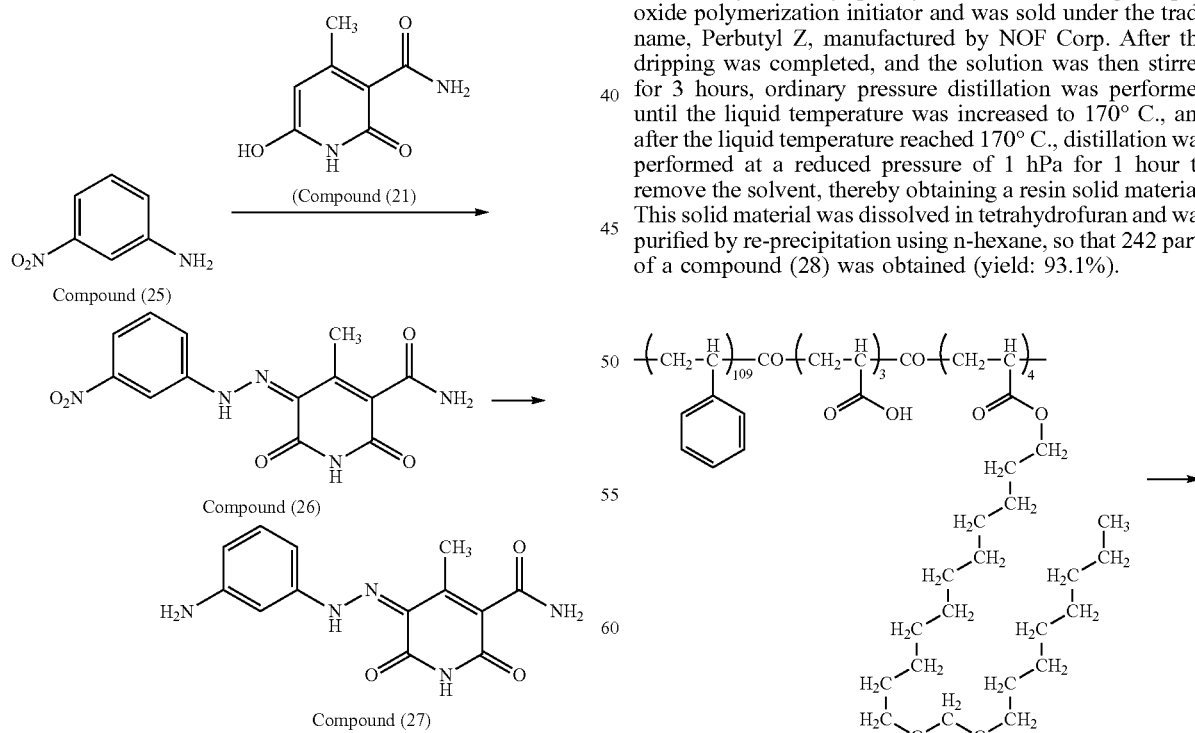

First, 20.0 parts of a compound (25) was dissolved in 42.2 parts of concentrated hydrochloric acid and 150 parts of water. After this solution was iced to a liquid temperature of 0° C., a mixture prepared by dissolving 10.4 parts of sodium nitrite in 50 parts of water was added thereto, and stirring was performed for 30 minutes at the same temperature as that described above. Subsequently, 1.98 parts of sulfamic acid was added, so that excessive nitrous acid was decomposed (diazonium salt solution).

Next, after a mixture prepared by dissolving 56.3 parts of sodium acetate in 200 parts of water was added to 23.2 parts of the compound (21) and was then iced to 0° C., the above diazonium salt solution was dripped at the same temperature as that described above while a pH of 8 or less was maintained. After the dripping was completed, stirring was performed over night while the solution was gradually cooled to room temperature, so that the reaction was completed. After the reaction was completed, the solution was filtrated, and a precipitate was sequentially washed with diluted hydrochloric acid and water in this order, so that 30.5 parts of a compound (26) was obtained (yield: 67.7%).

In 120 parts of 1.4-dioxane, 14.0 parts of the above compound (26) was dissolved. Next, after a solution containing 10.0 parts of sodium hydrogen sulfide dissolved in 20.0 parts of water was added at room temperature, the temperature was increased to 65° C., and stirring was performed for 45 hours. After the reaction was completed, the solution thus processed was charged into water. A precipitate obtained thereby was filtrated and was then re-dispersed in water, and the pH was set in a neutral region with concentrated hydrochloric acid. After the precipitate was washed with water, dispersion washing was performed with methanol, so that 11.2 parts of a compound (27) was obtained (yield: 84.9%).

Next, 100 parts of a polypropylene glycol monomethyl ether was refluxed at a liquid temperature of 120° C. or more by heating while nitrogen purge was performed. To this solution, a mixture containing 240 parts of styrene, 10.0 parts of acrylic acid, 10.0 parts of behenyl acrylate, and 1.00 part of tert-butyl peroxybenzoate was dripped over 3 hours. Incidentally, tert-butyl peroxybenzoate was an organic peroxide polymerization initiator and was sold under the trade name, Perbutyl Z, manufactured by NOF Corp. After the dripping was completed, and the solution was then stirred for 3 hours, ordinary pressure distillation was performed until the liquid temperature was increased to 170° C., and after the liquid temperature reached 170° C., distillation was performed at a reduced pressure of 1 hPa for 1 hour to remove the solvent, thereby obtaining a resin solid material. This solid material was dissolved in tetrahydrofuran and was purified by re-precipitation using n-hexane, so that 242 parts of a compound (28) was obtained (yield: 93.1%).

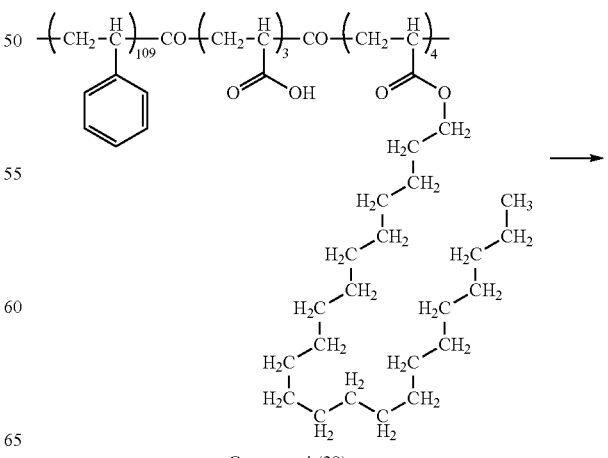

Compound (28)

-continued

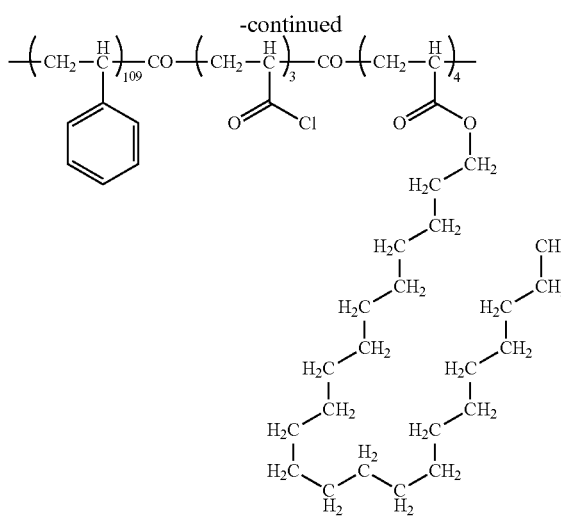

Compound (29)

[In addition, in the above structures, "co" is a mark indicating that the sequence of individual monomer units forming the copolymer is disordered.]

Furthermore, after 15.0 parts of the compound (28) was dissolved in 300 parts of chloroform, 10.0 parts of thionyl chloride was dripped thereto, and stirring was performed for 24 hours. Subsequently, the reaction solution was condensed to remove chloroform and excessive thionyl chloride. An obtained resin solid material was recovered, so that a compound (29) was obtained.

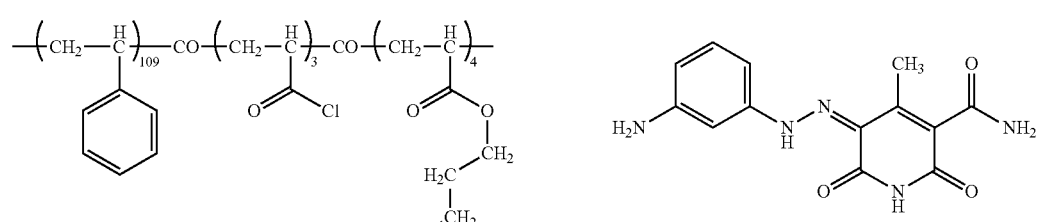

Compound (29) Compound (27)

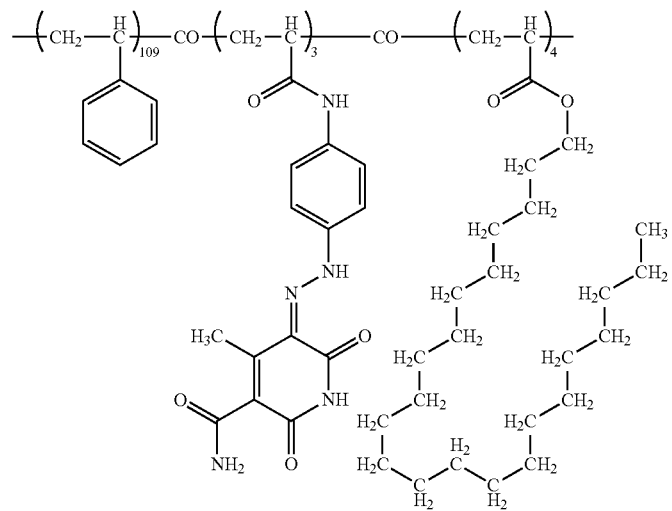

Compound (141)

Next, after 10.0 parts of the compound (29) was dissolved in 65.0 parts of N,N-dimethylacetamide, 0.910 parts of the compound (27) was added thereto, and stirring was performed at 65° C. for 7 hours. Subsequently, 20.0 parts of methanol was added, and stirring was performed at 65° C. for 1 hour. After cooled to room temperature, the reaction solution was condensed by filtration. The residue was purified by re-precipitation using 500 parts of methanol, so that 9.80 g of the compound (141) having an azo skeleton structure was obtained.

In addition, it was confirmed using the apparatuses described above that the compound thus obtained had the structure of the compound (141) having an azo skeleton structure. Hereinafter, analytical results are shown.

Analytical Results of Compound (141) Having Azo Skeleton Structure

Figure 2:
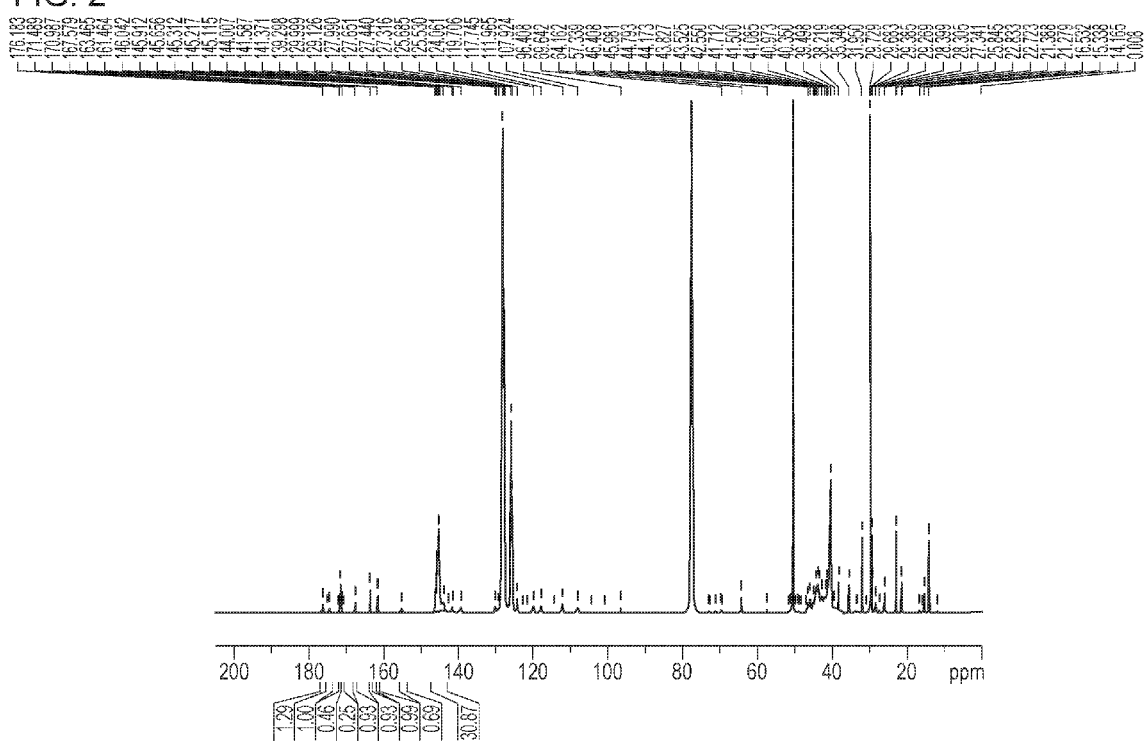
FIG. 2 is a view showing a $^{13}C$ NMR spectrum of a compound (141) of the present invention measured in $CDCl_3$ at room temperature and 150 MHz.

[1] Result of molecular weight measurement (GPC): number average molecular weight (Mn)=11,684
[2] Result of acid value measurement: 0.0 mgKOH/g
[3] Result of $^{13}$C NMR (150 MHz, CDCl$_3$, room temperature) (see FIG. 2): δ[ppm]=176.18 (4C), 174.59 (3C), 167.58 (3C), 163.47, 161.46 (3C), 147.15-143.13 (109C), 128.88-126.90, 126.48-125.10, 47.46-38.55

From the data analysis result of the above $^{13}$C NMR and the measurement result of the above number average molecular weight, when the number of the monomer units forming the compound (141) having an azo skeleton structure was calculated, the numbers of the styrene units, the behenyl acrylate units, and the azo skeleton structural units were 109, 4, and 3, respectively.

Manufacturing Example of Compound (142) Having Azo Skeleton Structure

A compound (142) having an azo skeleton structure having the structure shown below was manufactured in accordance with the following scheme.

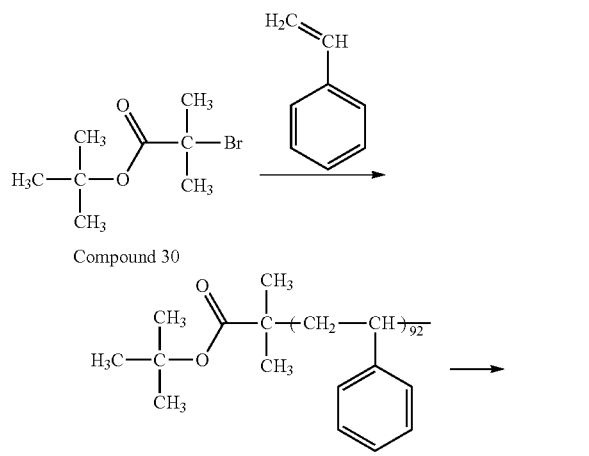

Compound 30

Compound 31

Compound 32

First, after 1.10 parts of a compound (30), 50.0 parts of styrene, and 0.830 parts of N,N,N',N'',N''-pentamethyldiethylenetriamine were added to 5.00 parts of anisole, freeze-deaeration was performed three times, and 0.690 parts of copper bromide was added in a nitrogen atmosphere. After a reaction of the solution thus prepared was performed at 100° C. for 8 hours in a nitrogen atmosphere, the reaction solution was exposed to the air so as to complete the reaction. After the reaction was completed, and the reaction solution was then condensed, re-precipitation was performed using methanol, and an obtained precipitate was dissolved in tetrahydrofuran. This solution was allowed to pass through activated alumina to remove copper bromide. After the solvent was removed by reduced pressure distillation, the precipitate was dried and solidified under reduced pressure, so that 40.0 parts of a high molecular compound (31) was obtained.

Next, after 40.0 parts of the high molecular compound (31) thus obtained was dissolved in 200 parts of 1.4-dioxane, 100 parts of a 12 M aqueous hydrochloric acid solution was added thereto, and stirring was performed at 120° C. for 12 hours. After the reaction was completed, the reaction solution was condensed, and re-precipitation was then performed with methanol. An obtained precipitate was dried and solidified under reduced pressure, so that 36.0 parts of a compound (32) was obtained.

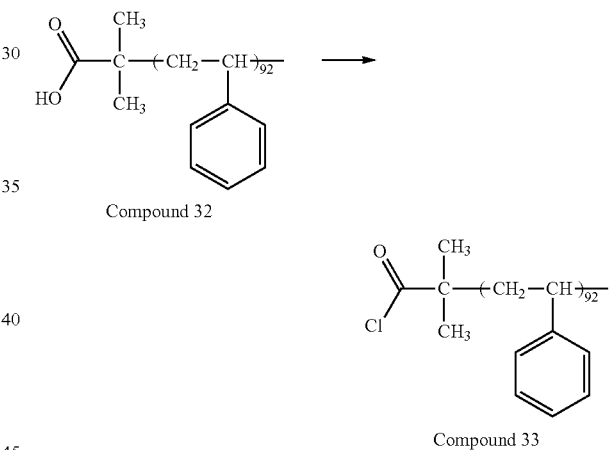

Compound 32

Compound 33

Furthermore, after 5.00 parts of the compound (32) was dissolved in 50.0 parts of chloroform, 0.346 parts of thionyl chloride was dripped thereto, and stirring was performed for 24 hours at room temperature. Subsequently, the reaction solution was condensed to remove chloroform and excessive thionyl chloride. An obtained resin solid material was recovered, so that a compound (33) was obtained.

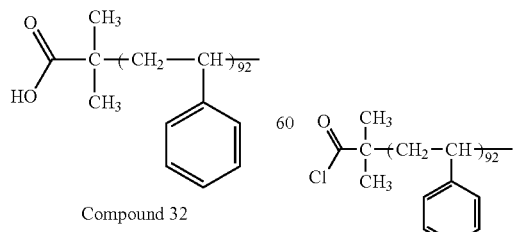

Compound 32

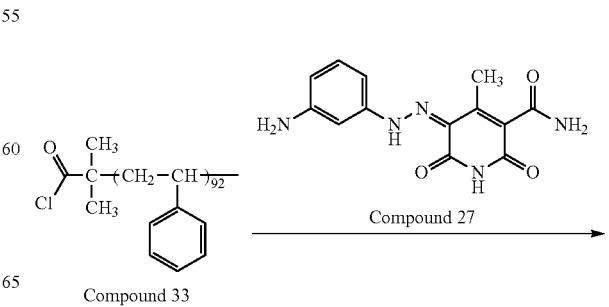

Compound 33

Compound 27

-continued

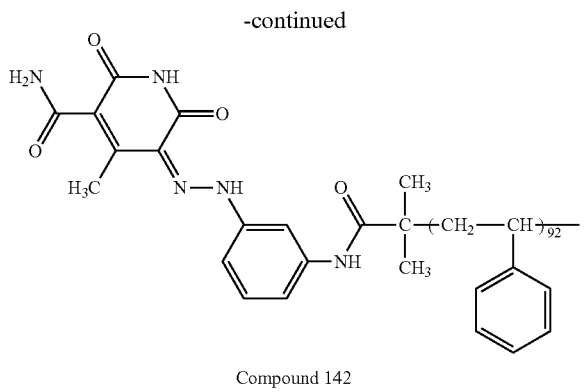

Compound 142

Next, after 5.00 parts of the compound (33) was dissolved in 34.6 parts of N,N-dimethylacetamide, 0.910 parts of the compound (27) was added thereto, and stirring was performed at 65° C. for 7.5 hours. After the reaction was completed, 20.0 parts of methanol was added, and stirring was performed at 65° C. for 1 hour. After cooled to room temperature, the reaction solution was condensed, and re-precipitation was then performed using methanol, so that 4.56 parts of the compound (142) having an azo skeleton structure was obtained.

In addition, it was confirmed using the apparatuses described above that the compound thus obtained had the structure of the compound (142) having an azo skeleton structure. Hereinafter, analytical results are shown.

Analytical Results of Compound (142) Having Azo Skeleton Structure

Figure 3:
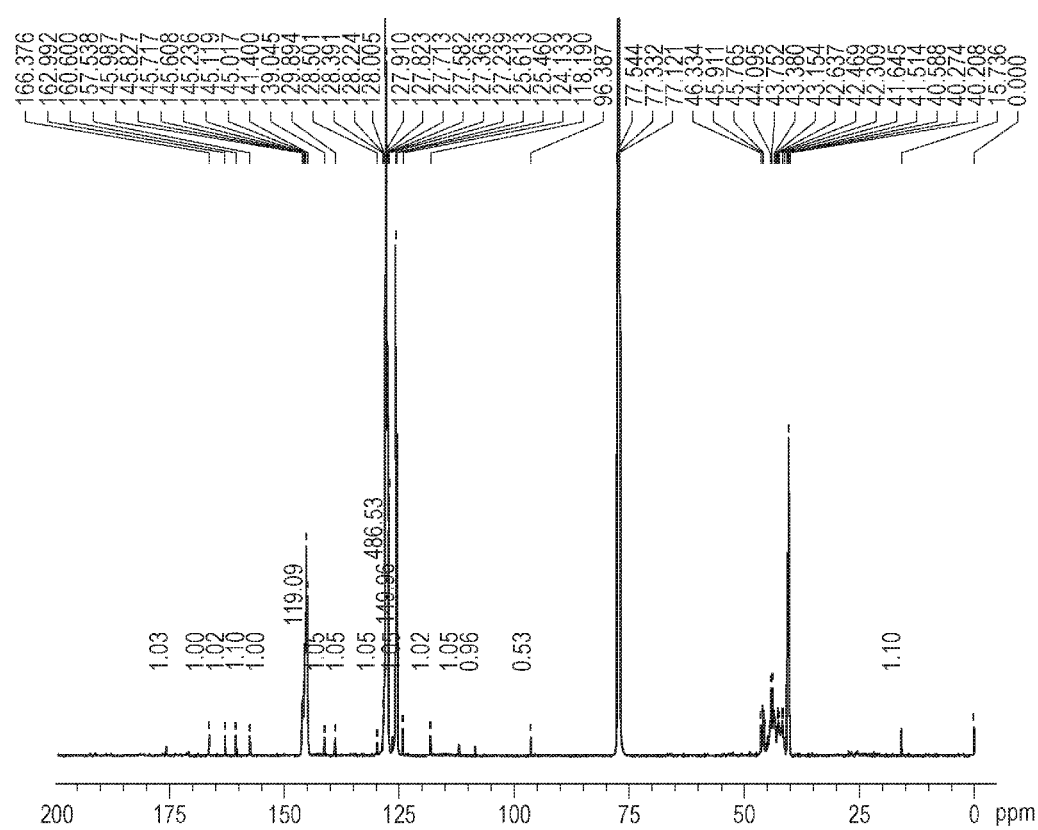
FIG. 3 is a view showing a $^{13}C$ NMR spectrum of a compound (142) of the present invention measured in $CDCl_3$ at room temperature and 150 MHz.

[1] Result of molecular weight measurement (GPC): weight average molecular weight (Mw)=11,339, number average molecular weight (Mn)=9,839
[2] Result of acid value measurement: 5.37 mgKOH/g
[3] Result of $^{13}C$ NMR (150 MHz, CDCl$_3$, room temperature) (see FIG. 3): δ[ppm]=175.6 (1C), 166.4 (1C), 163.0 (1C), 160.6 (1C), 157.5 (1C), 146.0-145.0 (119.1C), 141.4 (1C), 139.0 (1C), 129.9 (1C), 128.5-127.2, 125.6-125.5, 124.1 (1C), 118.2 (1C), 117.9 (1C), 112.0 (1C), 108.6-108.5 (1C), 46.3-40.2, 15.7 (1C)

From the data analysis result of the above $^{13}C$ NMR and the measurement result of the above number average molecular weight, when the number of the monomer units forming the compound (142) having an azo skeleton structure was calculated, the numbers of the styrene units and the azo skeleton structural units were 92 and 1, respectively.

Manufacturing Example of Compounds (102) to (140) Having Azo Skeleton Structure

Except that the raw materials were changed, compounds (102) to (140) each having an azo skeleton structure shown in Table 2 were manufactured by an operation similar to that of the above manufacturing examples of the compounds (101), (141), and (142) each having an azo skeleton structure.

The structures of the above high molecular portions are shown in the following Table 1, and the structures of the above compounds having an azo skeleton structure are shown in the following Table 2.

TABLE 1

High Molecular Portions

| High Molecular Portion No. | Chain Sequence of Monomer Units | Number of X | Number of $Y_1$ | Number of $Y_2$ | Number of Z | $R_{61}$ | $R_{62}$ | $R_{63}$ | $R_{64}$ | $R_{65}$ | $R_{66}$ |
|---|---|---|---|---|---|---|---|---|---|---|---|
| R-1 | poly(X-co-$Y_1$-co-Z) | 52 | 2 | 0 | 2 | H | H | COOCH$_3$ | — | — | H |
| R-2 | poly(X-co-$Y_1$-co-Z) | 101 | 4 | 0 | 4 | H | H | COOCH$_3$ | — | — | H |
| R-3 | poly(X-co-$Y_1$-co-Z) | 240 | 8 | 0 | 8 | H | H | COOCH$_3$ | — | — | H |
| R-4 | poly(X-co-$Y_1$-co-Z) | 101 | 2 | 0 | 6 | H | H | COOCH$_3$ | — | — | H |
| R-5 | poly(X-co-$Y_1$-co-Z) | 101 | 4 | 0 | 4 | CH$_3$ | CH$_3$ | COOC$_4$H$_9$(n) | — | — | H |
| R-6 | poly(X-co-$Y_1$-co-Z) | 240 | 14 | 0 | 5 | H | H | COOC$_4$H$_9$(n) | — | — | H |
| R-7 | poly(X-co-$Y_1$-co-Z) | 88 | 8 | 0 | 4 | H | H | COOCH$_2$CH(C$_2$H$_5$)C$_4$H$_9$ | — | — | H |
| R-8 | poly(X-co-$Y_1$-co-Z) | 88 | 8 | 0 | 4 | H | H | COOC$_{18}$H$_{37}$(n) | — | — | H |
| R-9 | poly(X-co-$Y_1$-co-Z) | 92 | 4 | 0 | 4 | H | H | COOC$_{22}$H$_{45}$(n) | — | — | H |
| R-10 | poly(X-co-$Y_1$-co-$Y_2$-co-Z) | 77 | 15 | 4 | 4 | H | H | COOCH$_3$ | H | COOC$_{22}$H$_{45}$(n) | H |
| R-11 | poly(X-co-$Y_1$-co-$Y_2$-co-Z) | 60 | 30 | 6 | 4 | H | H | COOC$_4$H$_9$(n) | H | COOC$_{22}$H$_{45}$(n) | H |
| R-12 | poly(X-co-Z) | 102 | 0 | 0 | 4 | H | — | — | — | — | H |
| R-13 | poly($Y_1$-co-Z) | 0 | 90 | 0 | 10 | — | H | COOC$_4$H$_9$(n) | — | — | H |
| R-14 | polyX-b-polyZ | 84 | 0 | 0 | 5 | H | — | — | — | — | H |
| R-15 | poly(X-co-$Y_1$)-b-polyZ | 74 | 14 | 0 | 2 | H | H | COOC$_4$H$_9$(n) | — | — | H |
| R-16 | α-W-polyX | 95 | 0 | 0 | 0 | H | — | — | — | — | — |
| R-17 | α-W-poly$Y_1$ | 0 | 101 | 0 | 0 | — | H | COOC$_4$H$_9$(n) | — | — | — |
| R-18 | α-W-poly(X-co-$Y_1$) | 71 | 18 | 0 | 0 | H | H | COOCH$_3$ | — | — | — |
| R-19 | poly(X-co-$Y_1$) | 110 | 4 | 0 | 3 | H | H | COOC$_{18}$H$_{37}$(n) | — | — | — |
| R-20 | poly(X-co-$Y_1$) | 110 | 4 | 0 | 3 | H | H | COOC$_{22}$H$_{45}$(n) | — | — | — |

[In Table 1, a prefix α represents a terminal group bonded to the left of the structure. W represents a COOH group, and X, $Y_1$, $Y_2$, and Z represent the monomer units shown below. (n) represents a linear alkyl group. co is a mark indicating that the sequence of indvidual monomer units forming the copolymer is disordered. b is a mark indicating that the sequence of individual monomer units forming the high molecular portion is formed of blocks.]

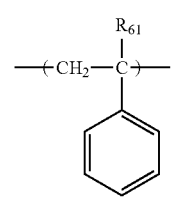

X

[In the formula (X), $R_{61}$ represents a hydrogen atom or an alkyl group.]

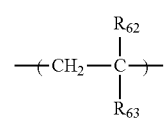

$Y_1$

[In the formula ($Y_1$), $R_{62}$ represents a hydrogen atom or an alkyl group, and $R_{63}$ represents a carboxylic acid ester group or a carboxylic acid amide group.]

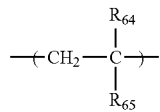

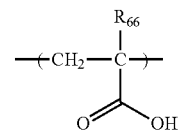

[In the formula ($Y_2$), $R_{64}$ represents a hydrogen atom or an alkyl group, and $R_{65}$ represents a carboxylic acid ester group or a carboxylic acid amide group.]

[In the formula (Z), $R_{66}$ represents a hydrogen atom or an alkyl group.]

TABLE 2

Compound Having Azo Skeleton Structure

| Compound | High Molecular Portion | Bonding moiety to High Molecular Portion | Number of Azo Skeleton Structures | $R_1$ | $R_2$ | $R_3$ | $R_{16}$ | $R_{17}$ | $R_{18}$ | $R_{19}$ | $R_{20}$ |
|---|---|---|---|---|---|---|---|---|---|---|---|
| 101 | R-4 | Z | 4 | H | $CONH_2$ | $CH_3$ | H | H | $L_2$ | H | H |
| 102 | R-1 | Z | 2 | H | $CONH_2$ | $CH_3$ | H | H | $L_2$ | H | H |
| 103 | R-2 | Z | 4 | H | $CONH_2$ | $CH_3$ | H | H | $L_2$ | H | H |
| 104 | R-3 | Z | 8 | H | $CONH_2$ | $CH_3$ | H | H | $L_2$ | H | H |
| 105 | R-2 | Z | 4 | H | $CONH_2$ | $CH_3$ | H | $L_2$ | H | H | H |
| 106 | R-2 | Z | 4 | H | $CONH_2$ | $CH_3$ | $L_2$ | H | H | H | H |
| 107 | R-2 | Z | 4 | H | $CONH_2$ | $CH_3$ | H | $L_2$ | H | $L_2$ | H |
| 108 | R-2 | Z | 4 | H | $CONH(CH_3)$ | $CH_3$ | H | H | $L_1$ | H | H |
| 109 | R-2 | Z | 4 | H | $CON(CH_3)_2$ | $CH_3$ | H | H | $L_1$ | H | H |
| 110 | R-2 | Z | 4 | H | $SO_3H$ | $CH_3$ | H | H | $L_1$ | H | H |
| 111 | R-2 | Z | 4 | H | H | $CH_3$ | H | H | $L_1$ | H | H |
| 112 | R-2 | Z | 4 | H | H | $NH_2$ | H | H | $L_1$ | H | H |
| 113 | R-2 | Z | 4 | H | H | $NH(CH_3)$ | H | H | $L_1$ | H | H |
| 114 | R-2 | Z | 4 | H | H | $N(CH_3)_2$ | H | H | $L_2$ | H | H |
| 115 | R-2 | Z | 4 | H | H | COOH | H | H | $L_2$ | H | H |
| 116 | R-2 | Z | 4 | H | H | $COOCH_3$ | H | H | $L_2$ | H | H |
| 117 | R-5 | Z | 4 | $L_3$ | H | $CH_3$ | H | H | $L_2$ | H | H |
| 118 | R-6 | Z | 4 | $CH_3$ | H | $CH_3$ | H | H | $L_2$ | H | H |
| 119 | R-7 | Z | 4 | Ph | H | $CH_3$ | H | H | $L_2$ | H | H |
| 120 | R-8 | Z | 4 | Bn | H | $CH_3$ | H | H | $L_3$ | H | H |
| 121 | R-9 | Z | 4 | H | $COOC_2H_5$ | H | H | H | $L_3$ | H | H |
| 122 | R-10 | Z | 4 | H | H | Ph | H | H | $L_3$ | H | H |
| 123 | R-11 | Z | 4 | H | H | OH | H | H | $L_3$ | H | H |
| 124 | R-12 | Z | 4 | H | H | $CONH_2$ | H | H | $L_3$ | H | H |
| 125 | R-13 | Z | 4 | H | H | $CH_2COOCH_3$ | H | H | $L_3$ | H | H |
| 126 | R-14 | Z | 4 | H | H | $C_2H_4COOCH_3$ | H | H | $L_3$ | H | H |
| 127 | R-16 | W | 1 | H | $CONH_2$ | $CH_3$ | H | H | $L_4$ | H | H |
| 128 | R-17 | W | 1 | H | $SO_3H$ | $CH_3$ | H | H | $L_5$ | H | H |
| 129 | R-16 | W | 1 | H | H | $CH_3$ | H | H | $L_6$ | H | H |
| 130 | R-18 | W | 1 | H | H | $NH_2$ | H | H | $L_7$ | H | H |
| 131 | R-16 | W | 1 | H | $CONH_2$ | $NH_2$ | H | H | $L_8$ | H | H |
| 132 | R-14 | Z | 3 | H | H | $CH_3$ | $COOCH_3$ | H | $L_2$ | H | H |
| 133 | R-14 | Z | 3 | H | H | $CH_3$ | H | $COOCH_3$ | $L_2$ | H | H |
| 134 | R-14 | Z | 3 | H | H | $CH_3$ | H | $L_2$ | $COOCH_3$ | H | H |
| 135 | R-14 | Z | 3 | H | H | $CH_3$ | $CONH_2$ | H | $L_2$ | H | H |
| 136 | R-14 | Z | 3 | H | H | $CH_3$ | H | $CONH_2$ | $L_2$ | H | H |
| 137 | R-14 | Z | 3 | H | H | $CH_3$ | H | $L_2$ | $CONH_2$ | H | H |
| 138 | R-14 | Z | 3 | $L_2$ | H | $CH_3$ | H | H | OH | H | H |
| 139 | R-14 | Z | 3 | $L_2$ | H | $CH_3$ | H | H | $OC_2H_5$ | H | H |
| 140 | R-15 | Z | 2 | H | $L_2$ | $CH_3$ | H | H | $C_{22}H_{45}(n)$ | H | H |
| 141 | R-20 | Z | 3 | H | $CONH_2$ | $CH_3$ | H | H | $L_3$ | H | H |
| 142 | R-16 | W | 1 | H | $CONH_2$ | $CH_3$ | H | H | $L_3$ | H | H |

Formula (3)

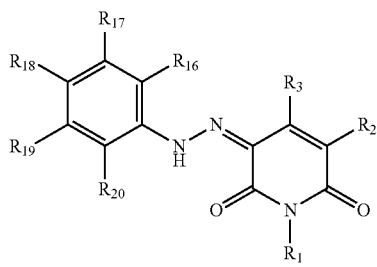

[In Table 2, $R_1$ to $R_3$ and $R_{16}$ to $R_{20}$ indicate $R_1$ to $R_3$ and $R_{16}$ to $R_{20}$ in the above formula (3), respectively. "Ph" represents an unsubstituted phenyl group, "Bn" represents an unsubstituted benzyl group, and (n) represents a linear alkyl group. In addition, in Table 2, a compound in which the "bonding moiety to high molecular portion" is represented by "W" indicates a compound which forms a linking group by bonding to a COOH group represented by "W" in the high molecular portion shown in Table 1. In addition, a compound in which the "bonding moiety to high molecular portion" is represented by "Z" indicates a compound which forms a linking group by bonding to a COOH group in the monomer unit "Z" in the high molecular portion shown in Table 1. $L_1$ to $L_8$ in Table 2 each represent a linking group and have the following structures.]

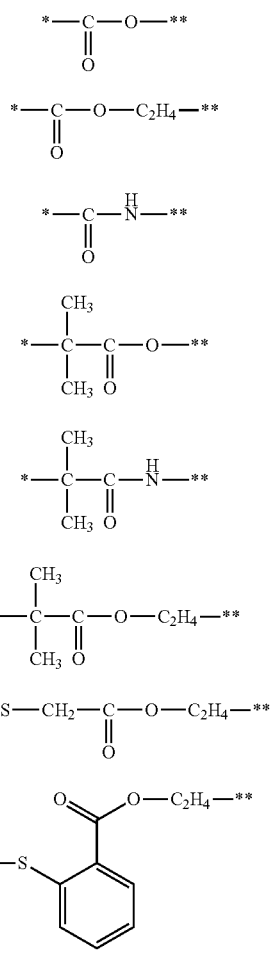

$L_1$ $L_2$ $L_3$ $L_4$ $L_5$ $L_6$ $L_7$ $L_8$

["*" in the above $L_1$ to $L_8$ represents a bonding position with a carbon atom in the high molecular portion shown in Table 1, and "**" represents a bonding position in the azo skeleton structure shown in Table 2.]

Comparative Example 1

Next, in accordance with a manufacturing example 1 (synthesis of example compound (a)) in the specification of Japanese Patent Laid-Open No. 2011-257707 (PTL 1), the following comparative compound (1) was synthesized.

Comparative Compound (1)

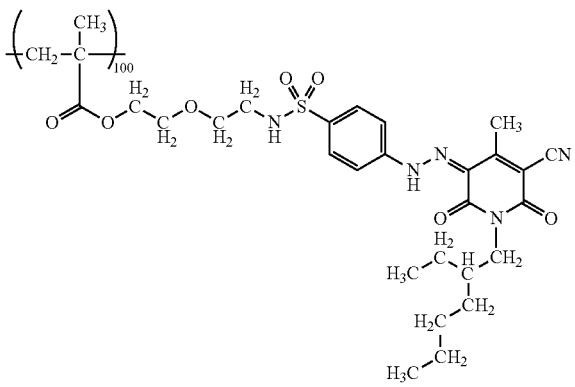

In accordance with an example 2 (dye compound synthetic example 3) in the specification of Japanese Patent Laid-Open No. 2012-067285 (PTL 3), the following comparative compound (3) was synthesized.

Comparative Compound (3)

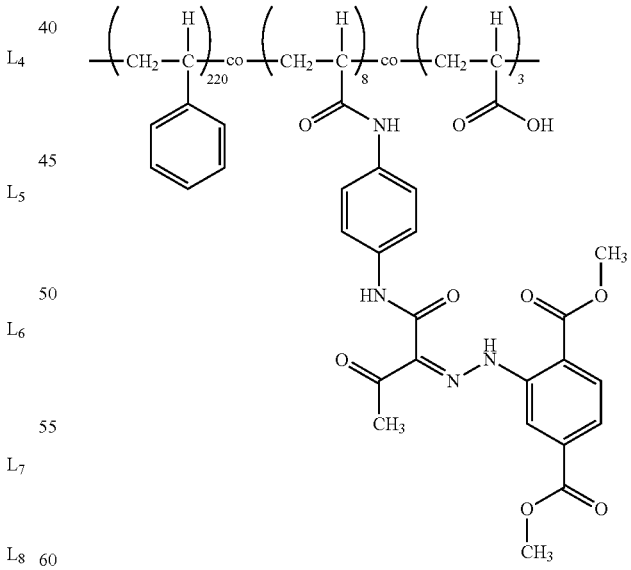

Example 2

Yellow pigment dispersions were prepared by the following method.

Preparation Example 1 of Yellow Pigment Dispersion

After a mixture was formed by mixing 18.0 parts of C.I. Pigment Yellow 155 represented by the following formula (Pig-A), 1.80 parts of the compound (101) having an azo skeleton structure, 180 parts of styrene functioning as a non-aqueous solvent, and 130 parts of glass beads (diameter: 1 mm), the mixture was dispersed for 3 hours by an attritor [manufactured by Nippon Coke & Engineering Co., Ltd.] and was then filtrated with a mesh, so that a yellow pigment dispersion (Dis-Y1) was obtained.

Preparation Example 2 of Yellow Pigment Dispersion

Except that the compound (101) having an azo skeleton structure was changed to the compounds (102) to (142) each having an azo skeleton structure, yellow pigment dispersions (Dis-Y2) to (Dis-Y42) were obtained by an operation similar to that in the above preparation example 1 of yellow pigment dispersion.

Preparation Example 3 of Yellow Pigment Dispersion

Except that C.I. Pigment Yellow 155 represented by the formula (Pig-A) was changed to C.I. Pigment Yellow 180 represented by the following formula (Pig-B) and C.I. Pigment Yellow 185 represented by the following formula (Pig-C), yellow pigment dispersions (Dis-Y43) and (Dis-Y44) were obtained by an operation similar to that in the above preparation example 1 of yellow pigment dispersion.

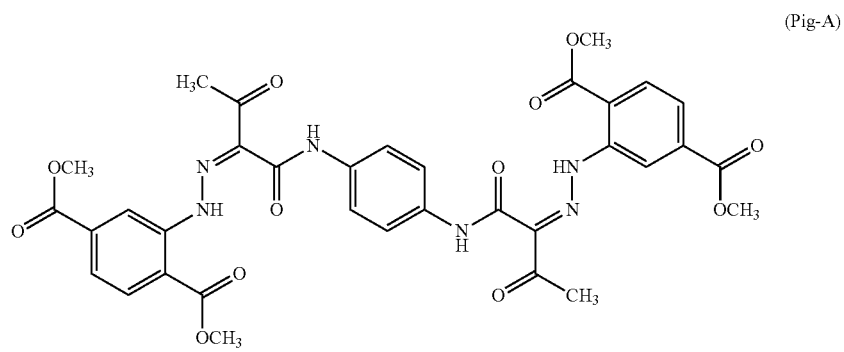 [SMILES: COC(=O)c1ccc(C(=O)OC)c(N/N=C(/C(C)=O)C(=O)Nc2ccc(NC(=O)/C(=N\Nc3cc(C(=O)OC)ccc3C(=O)OC)C(C)=O)cc2)c1]

(Pig-A)

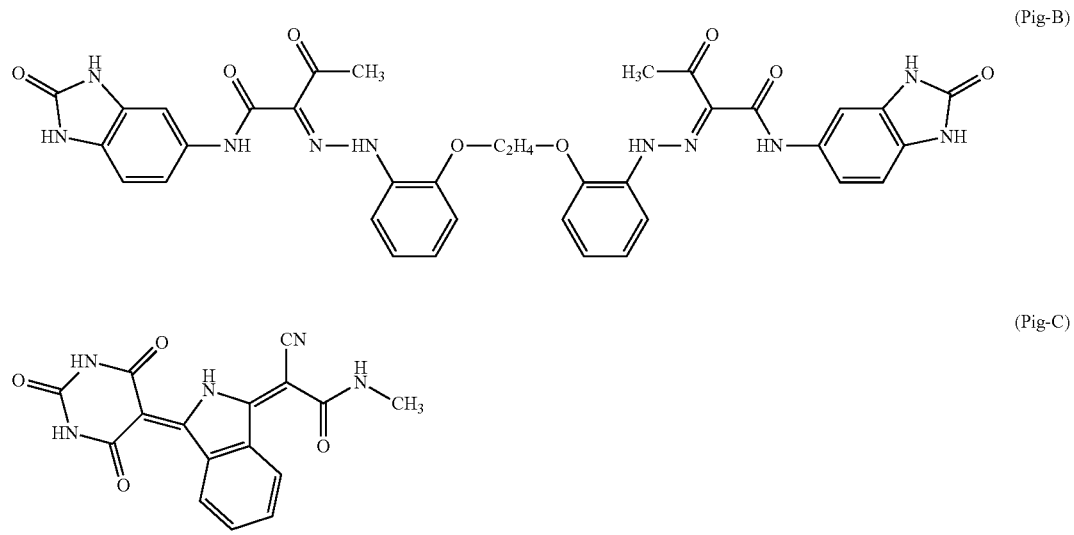

(Pig-B)

(Pig-C)

Preparation Example 4 of Yellow Pigment Dispersion

First, 42.0 parts of C.I. Pigment Yellow 155 represented by the formula (Pig-A) and 4.2 parts of the compound (101) having an azo skeleton structure were mixed together in a dry state by a hybridization system NHS-0 [manufactured by Nara Machinery Co., Ltd.], so that a pigment composition was prepared. Subsequently, after 19.8 parts of the obtained pigment composition, 180 parts of styrene, and 130 parts of glass beads (diameter: 1 mm) were mixed together and then dispersed for 1 hour by a paint shaker [manufactured by Toyo Seiki Seisaku-sho, Ltd.], filtration was performed with a mesh, so that a yellow pigment dispersion (Dis-Y45) was obtained.

Comparative Example 2

Standard yellow pigment dispersions each used as the standard of evaluation and comparative yellow pigment dispersions were prepared by the following methods.

Preparation Example 1 of Standard Yellow Pigment Dispersion

Except that the compound (101) having an azo skeleton structure was not added, a standard yellow pigment dispersion (Dis-Y46) was obtained by an operation similar to that in the above preparation example 4 of yellow pigment dispersion.

Preparation Example 2 of Standard Yellow Pigment Dispersion

Except that the compound (101) having an azo skeleton structure was not added, a standard yellow pigment dispersion (Dis-Y47) was obtained by an operation similar to that in the above preparation example 1 of yellow pigment dispersion.

Preparation Example 3 of Standard Yellow Pigment Dispersion

Except that the compound (101) having an azo skeleton structure was not added, standard yellow pigment dispersions (Dis-Y48) and (Dis-Y49) were obtained by an operation similar to that in the above preparation example 3 of yellow pigment dispersion.

Preparation Example 1 of Comparative Yellow Pigment Dispersion

Except that the compound (101) having an azo skeleton structure was changed to the comparative compound (1) disclosed in PTL 1, a styrene/butyl acrylate [copolymer ratio (mass ratio)=95/5] block copolymer disclosed in PTL 2 (Mw: 9,718) (comparative compound 2), the comparative compound (3) disclosed in PTL 3, a high molecular dispersant [product name: Disparlon DA-703-50, manufactured by Kusumoto Chemicals, Ltd.] disclosed in PTL 4 (comparative compound 4), and a methyl methacrylate/sodium styrene sulfonate copolymer (Mw: 14,600) (comparative compound 5), comparative yellow pigment dispersions (Dis-Y50) to (Dis-Y54) were obtained by an operation similar to that in the above preparation example 1 of yellow pigment dispersion.

Example 3

Magenta pigment dispersions were prepared by the following method.

Preparation Example 1 of Magenta Pigment Dispersion

After a mixture was formed by mixing 18.0 parts of C.I. Pigment Red 122 represented by the following formula (Pig-D), 1.80 parts of the compound (101) having an azo skeleton structure, 180 parts of styrene functioning as a non-aqueous solvent, and 130 parts of glass beads (diameter: 1 mm), the mixture was dispersed for 3 hours by an attritor [manufactured by Nippon Coke & Engineering Co., Ltd.] and was then filtrated with a mesh, so that a magenta pigment dispersion (Dis-M1) was obtained.

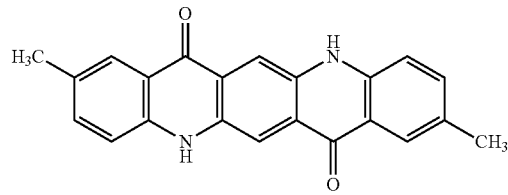

(Pig-D)

Preparation Example 2 of Magenta Pigment Dispersion

Except that the compound (101) having an azo skeleton structure was changed to the compounds (102) to (142) each having an azo skeleton structure, magenta pigment dispersions (Dis-M2) to (Dis-M42) were obtained by an operation similar to that in the above preparation example 1 of magenta pigment dispersion.

Preparation Example 3 of Magenta Pigment Dispersion

Except that C.I. Pigment Red 122 represented by the formula (Pig-D) was changed to C.I. Pigment Red 202 represented by the following formula (Pig-E) and C.I. Pigment Red 255 represented by the following formula (Pig-F), magenta pigment dispersions (Dis-M43) and (Dis-M44) were obtained by an operation similar to that in the above preparation example 1 of magenta pigment dispersion.

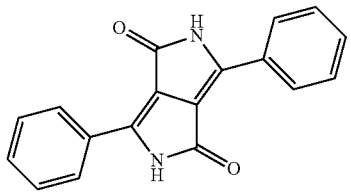

(Pig-E)

-continued

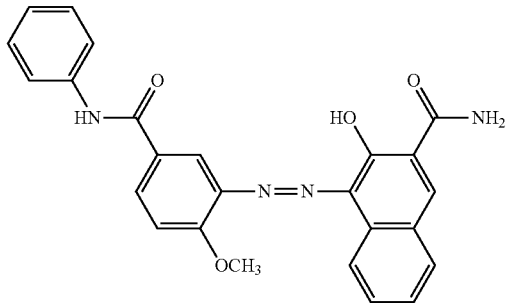

(Pig-F)

Preparation Example 4 of Magenta Pigment Dispersion

First, 42.0 parts of C.I. Pigment Red 122 represented by the formula (Pig-D) as a magenta pigment and 4.2 parts of the compound (101) having an azo skeleton structure were mixed together in a dry state by a hybridization system NHS-0 [manufactured by Nara Machinery Co., Ltd.], so that a pigment composition was prepared. Subsequently, after 19.8 parts of the obtained pigment composition, 180 parts of styrene, and 130 parts of glass beads (diameter: 1 mm) were mixed together and then dispersed for 1 hour by a paint shaker [manufactured by Toyo Seiki Seisaku-sho, Ltd.], filtration was performed with a mesh, so that a magenta pigment dispersion (Dis-M45) was obtained.

Comparative Example 3

Standard magenta pigment dispersions each used as the standard of evaluation and comparative magenta pigment dispersions were prepared by the following methods.

Preparation Example 1 of Standard Magenta Pigment Dispersion

Except that the compound (101) having an azo skeleton structure was not added, a standard magenta pigment dispersion (Dis-M46) was obtained by an operation similar to that in the above preparation example 4 of magenta pigment dispersion.

Preparation Example 2 of Standard Magenta Pigment Dispersion

Except that the compound (101) having an azo skeleton structure was not added, a standard magenta pigment dispersion (Dis-M47) was obtained by an operation similar to that in the above preparation example 1 of magenta pigment dispersion.

Preparation Example 3 of Standard Magenta Pigment Dispersion

Except that the compound (101) having an azo skeleton structure was not added, standard magenta pigment dispersions (Dis-M48) and (Dis-M49) were obtained by an operation similar to that in the above preparation example 3 of magenta pigment dispersion.

Preparation Example 1 of Comparative Magenta Pigment Dispersion

Except that the compound (101) having an azo skeleton structure was changed to the comparative compound (1) disclosed in PTL 1, the styrene/butyl acrylate [copolymer ratio (mass ratio)=95/5] block copolymer disclosed in PTL 2 (Mw: 9,718) (comparative compound 2), the comparative compound (3) disclosed in PTL 3, the high molecular dispersant [product name: Disparlon DA-703-50, manufactured by Kusumoto Chemicals, Ltd.] disclosed in PTL 4 (comparative compound 4), and the methyl methacrylate/sodium styrene sulfonate copolymer (Mw: 14,600) (comparative compound 5), comparative magenta pigment dispersions (Dis-M50) to (Dis-M54) were obtained by an operation similar to that in the above preparation example 1 of magenta pigment dispersion.

Example 4

Cyan pigment dispersions were prepared by the following method.

Preparation Example 1 of Cyan Pigment Dispersion

After a mixture was formed by mixing 18.0 parts of C.I. Pigment Blue 15:3 represented by the following formula (Pig-G), 1.80 parts of the compound (101) having an azo skeleton structure, 180 parts of styrene functioning as a non-aqueous solvent, and 130 parts of glass beads (diameter: 1 mm), the mixture was dispersed for 3 hours by an attritor [manufactured by Nippon Coke & Engineering Co., Ltd.] and was then filtrated with a mesh, so that a cyan pigment dispersion (Dis-C1) was obtained.

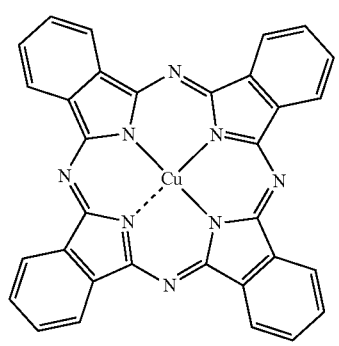

(Pig-G)

Preparation Example 2 of Cyan Pigment Dispersion

Except that the compound (101) having an azo skeleton structure was changed to the compounds (102) to (142) each having an azo skeleton structure, cyan pigment dispersions (Dis-C2) to (Dis-C42) were obtained by an operation similar to that in the above preparation example 1 of cyan pigment dispersion.

Preparation Example 3 of Cyan Pigment Dispersion

Except that C.I. Pigment Blue 15:3 represented by the formula (Pig-G) was changed to C.I. Pigment Blue 16 represented by the following formula (Pig-H) and C.I. Pigment blue 17:1 represented by the following formula (Pig-I), cyan pigment dispersions (Dis-C43) and (Dis-C44) were obtained by an operation similar to that in the above preparation example 1 of cyan pigment dispersion.

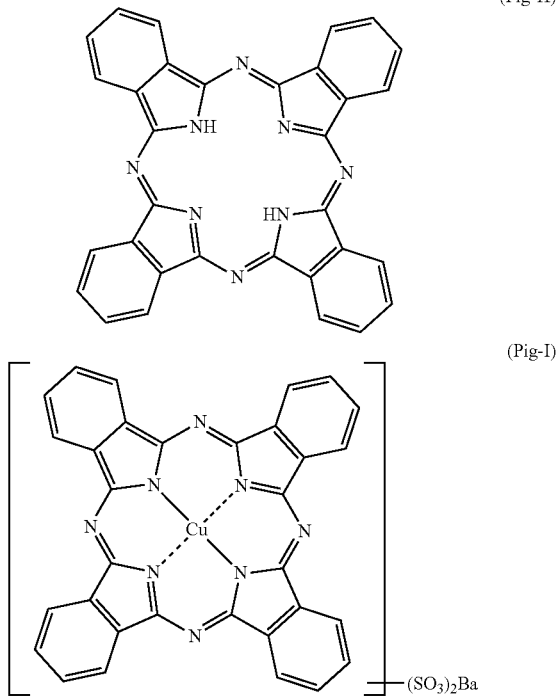

(Pig-H)

(Pig-I)

Preparation Example 4 of Cyan Pigment Dispersion

First, 42.0 parts of C.I. Pigment Blue 15:3 represented by the formula (Pig-G) and 4.2 parts of the compound (101) having an azo skeleton structure were mixed together in a dry state by a hybridization system NHS-0 [manufactured by Nara Machinery Co., Ltd.], so that a pigment composition was prepared. Subsequently, after 19.8 parts of the obtained pigment composition, 180 parts of styrene, and 130 parts of glass beads (diameter: 1 mm) were mixed together and then dispersed for 1 hour by a paint shaker [manufactured by Toyo Seiki Seisaku-sho, Ltd.], filtration was performed with a mesh, so that a cyan pigment dispersion (Dis-C45) was obtained.

Comparative Example 4

Standard cyan pigment dispersions each used as the standard of evaluation and comparative cyan pigment dispersions were prepared by the following methods.

Preparation Example 1 of Standard Cyan Pigment Dispersion

Except that the compound (101) having an azo skeleton structure was not added, a standard cyan pigment dispersion (Dis-C46) was obtained by an operation similar to that in the above preparation example 4 of cyan pigment dispersion.

Preparation Example 2 of Standard Cyan Pigment Dispersion

Except that the compound (101) having an azo skeleton structure was not added, a standard cyan pigment dispersion (Dis-C47) was obtained by an operation similar to that in the above preparation example 1 of cyan pigment dispersion.

Preparation Example 3 of Standard Cyan Pigment Dispersion

Except that the compound (101) having an azo skeleton structure was not added, standard cyan pigment dispersions (Dis-C48) and (Dis-C49) were obtained by an operation similar to that in the above preparation example 3 of cyan pigment dispersion.

Preparation Example 1 of Comparative Cyan Pigment Dispersion

Except that the compound (101) having an azo skeleton structure was changed to the comparative compound (1) disclosed in PTL 1, the styrene/butyl acrylate [copolymer ratio (mass ratio)=95/5] block copolymer disclosed in PTL 2 (Mw: 9,718) (comparative compound 2), the comparative compound (3) disclosed in PTL 3, the high molecular dispersant [product name: Disparlon DA-703-50, manufactured by Kusumoto Chemicals, Ltd.] disclosed in PTL 4 (comparative compound 4), and the methyl methacrylate/sodium styrene sulfonate copolymer (Mw: 14,600) (comparative compound 5), comparative cyan pigment dispersions (Dis-C50) to (Dis-C54) were obtained by an operation similar to that in the above preparation example 1 of cyan pigment dispersion.

Example 5

Black pigment dispersions were prepared by the following method.

Preparation Example 1 of Black Pigment Dispersion

After a mixture was formed by mixing 30.0 parts of carbon black (specific surface area: 65 m$^2$/g, average particle diameter: 30 nm, pH: 9.0) (pig-J), 3.0 parts of the compound (101) having an azo skeleton structure, 150 parts of styrene functioning as a non-aqueous solvent, and 130 parts of glass beads (diameter: 1 mm), the mixture was dispersed for 3 hours by an attritor [manufactured by Nippon Coke & Engineering Co., Ltd.] and was then filtrated with a mesh, so that a black pigment dispersion (Dis-Bk1) of the present invention was obtained.

Preparation Example 2 of Black Pigment Dispersion

Except that the compound (101) having an azo skeleton structure was changed to the compounds (102) to (142) each having an azo skeleton structure, black pigment dispersions (Dis-Bk2) to (Dis-Bk42) were obtained by an operation similar to that in the above preparation example 1 of black pigment dispersion.

Preparation Example 3 of Black Pigment Dispersion

Except that carbon black (specific surface area: 65 m$^2$/g, average particle diameter: 30 nm, pH: 9.0) (pig-J) was changed to carbon black (specific surface area: 77 m$^2$/g, average particle diameter: 28 nm, pH: 7.5) (pig-K) and carbon black (specific surface area: 37 m$^2$/g, average particle diameter: 13 nm, pH: 3.0) (pig-L), black pigment dispersions (Dis-Bk43) and (Dis-Bk44) were obtained by an operation similar to that in the above preparation example 1 of black pigment dispersion.

Preparation Example 4 of Black Pigment Dispersion

First, 42.0 parts of carbon black (specific surface area: 65 m$^2$/g, average particle diameter: 30 nm, pH: 9.0) (pig-j) and 4.2 parts of the compound (101) having an azo skeleton structure were mixed together in a dry state by a hybridization system NHS-0 [manufactured by Nara Machinery Co., Ltd.], so that a pigment composition was prepared. Subsequently, after 33.0 parts of the obtained pigment composition, 150 parts of styrene, and 130 parts of glass beads (diameter: 1 mm) were mixed together and then dispersed for 1 hour by a paint shaker [manufactured by Toyo Seiki Seisaku-sho, Ltd.], filtration was performed with a mesh, so that a black pigment dispersion (Dis-Bk45) was obtained.

Comparative Example 5

Standard black pigment dispersions each used as the standard of evaluation and comparative black pigment dispersions were prepared by the following methods.

Preparation Example 1 of Standard Black Pigment Dispersion

Except that the compound (101) having an azo skeleton structure was not added, a standard black pigment dispersion (Dis-Bk46) was obtained by an operation similar to that in the above preparation example 4 of black pigment dispersion.

Preparation Example 2 of Standard Black Pigment Dispersion

Except that the compound (101) having an azo skeleton structure was not added, a standard black pigment dispersion (Dis-Bk47) was obtained by an operation similar to that in the above preparation example 1 of black pigment dispersion.

Preparation Example 3 of Standard Black Pigment Dispersion

Except that the compound (101) having an azo skeleton structure was not added, standard black pigment dispersions (Dis-Bk48) and (Dis-Bk49) were obtained by an operation similar to that in the above preparation example 3 of black pigment dispersion.

Preparation Example 1 of Comparative Black Pigment Dispersion

Except that the compound (101) having an azo skeleton structure was changed to the comparative compound (1) disclosed in PTL 1, the styrene/butyl acrylate [copolymer ratio (mass ratio)=95/5] block copolymer disclosed in PTL 2 (Mw: 9,718) (comparative compound 2), the comparative compound (3) disclosed in PTL 3, the high molecular dispersant [product name: Disparlon DA-703-50, manufactured by Kusumoto Chemicals, Ltd.] disclosed in PTL 4 (comparative compound 4), and the methyl methacrylate/sodium styrene sulfonate copolymer (Mw: 14,600) (comparative compound 5), comparative black pigment dispersions (Dis-Bk50) to (Dis-Bk54) were obtained by an operation similar to that in the above preparation example 1 of black pigment dispersion.

Example 6

The pigment dispersions of each color were evaluated by the following method.
Evaluation of Pigment Dispersibility By a gloss test of a coated film obtained by using each of the yellow pigment dispersions (Dis-Y1) to (Dis-Y45), the magenta pigment dispersions (Dis-M1) to (Dis-M45), the cyan pigment dispersions (Dis-C1) to (Dis-C45), and the black pigment dispersions (Dis-Bk1) to (Dis-Bk45), the pigment dispersibility of the compound having an azo skeleton structure of the present invention was evaluated. A concrete evaluation method is as described below.

The pigment dispersion was sampled using a dropper and then placed on an upper portion of a super art sheet [SA Kinfuji 180 kg 80×160, manufactured by Ohji Paper Co., Ltd.] to form a linear line. Subsequently, this pigment dispersion was uniformly applied on the art sheet with a wire bar (#10), and after drying is performed, the gloss (reflection angle: 75°) was measured with Gloss Meter VG2000 [Nippon Denshoku Industries Co., Ltd.], and evaluation was performed in accordance with the following standards. Incidentally, as the pigment is more finely dispersed, the smoothness of the coated film is improved, and as a result, the gloss is improved.

An improvement rate of glossiness of each of the yellow pigment dispersions (Dis-Y1) to (Dis-Y42) was obtained based on the standard value which was the glossiness of the standard yellow pigment dispersion (Dis-Y47). An improvement rate of glossiness of the yellow pigment dispersion (Dis-Y43) was obtained based on the standard value which was the glossiness of the standard yellow pigment dispersion (Dis-Y48). An improvement rate of glossiness of the yellow pigment dispersion (Dis-Y44) was obtained based on the standard value which was the glossiness of the standard yellow pigment dispersion (Dis-Y49). An improvement rate of glossiness of the yellow pigment dispersion (Dis-Y45) was obtained based on the standard value which was the glossiness of the standard yellow pigment dispersion (Dis-Y46).

An improvement rate of glossiness of each of the magenta pigment dispersions (Dis-M1) to (Dis-M42) was obtained based on the standard value which was the glossiness of the standard magenta pigment dispersion (Dis-M47). An improvement rate of glossiness of the magenta pigment dispersion (Dis-M43) was obtained based on the standard value which was the glossiness of the standard magenta pigment dispersion (Dis-M48). An improvement rate of glossiness of the magenta pigment dispersion (Dis-M44) was obtained based on the standard value which was the glossiness of the standard magenta pigment dispersion (Dis-M49). An improvement rate of glossiness of the magenta pigment dispersion (Dis-M45) was obtained based on the standard value which was the glossiness of the standard magenta pigment dispersion (Dis-M46).

An improvement rate of glossiness of each of the cyan pigment dispersions (Dis-C1) to (Dis-C42) was obtained based on the standard value which was the glossiness of the standard cyan pigment dispersion (Dis-C47). An improvement rate of glossiness of the cyan pigment dispersion (Dis-C43) was obtained based on the standard value which was the glossiness of the standard cyan pigment dispersion (Dis-C48) An improvement rate of glossiness of the cyan pigment dispersion (Dis-C44) was obtained based on the standard value which was the glossiness of the standard cyan pigment dispersion (Dis-C49). An improvement rate of glossiness of the cyan pigment dispersion (Dis-C45) was obtained based on the standard value which was the glossiness of the standard cyan pigment dispersion (Dis-C46).

Hereinafter, the evaluation standard of the pigment dispersion of each color is shown below.

Evaluation Standard of Yellow Pigment Dispersion
A: The improvement rate of glossiness is 10% or more.
B: The improvement rate of glossiness is 5% to less than 10%.
C: The improvement rate of glossiness is 0% to less than 5%.
D: The glossiness is decreased.
When the improvement rate of glossiness is 5% or more, the pigment dispersibility is evaluated as good.

Evaluation Standard of Magenta Pigment Dispersion
A: The improvement rate of glossiness is 35% or more.
B: The improvement rate of glossiness is 204 to less than 35%.
C: The improvement rate of glossiness is 5% to less than 20%.
D: The improvement rate of glossiness is less than 5%.
When the improvement rate of glossiness is 20 or more, the pigment dispersibility is evaluated as good.

Evaluation Standard of Cyan Pigment Dispersion
A: The improvement rate of glossiness is 25% or more.
B: The improvement rate of glossiness is 15% to less than 25%.
C: The improvement rate of glossiness is 5% to less than 15%.
D: The improvement rate of glossiness is less than 5%.
When the improvement rate of glossiness is 15% or more, the pigment dispersibility is evaluated as good.

Evaluation Standard of Black Pigment Dispersion
A: The glossiness is 80 more.
B: The glossiness is 50 to less than 80.
C: The glossiness is 20 to less than 50.
D: The glossiness is less than 20.
When the glossiness is 50 or more, the pigment dispersibility is evaluated as good.

Comparative Example 6

The gloss of each of the comparative yellow pigment dispersions (Dis-Y50) to (Dis-Y54), the comparative magenta pigment dispersions (Dis-M50) to (Dis-M54), the comparative cyan pigment dispersions (Dis-C50) to (Dis-C54), and the comparative black pigment dispersions (Dis-Bk50) to (Dis-Bk54) was evaluated by a method similar to that in Example 6.

In addition, an improvement rate of glossiness of each of the comparative yellow pigment dispersions (Dis-Y50) to (Dis-Y54) was obtained based on the glossiness of the standard yellow pigment dispersion (Dis-Y47). An improvement rate of glossiness of each of the comparative magenta pigment dispersions (Dis-M50) to (Dis-M54) was obtained based on the glossiness of the standard magenta pigment dispersion (Dis-M47). An improvement rate of glossiness of each of the comparative cyan pigment dispersions (Dis-C50) to (Dis-C54) was obtained based on the glossiness of the standard cyan pigment dispersion (Dis-C47).

The evaluation results of the yellow pigment dispersions, the magenta pigment dispersions, the cyan pigment dispersions, and the black pigment dispersions are shown in Tables 3-1 to 3-4.

TABLE 3-1

Evaluation Result of Pigment dispersion of Present Invention

| Pigment dispersion | | Pigment | Compound | Evaluation (Glossiness) |
|---|---|---|---|---|
| Dis-Y1 | Present invention | Pig-A | 101 | A(69) |
| Dis-Y2 | Present invention | Pig-A | 102 | A(69) |
| Dis-Y3 | Present invention | Pig-A | 103 | A(70) |
| Dis-Y4 | Present invention | Pig-A | 104 | A(69) |
| Dis-Y5 | Present invention | Pig-A | 105 | A(70) |
| Dis-Y6 | Present invention | Pig-A | 106 | A(69) |
| Dis-Y7 | Present invention | Pig-A | 107 | A(69) |
| Dis-Y8 | Present invention | Pig-A | 108 | A(70) |
| Dis-Y9 | Present invention | Pig-A | 109 | A(69) |
| Dis-Y10 | Present invention | Pig-A | 110 | A(70) |
| Dis-Y11 | Present invention | Pig-A | 111 | A(67) |
| Dis-Y12 | Present invention | Pig-A | 112 | A(67) |
| Dis-Y13 | Present invention | Pig-A | 113 | A(68) |
| Dis-Y14 | Present invention | Pig-A | 114 | A(68) |
| Dis-Y15 | Present invention | Pig-A | 115 | A(67) |
| Dis-Y16 | Present invention | Pig-A | 116 | A(67) |
| Dis-Y17 | Present invention | Pig-A | 117 | A(63) |
| Dis-Y18 | Present invention | Pig-A | 118 | A(64) |
| Dis-Y19 | Present invention | Pig-A | 119 | A(64) |
| Dis-Y20 | Present invention | Pig-A | 120 | A(63) |
| Dis-Y21 | Present invention | Pig-A | 121 | A(65) |
| Dis-Y22 | Present invention | Pig-A | 122 | A(65) |
| Dis-Y23 | Present invention | Pig-A | 123 | A(66) |
| Dis-Y24 | Present invention | Pig-A | 124 | A(65) |
| Dis-Y25 | Present invention | Pig-A | 125 | A(67) |
| Dis-Y26 | Present invention | Pig-A | 126 | A(67) |
| Dis-Y27 | Present invention | Pig-A | 127 | A(69) |
| Dis-Y28 | Present invention | Pig-A | 128 | A(69) |
| Dis-Y29 | Present invention | Pig-A | 129 | A(68) |
| Dis-Y30 | Present invention | Pig-A | 130 | A(67) |
| Dis-Y31 | Present invention | Pig-A | 131 | A(70) |
| Dis-Y32 | Present invention | Pig-A | 132 | A(68) |
| Dis-Y33 | Present invention | Pig-A | 133 | A(67) |
| Dis-Y34 | Present invention | Pig-A | 134 | A(68) |
| Dis-Y35 | Present invention | Pig-A | 135 | A(68) |
| Dis-Y36 | Present invention | Pig-A | 136 | A(67) |
| Dis-Y37 | Present invention | Pig-A | 137 | A(67) |
| Dis-Y38 | Present invention | Pig-A | 138 | A(64) |
| Dis-Y39 | Present invention | Pig-A | 139 | A(63) |
| Dis-Y40 | Present invention | Pig-A | 140 | A(66) |
| Dis-Y41 | Present invention | Pig-A | 141 | A(69) |
| Dis-Y42 | Present invention | Pig-A | 142 | A(70) |
| Dis-Y43 | Present invention | Pig-B | 101 | A(70) |
| Dis-Y44 | Present invention | Pig-C | 101 | A(71) |
| Dis-Y45 | Present invention | Pig-A | 101 | A(69) |
| Dis-Y46 | Standard | Pig-A | None | (57) |
| Dis-Y47 | Standard | Pig-A | None | (57) |
| Dis-Y48 | Standard | Pig-B | None | (60) |
| Dis-Y49 | Standard | Pig-C | None | (53) |
| Dis-Y50 | Comparative Example | Pig-A | Comparative Compound (1) | A(69) |
| Dis-Y51 | Comparative Example | Pig-A | Comparative Compound (2) | C(59) |
| Dis-Y52 | Comparative Example | Pig-A | Comparative Compound (3) | B(61) |
| Dis-Y53 | Comparative Example | Pig-A | Comparative Compound (4) | B(60) |
| Dis-Y54 | Comparative Example | Pig-A | Comparative Compound (5) | B(60) |

TABLE 3-2

Evaluation Result of Pigment dispersion of Present Invention

| Pigment dispersion | | Pigment | Compound | Evaluation (Glossiness) |
|---|---|---|---|---|
| Dis-M1 | Present invention | Pig-D | 101 | A(72) |
| Dis-M2 | Present invention | Pig-D | 102 | A(73) |
| Dis-M3 | Present invention | Pig-D | 103 | A(72) |
| Dis-M4 | Present invention | Pig-D | 104 | A(72) |
| Dis-M5 | Present invention | Pig-D | 105 | A(73) |
| Dis-M6 | Present invention | Pig-D | 106 | A(72) |
| Dis-M7 | Present invention | Pig-D | 107 | A(73) |
| Dis-M8 | Present invention | Pig-D | 108 | A(72) |
| Dis-M9 | Present invention | Pig-D | 109 | a(73) |
| Dis-M10 | Present invention | Pig-D | 110 | A(72) |
| Dis-M11 | Present invention | Pig-D | 111 | A(70) |
| Dis-M12 | Present invention | Pig-D | 112 | A(69) |
| Dis-M13 | Present invention | Pig-D | 113 | A(69) |
| Dis-M14 | Present invention | Pig-D | 114 | A(69) |
| Dis-M15 | Present invention | Pig-D | 115 | A(70) |
| Dis-M16 | Present invention | Pig-D | 116 | A(69) |
| Dis-M17 | Present invention | Pig-D | 117 | A(64) |
| Dis-M18 | Present invention | Pig-D | 118 | A(65) |
| Dis-M19 | Present invention | Pig-D | 119 | A(64) |
| Dis-M20 | Present invention | Pig-D | 120 | A(65) |
| Dis-M21 | Present invention | Pig-D | 121 | A(66) |
| Dis-M22 | Present invention | Pig-D | 122 | A(66) |
| Dis-M23 | Present invention | Pig-D | 123 | A(66) |
| Dis-M24 | Present invention | Pig-D | 124 | A(67) |
| Dis-M25 | Present invention | Pig-D | 125 | A(69) |
| Dis-M26 | Present invention | Pig-D | 126 | A(70) |
| Dis-M27 | Present invention | Pig-D | 127 | A(72) |
| Dis-M28 | Present invention | Pig-D | 128 | A(73) |
| Dis-M29 | Present invention | Pig-D | 129 | A(69) |
| Dis-M30 | Present invention | Pig-D | 130 | A(70) |
| Dis-M31 | Present invention | Pig-D | 131 | A(72) |
| Dis-M32 | Present invention | Pig-D | 132 | A(70) |
| Dis-M33 | Present invention | Pig-D | 133 | A(69) |
| Dis-M34 | Present invention | Pig-D | 134 | A(69) |
| Dis-M35 | Present invention | Pig-D | 135 | A(69) |
| Dis-M36 | Present invention | Pig-D | 136 | A(70) |
| Dis-M37 | Present invention | Pig-D | 137 | A(70) |
| Dis-M38 | Present invention | Pig-D | 138 | A(64) |
| Dis-M39 | Present invention | Pig-D | 139 | A(65) |
| Dis-M40 | Present invention | Pig-D | 140 | A(68) |
| Dis-M41 | Present invention | Pig-D | 141 | A(72) |
| Dis-M42 | Present invention | Pig-D | 142 | A(73) |
| Dis-M43 | Present invention | Pig-E | 101 | A(60) |
| Dis-M44 | Present invention | Pig-F | 101 | A(85) |
| Dis-M45 | Present invention | Pig-D | 101 | A(72) |
| Dis-M46 | Standard | Pig-D | None | (48) |
| Dis-M47 | Standard | Pig-D | None | (47) |
| Dis-M48 | Standard | Pig-E | None | (30) |
| Dis-M49 | Standard | Pig-F | None | (56) |
| Dis-M50 | Comparative Example | Pig-D | Comparative Compound (1) | B(58) |
| Dis-M51 | Comparative Example | Pig-D | Comparative Compound (2) | C(56) |
| Dis-M52 | Comparative Example | Pig-D | Comparative Compound (3) | A(66) |
| Dis-M53 | Comparative Example | Pig-D | Comparative Compound (4) | B(62) |
| Dis-M54 | Comparative Example | Pig-D | Comparative Compound (5) | B(63) |

TABLE 3-3

Evaluation Result of Pigment dispersion of Present Invention

| Pigment dispersion | | Pigment | Compound | Evaluation (Glossiness) |
|---|---|---|---|---|
| Dis-C1 | Present invention | Pig-G | 101 | A(63) |
| Dis-C2 | Present invention | Pig-G | 102 | A(63) |
| Dis-C3 | Present invention | Pig-G | 103 | A(64) |
| Dis-C4 | Present invention | Pig-G | 104 | A(63) |
| Dis-C5 | Present invention | Pig-G | 105 | A(64) |
| Dis-C6 | Present invention | Pig-G | 106 | A(64) |
| Dis-C7 | Present invention | Pig-G | 107 | A(63) |
| Dis-C8 | Present invention | Pig-G | 108 | A(63) |
| Dis-C9 | Present invention | Pig-G | 109 | A(63) |
| Dis-C10 | Present invention | Pig-G | 110 | A(64) |
| Dis-C11 | Present invention | Pig-G | 111 | A(61) |
| Dis-C12 | Present invention | Pig-G | 112 | A(61) |
| Dis-C13 | Present invention | Pig-G | 113 | A(61) |
| Dis-C14 | Present invention | Pig-G | 114 | A(60) |
| Dis-C15 | Present invention | Pig-G | 115 | A(60) |
| Dis-C16 | Present invention | Pig-G | 116 | A(61) |
| Dis-C17 | Present invention | Pig-G | 117 | A(58) |
| Dis-C18 | Present invention | Pig-G | 118 | A(59) |
| Dis-C19 | Present invention | Pig-G | 119 | A(59) |
| Dis-C20 | Present invention | Pig-G | 120 | A(58) |
| Dis-C21 | Present invention | Pig-G | 121 | A(59) |
| Dis-C22 | Present invention | Pig-G | 122 | A(59) |
| Dis-C23 | Present invention | Pig-G | 123 | A(59) |
| Dis-C24 | Present invention | Pig-G | 124 | A(59) |
| Dis-C25 | Present invention | Pig-G | 125 | A(61) |
| Dis-C26 | Present invention | Pig-G | 126 | A(61) |
| Dis-C27 | Present invention | Pig-G | 127 | A(63) |
| Dis-C28 | Present invention | Pig-G | 128 | A(64) |
| Dis-C29 | Present invention | Pig-G | 129 | A(61) |
| Dis-C30 | Present invention | Pig-G | 130 | A(60) |
| Dis-C31 | Present invention | Pig-G | 131 | A(64) |
| Dis-C32 | Present invention | Pig-G | 132 | A(60) |
| Dis-C33 | Present invention | Pig-G | 133 | A(61) |
| Dis-C34 | Present invention | Pig-G | 134 | A(61) |
| Dis-C35 | Present invention | Pig-G | 135 | A(61) |
| Dis-C36 | Present invention | Pig-G | 136 | A(60) |
| Dis-C37 | Present invention | Pig-G | 137 | A(60) |
| Dis-C38 | Present invention | Pig-G | 138 | A(58) |
| Dis-C39 | Present invention | Pig-G | 139 | A(58) |
| Dis-C40 | Present invention | Pig-G | 140 | A(60) |
| Dis-C41 | Present invention | Pig-G | 141 | A(63) |
| Dis-C42 | Present invention | Pig-G | 142 | A(64) |
| Dis-C43 | Present invention | Pig-H | 101 | A(80) |
| Dis-C44 | Present invention | Pig-I | 101 | A(81) |
| Dis-C45 | Present invention | Pig-G | 101 | A(61) |
| Dis-C46 | Standard | Pig-G | None | (44) |
| Dis-C47 | Standard | Pig-G | None | (46) |
| Dis-C48 | Standard | Pig-H | None | (63) |
| Dis-C49 | Standard | Pig-I | None | (63) |
| Dis-C50 | Comparative Example | Pig-G | Comparative Compound (1) | D(47) |
| Dis-C51 | Comparative Example | Pig-G | Comparative Compound (2) | D(47) |
| Dis-C52 | Comparative Example | Pig-G | Comparative Compound (3) | C(49) |
| Dis-C53 | Comparative Example | Pig-G | Comparative Compound (4) | B(55) |
| Dis-C54 | Comparative Example | Pig-G | Comparative Compound (5) | B(55) |

TABLE 3-4

Evaluation Result of Pigment dispersion of Present Invention

| Pigment dispersion | | Pigment | Compound | Evaluation (Glossiness) |
|---|---|---|---|---|
| Dis-Bk1 | Present invention | Pig-J | 101 | A(109) |
| Dis-Bk2 | Present invention | Pig-J | 102 | A(105) |
| Dis-Bk3 | Present invention | Pig-J | 103 | A(107) |
| Dis-Bk4 | Present invention | Pig-J | 104 | A(106) |
| Dis-Bk5 | Present invention | Pig-J | 105 | A(108) |
| Dis-Bk6 | Present invention | Pig-J | 106 | A(108) |
| Dis-Bk7 | Present invention | Pig-J | 107 | A(106) |
| Dis-Bk8 | Present invention | Pig-J | 108 | A(106) |
| Dis-Bk9 | Present invention | Pig-J | 109 | A(108) |
| Dis-Bk10 | Present invention | Pig-J | 110 | A(107) |

TABLE 3-4-continued

Evaluation Result of Pigment dispersion of Present Invention

| Pigment dispersion | Pigment | Compound | Evaluation (Glossiness) |
|---|---|---|---|
| Dis-Bk11 | Present invention | Pig-J | 111 | A(102) |
| Dis-Bk12 | Present invention | Pig-J | 112 | A(99) |
| Dis-Bk13 | Present invention | Pig-J | 113 | A(99) |
| Dis-Bk14 | Present invention | Pig-J | 114 | A(97) |
| Dis-Bk15 | Present invention | Pig-J | 115 | A(97) |
| Dis-Bk16 | Present invention | Pig-J | 116 | A(100) |
| Dis-Bk17 | Present invention | Pig-J | 117 | A(88) |
| Dis-Bk18 | Present invention | Pig-J | 118 | A(89) |
| Dis-Bk19 | Present invention | Pig-J | 119 | A(88) |
| Dis-Bk20 | Present invention | Pig-J | 120 | A(90) |
| Dis-Bk21 | Present invention | Pig-J | 121 | A(92) |
| Dis-Bk22 | Present invention | Pig-J | 122 | A(94) |
| Dis-Bk23 | Present invention | Pig-J | 123 | A(92) |
| Dis-Bk24 | Present invention | Pig-J | 124 | A(92) |
| Dis-Bk25 | Present invention | Pig-J | 125 | A(100) |
| Dis-Bk26 | Present invention | Pig-J | 126 | A(101) |
| Dis-Bk27 | Present invention | Pig-J | 127 | A(106) |
| Dis-Bk28 | Present invention | Pig-J | 128 | A(106) |
| Dis-Bk29 | Present invention | Pig-J | 129 | A(102) |
| Dis-Bk30 | Present invention | Pig-J | 130 | A(102) |
| Dis-Bk31 | Present invention | Pig-J | 131 | A(107) |
| Dis-Bk32 | Present invention | Pig-J | 132 | A(100) |
| Dis-Bk33 | Present invention | Pig-J | 133 | A(100) |
| Dis-Bk34 | Present invention | Pig-J | 134 | A(102) |
| Dis-Bk35 | Present invention | Pig-J | 135 | A(102) |
| Dis-Bk36 | Present invention | Pig-J | 136 | A(100) |
| Dis-Bk37 | Present invention | Pig-J | 137 | A(102) |
| Dis-Bk38 | Present invention | Pig-J | 138 | A(90) |
| Dis-Bk39 | Present invention | Pig-J | 139 | A(90) |
| Dis-Bk40 | Present invention | Pig-J | 140 | A(95) |
| Dis-Bk41 | Present invention | Pig-J | 141 | A(107) |
| Dis-Bk42 | Present invention | Pig-J | 142 | A(107) |
| Dis-Bk43 | Present invention | Pig-K | 101 | A(109) |
| Dis-Bk44 | Present invention | Pig-L | 101 | A(89) |
| Dis-Bk45 | Present invention | Pig-J | 101 | A(110) |
| Dis-Bk46 | Standard | Pig-J | None | (8) |
| Dis-Bk47 | Standard | Pig-J | None | (7) |
| Dis-Bk48 | Standard | Pig-K | None | (42) |
| Dis-Bk49 | Standard | Pig-L | None | (2) |
| Dis-Bk50 | Comparative Example | Pig-J | Comparative Compound (1) | C(9) |
| Dis-Bk51 | Comparative Example | Pig-J | Comparative Compound (2) | D(6) |
| Dis-Bk52 | Comparative Example | Pig-J | Comparative Compound (3) | A(105) |
| Dis-Bk53 | Comparative Example | Pig-J | Comparative Compound (4) | B(77) |
| Dis-Bk54 | Comparative Example | Pig-J | Comparative Compound (5) | B(64) |

Example 7

Next, a yellow toner was manufactured by the following suspension polymerization method.

Manufacturing Example 1 of Yellow Toner
Preparation of Aqueous Medium

After 710 parts of ion exchanged water and 450 parts of an aqueous $Na_3PO_4$ solution at a concentration of 0.1 mol/l were charged into a 2-liter four neck flask equipped with a high-speed stirring machine, T. K. Homomixer, manufactured by Primix Corp., stirring was performed at 12,000 rpm, and the temperature was increased to 60° C. To the mixture thus processed, 68 parts of an aqueous $CaCl_2$ solution at a concentration of 1.0 mol/l was gradually added, so that an aqueous medium containing a fine poor water-soluble dispersion stabilizer, $Ca_3(PO_4)_2$, was prepared.

Suspension Polymerization Step

Next, the composition shown below was heated to 60° C. and was uniformly dissolved and dispersed at 5,000 rpm by a high-speed stirring machine, T. K. Homomixer, manufactured by Primix Corp.

yellow pigment dispersion (Dis-Y1): 132 parts
styrene monomer: 46 parts
n-butyl acrylate monomer: 34 parts
polar resin [saturated polyester resin (terephthalic acid-propylene oxide modified bisphenol A, acid value: 15, peak molecular weight: 6,000): 10 parts
ester wax (maximum endothermic peak by DSC measurement: 70° C., Mn: 704): 25 parts
aluminum salicylate compound [trade name: Bontron E-108, manufactured by Orient Chemical Industries Co., Ltd.]: 2 parts
divinyl benzene monomer: 0.1 parts After 10 parts of 2,2'-azobis(2,4-dimethylvaleronitrile) functioning as a polymerization initiator was added to the composition described above, the mixture thus prepared was charged in the above aqueous medium and then granulated for 15 minutes while stirring was performed at a constant rate of 12,000 rpm. Subsequently, after the stirring machine was changed from the high-speed stirring machine to a propeller type stirring machine, polymerization was continued for 5 hours at a liquid temperature of 60° C. and was then further continued for 8 hours after the liquid temperature was increased to 80° C. After the polymerization reaction was completed, the remaining monomer was removed by distillation at 80° C. under reduced pressure, and the temperature was then decreased to 30° C., so that a fine polymer particle dispersion liquid was obtained.

Washing/Dehydration Step

After the above fine polymer particle dispersion liquid thus obtained was transferred into a washing container, diluted hydrochloric acid was added thereto with stirring, and by stirring for 2 hours at a pH of 1.5, a compound of phosphoric acid and calcium, which contained $Ca_3(PO_4)_2$, was dissolved. Subsequently, solid-liquid separation was performed using a filter, so that fine polymer particles were obtained. After the above polymer particles were changed into water and stirred to again form a dispersion liquid, solid-liquid separation was performed by a filter. Re-dispersion of the fine polymer particles in water and solid-liquid separation were repeatedly performed until the compound of phosphoric acid and calcium, which contained $Ca_3(PO_4)_2$, was sufficiently removed. Next, fine polymer particles finally obtained by solid-liquid separation were sufficiently dried by a drier, so that toner particles were obtained.

With 100 parts of the toner particles thus obtained, 1.0 part of a hydrophobic silica fine powder (number average particle diameter of primary particles: 7 nm) which was surface-treated with hexamethylenedisilazane, 0.15 parts of rutile type fine titanium oxide particles (number average particle diameter of primary particles: 45 nm), and 0.5 parts of rutile type fine titanium oxide particles (number average particle diameter of primary particles: 200 nm) were mixed in a dry state for 5 minutes by a Henschel mixer [manufactured by Nippon Coke & Engineering Co., Ltd.], so that a yellow toner (Tnr-Y1) was obtained.

Manufacturing Example 2 of Yellow Toner

Except that the yellow pigment dispersion (Dis-Y1) was changed to the yellow pigment dispersions (Dis-Y2) to (Dis-Y42), yellow toners (Tnr-Y2) to (Tnr-Y42) were obtained by an operation similar to that in the above manufacturing example 1 of yellow toner.

Manufacturing Example 3 of Yellow Toner

Except that the yellow pigment dispersion (Dis-Y1) was changed to the yellow pigment dispersions (Dis-Y43) and (Dis-Y44), yellow toners (Tnr-Y43) and (Tnr-Y44) were obtained by an operation similar to that in the above manufacturing example 1 of yellow toner.

Comparative Example 7

Standard yellow toners each used as the standard of evaluation and comparative yellow toners were prepared by the following methods.

Manufacturing Example 1 of Standard Yellow Toner

Except that the yellow pigment dispersion (Dis-Y1) was changed to the yellow pigment dispersions (Dis-Y47) to (Dis-Y49), standard yellow toners (Tnr-Y45) to (Tnr-Y47) were obtained by an operation similar to that in the above manufacturing example 1 of yellow toner.

Manufacturing Example 1 of Comparative Yellow Toner

Except that the yellow pigment dispersion (Dis-Y1) was changed to the yellow pigment dispersions (Dis-Y50) to (Dis-Y54), comparative yellow toners (Tnr-Y48) to (Tnr-Y52) were obtained by an operation similar to that in the above manufacturing example 1 of yellow toner.

Example 8

Next, magenta toners were manufactured by the following suspension polymerization method.

Manufacturing Example 1 of Magenta Toner

Except that the yellow pigment dispersion (Dis-Y1) was changed to the magenta pigment dispersion (Dis-M1), a magenta toner (Tnr-M1) was obtained by an operation similar to that in the above manufacturing example 1 of yellow toner.

Manufacturing Example 2 of Magenta Toner

Except that the magenta pigment dispersion (Dis-M1) was changed to the magenta pigment dispersions (Dis-M2) to (Dis-M42), magenta toners (Tnr-M2) to (Tnr-M42) were obtained by an operation similar to that in the above manufacturing example 1 of magenta toner.

Manufacturing Example 3 of Magenta Toner

Except that the magenta pigment dispersion (Dis-M1) was changed to the magenta pigment dispersions (Dis-M43) and (Dis-M44), magenta toners (Tnr-M43) and (Tnr-M44) were obtained by an operation similar to that in the above manufacturing example 1 of magenta toner.

Comparative Example 8

Standard magenta toners each used as the standard of evaluation and comparative magenta toners were prepared by the following methods.

Manufacturing Example 1 of Standard Magenta Toner

Except that the magenta pigment dispersion (Dis-M1) was changed to the magenta pigment dispersions (Dis-M47) to (Dis-M49), standard magenta toners (Tnr-M45) to (Tnr-M47) were obtained by an operation similar to that in the above manufacturing example 1 of magenta toner.

Manufacturing Example 1 of Comparative Magenta Toner

Except that the magenta pigment dispersion (Dis-M1) was changed to the magenta pigment dispersions (Dis-M50) to (Dis-M54), comparative magenta toners (Tnr-M48) to (Tnr-M52) were obtained by an operation similar to that in the above manufacturing example 1 of magenta toner.

Example 9

Next, cyan toners were manufactured by the following suspension polymerization method.

Manufacturing Example 1 of Cyan Toner

Except that the yellow pigment dispersion (Dis-Y1) was changed to the cyan pigment dispersion (Dis-C1), a cyan toner (Tnr-C1) was obtained by an operation similar to that in the above manufacturing example 1 of yellow toner.

Manufacturing Example 2 of Cyan Toner

Except that the cyan pigment dispersion (Dis-C1) was changed to the cyan pigment dispersions (Dis-C2) to (Dis-C42), cyan toners (Tnr-C2) to (Tnr-C42) were obtained by an operation similar to that in the above manufacturing example 1 of cyan toner.

Manufacturing Example 3 of Cyan Toner

Except that the cyan pigment dispersion (Dis-C1) was changed to the cyan pigment dispersions (Dis-C43) and (Dis-C44), cyan toners (Tnr-C43) and (Tnr-C44) were obtained by an operation similar to that in the above manufacturing example 1 of cyan toner.

Comparative Example 9

Standard cyan toners each used as the standard of evaluation and comparative cyan toners were prepared by the following methods.

Manufacturing Example 1 of Standard Cyan Toner

Except that the cyan pigment dispersion (Dis-C1) was changed to the cyan pigment dispersions (Dis-C47) to (Dis-C49), standard cyan toners (Tnr-C45) to (Tnr-C47)

were obtained by an operation similar to that in the above manufacturing example 1 of cyan toner.

Manufacturing Example 1 of Comparative Cyan Toner

Except that the cyan pigment dispersion (Dis-C1) was changed to the cyan pigment dispersions (Dis-C50) to (Dis-C54), comparative cyan toners (Tnr-C48) to (Tnr-C52) were obtained by an operation similar to that in the above manufacturing example 1 of cyan toner.

Example 10

Next, black toners were manufactured by the following suspension polymerization method.

Manufacturing Example 1 of Black Toner

Except that the yellow pigment dispersion (Dis-Y1) was changed to the black pigment dispersion (Dis-Bk1), a black toner (Tnr-Bk1) was obtained by an operation similar to that in the above manufacturing example 1 of yellow toner.

Manufacturing Example 2 of Black Toner

Except that the black pigment dispersion (Dis-Bk1) was changed to the black pigment dispersions (Dis-Bk2) to (Dis-Bk42), black toners (Tnr-Bk2) to (Tnr-Bk42) were obtained by an operation similar to that in the above manufacturing example 1 of black toner.

Manufacturing Example 3 of Black Toner

Except that the black pigment dispersion (Dis-Bk1) was changed to the black pigment dispersions (Dis-Bk43) and (Dis-Bk44), black toners (Tnr-Bk43) and (Tnr-Bk44) were obtained by an operation similar to that in the above manufacturing example 1 of black toner.

Comparative Example 10

Manufacturing Example 1 of Standard Black Toner

Except that the black pigment dispersion (Dis-Bk1) was changed to the black pigment dispersions (Dis-Bk47) to (Dis-Bk49), standard black toners (Tnr-Bk45) to (Tnr-Bk47) were obtained by an operation similar to that in the above manufacturing example 1 of black toner.

Manufacturing Example 1 of Comparative Black Toner

Except that the black pigment dispersion (Dis-Bk1) was changed to the black pigment dispersions (Dis-Bk50) to (Dis-Bk54), comparative black toners (Tnr-Bk48) to (Tnr-Bk52) were obtained by an operation similar to that in the above manufacturing example 1 of black toner.

Example 11

Next, a yellow toner was manufactured by the following suspension granulation method.

Manufacturing Example 4 of Yellow Toner
Preparation of Yellow Pigment Dispersion After a mixture was formed by mixing 180 parts of ethyl acetate, 12 parts of C.I. Pigment Yellow 155 (Pig-A), 1.2 parts of the compound (101) having an azo skeleton structure, and 130 parts of glass beads (diameter: 1 mm) and was then dispersed for 3 hours by an attritor [manufactured by Nippon Coke & Engineering Co., Ltd.], filtration was performed with a mesh, so that a yellow pigment dispersion A was prepared.

Mixing Step

The following composition was dispersed for 24 hours by a ball mill, so that 200 parts of a toner composition mixture liquid was obtained.

- Yellow Pigment Dispersion A: 96.0 Parts
- polar resin [saturated polyester resin (polycondensation product of phthalic acid and propylene oxide modified bisphenol A, Tg: 75.9° C., Mw: 11,000, Mn: 4,200, acid value: 11 mgKOH/g): 85.0 parts
- hydrocarbon wax (Fischer-Tropsch wax, maximum endothermic peak by DSC measurement: 80° C., Mw: 750): 9.0 parts
- aluminum salicylate compound [trade name: Bontron E-108, manufactured by Orient Chemical Industries Co., Ltd.]: 2 parts
- ethyl acetate (solvent): 10.0 parts Dispersion/Suspension Step By dispersing the following composition for 24 hours by a ball mill, a carboxymethyl cellulose was dissolved, so that an aqueous medium was obtained.

- calcium carbonate (coated with an acrylic acid-based copolymer): 20.0 parts
- carboxymethyl cellulose [Celogen BS-H, manufactured by DKS Co., Ltd.]: 0.5 parts
- ion exchanged water: 99.5 parts After 1,200 parts of the above aqueous medium was received in a high-speed stirring machine, T. K. Homomixer [manufactured by Primix Corp.], while stirring was performed by a rotation blade at a circumferential speed of 20 m/sec, 1,000 parts of the above toner composition mixture liquid was charged and stirred at a constant temperature of 25° C. for 1 minute, so that a suspension liquid was obtained.

Solvent Removal Step

While 2,200 parts of the above suspension liquid was stirred at a circumferential speed of 45 m/min by a Full Zone Blade [manufactured by Kobelco Eco-Solutions Co., Ltd.], a liquid temperature was maintained constant at 40° C., and a vapor phase above the suspension liquid level was forcedly evacuated using a blower, so that the solvent removal was started. In this step, after 15 minutes passed from the start of this solvent removal, 75 parts of diluted ammonium water at a concentration of 1% was added as an ionic substance. Subsequently, after 1 hour passed from the start of the solvent removal, 25 parts of the above ammonium water was added. Next, after 2 hours passed from the start of the solvent removal, 25 parts of the above ammonium water was added. Finally, after 3 hours passed from the start of the solvent removal, 25 parts of the ammonium water was added, so that the total addition amount was set to 150 parts. Furthermore, the suspension liquid was maintained at a liquid temperature of 40° C. for 17 hours from the start of the solvent removal, so that a toner dispersion liquid in which the solvent (ethyl acetate) was removed from the suspension particles was obtained.

Washing/Dehydration Step

To 300 parts of the toner dispersion liquid obtained by the solvent removal step, 80 parts of hydrochloric acid at a concentration of 10 mol/L was added, and furthermore, a neutralization treatment was performed using an aqueous sodium hydroxide solution at a concentration of 0.1 mol/L.

Subsequently, ion exchange-water washing was repeatedly performed 4 times by suction filtration, so that a toner cake was obtained. The toner cake thus obtained was dried by a vacuum drier and sieved with a sieve having an opening of 45 μm, so that toner particles were obtained. A yellow toner (Tnr-Y101) was obtained by a subsequent operation which was similar to that in the manufacturing example 1 of yellow toner of Example 7.

Manufacturing Example 5 of Yellow Toner

Except that the compound (101) having an azo skeleton structure was changed to the compounds (102) to (142) each having an azo skeleton structure, yellow toners (Tnr-Y102) to (Tnr-Y142) were obtained by an operation similar to that of the above manufacturing example 4 of yellow toner.

Manufacturing Example 6 of Yellow Toner

Except that C.I. Pigment Yellow 155 represented by the formula (Pig-A) was changed to C.I. Pigment Yellow 180 represented by the formula (Pig-B) and C.I. Pigment Yellow 185 represented by the formula (Pig-C), yellow toners (Tnr-Y143) and (Tnr-Y144) were obtained by an operation similar to that of the above manufacturing example 4 of yellow toner.

Comparative Example 11

Standard yellow toners each used as the standard of evaluation and comparative yellow toners were prepared by the following methods.

Manufacturing Example 2 of Standard Yellow Toner

Except that the compound (101) having an azo skeleton structure was not added, a standard yellow toner (Tnr-Y145) was obtained by an operation similar to that in the above manufacturing example 4 of yellow toner.

Manufacturing Example 3 of Standard Yellow Toner

Except that the compound (101) having an azo skeleton structure was not added, standard yellow toners (Tnr-Y146) and (Tnr-Y147) were obtained by an operation similar to that in the above manufacturing example 6 of yellow toner.

Manufacturing Example 2 of Comparative Yellow Toner

Except that the compound (101) having an azo skeleton structure was changed to the comparative compound (1) disclosed in PTL 1, the styrene/butyl acrylate [copolymer ratio (mass ratio)=95/5] block copolymer disclosed in PTL 2 (Mw: 9,718) (comparative compound 2), the comparative compound (3) disclosed in PTL 3, the high molecular dispersant [product name: Disparlon DA-703-50, manufactured by Kusumoto Chemicals, Ltd.] disclosed in PTL 4 (comparative compound 4), and the methyl methacrylate/sodium styrene sulfonate copolymer (Mw: 14,600) (comparative compound 5), comparative yellow toners (Tnr-Y148) to (Tnr-Y152) were obtained by an operation similar to that in the above manufacturing example 4 of yellow toner.

Example 12

Next, magenta toners were manufactured by the following suspension granulation method.

Manufacturing Example 4 of Magenta Toner

Except that C.I. Pigment Yellow 155 (yellow pigment a) represented by the formula (Pig-A) was changed to C.I. Pigment Red 122 represented by the formula (Pig-D), a magenta toner (Tnr-M101) was obtained by an operation similar to that of the above manufacturing example 4 of yellow toner.

Manufacturing Example 5 of Magenta Toner

Except that the compound (101) having an azo skeleton structure was changed to the compounds (102) to (142) each having an azo skeleton structure, magenta toners (Tnr-M102) to (Tnr-M142) were obtained by an operation similar to that of the above manufacturing example 4 of magenta toner.

Manufacturing Example 6 of Magenta Toner

Except that C.I. Pigment Red 122 represented by the formula (Pig-D) was changed to C.I. Pigment Red 202 represented by the formula (Pig-E) and C.I. Pigment Red 255 represented by the formula (Pig-F), magenta toners (Tnr-M143) and (Tnr-M144) were obtained by an operation similar to that of the above manufacturing example 4 of magenta toner.

Comparative Example 12

Standard magenta toners each used as the standard of evaluation and comparative magenta toners were prepared by the following methods.

Manufacturing Example 2 of Standard Magenta Toner

Except that the compound (101) having an azo skeleton structure was not added, a standard magenta toner (Tnr-M145) was obtained by an operation similar to that in the above manufacturing example 4 of magenta toner.

Manufacturing Example 3 of Standard Magenta Toner

Except that the compound (101) having an azo skeleton structure was not added, standard magenta toners (Tnr-M146) and (Tnr-M147) were obtained by an operation similar to that in the above manufacturing example 6 of magenta toner.

Manufacturing Example 2 of Comparative Magenta Toner

Except that the compound (101) having an azo skeleton structure was changed to the comparative compound (1) disclosed in PTL 1, the styrene/butyl acrylate [copolymer ratio (mass ratio)=95/5] block copolymer disclosed in PTL 2 (Mw: 9,718) (comparative compound 2), the comparative compound (3) disclosed in PTL 3, the high molecular dispersant [product name: Disparlon DA-703-50, manufactured by Kusumoto Chemicals, Ltd.] disclosed in PTL 4

(comparative compound 4), and the methyl methacrylate/sodium styrene sulfonate copolymer (Mw: 14,600) (comparative compound 5), comparative magenta toners (Tnr-M148) to (Tnr-M152) were obtained by an operation similar to that in the above manufacturing example 4 of magenta toner.

Example 13

Next, cyan toners were manufactured by the following suspension granulation method.

Manufacturing Example 4 of Cyan Toner

Except that C.I. Pigment Yellow 155 (yellow pigment a) represented by the formula (Pig-A) was changed to C.I. Pigment Blue 15:3 represented by the formula (Pig-G), a cyan toner (Tnr-C101) was obtained by an operation similar to that of the above manufacturing example 4 of yellow toner.

Manufacturing Example 5 of Cyan Toner

Except that the compound (101) having an azo skeleton structure was changed to the compounds (102) to (142) each having an azo skeleton structure, cyan toners (Tnr-C102) to (Tnr-C142) were obtained by an operation similar to that of the above manufacturing example 4 of cyan toner.

Manufacturing Example 6 of Cyan Toner

Except that C.I. Pigment Blue 15:3 represented by the formula (Pig-G) was changed to C.I. Pigment Blue 16 represented by the formula (Pig-H) and C.I. Pigment Blue 17: 1 represented by the formula (Pig-I), cyan toners (Tnr-C143) and (Tnr-C144) were obtained by an operation similar to that of the above manufacturing example 4 of cyan toner.

Comparative Example 13

Standard cyan toners each used as the standard of evaluation and comparative cyan toners were prepared by the following methods.

Manufacturing Example 2 of Standard Cyan Toner

Except that the compound (101) having an azo skeleton structure was not added, a standard cyan toner (Tnr-C145) was obtained by an operation similar to that in the above manufacturing example 4 of cyan toner.

Manufacturing Example 3 of Standard Cyan Toner

Except that the compound (101) having an azo skeleton structure was not added, standard cyan toners (Tnr-C146) and (Tnr-C147) were obtained by an operation similar to that in the above manufacturing example 6 of cyan toner.

Manufacturing Example 2 of Comparative Cyan Toner

Except that the compound (101) having an azo skeleton structure was changed to the comparative compound (1) disclosed in PTL 1, the styrene/butyl acrylate [copolymer ratio (mass ratio)=95/5] block copolymer disclosed in PTL 2 (Mw: 9,718) (comparative compound 2), the comparative compound (3) disclosed in PTL 3, the high molecular dispersant [product name: Disparlon DA-703-50, manufactured by Kusumoto Chemicals, Ltd.] disclosed in PTL 4 (comparative compound 4), and the methyl methacrylate/sodium styrene sulfonate copolymer (Mw: 14,600) (comparative compound 5), comparative cyan toners (Tnr-C148) to (Tnr-C152) were obtained by an operation similar to that in the above manufacturing example 4 of cyan toner.

Example 14

Next, black toners were manufactured by the following suspension granulation method.

Manufacturing Example 4 of Black Toner

Except that 12 parts of C.I. Pigment Yellow 155 (yellow pigment a) represented by the formula (Pig-A) and 1.2 parts of the compound (101) having an azo skeleton structure were changed to 30 parts of carbon black (Pig-J) (specific surface area: 65 $m^2$/g, average particle diameter: 30 nm, pH: 9.0) and 3.0 parts of the compound (101) having an azo skeleton structure, respectively, a black toner (Tnr-Bk101) was obtained by an operation similar to that of the above manufacturing example 4 of yellow toner.

Manufacturing Example 5 of Black Toner

Except that the compound (101) having an azo skeleton structure was changed to the compounds (102) to (142) each having an azo skeleton structure, black toners (Tnr-Bk102) to (Tnr-Bk142) were obtained by an operation similar to that of the above manufacturing example 4 of black toner.

Manufacturing Example 6 of Black Toner

Except that carbon black (Pig-J) was changed to carbon black (Pig-K) (specific surface area: 77 $m^2$/g, average particle diameter: 28 nm, pH: 7.5) and carbon black (Pig-L) (specific surface area: 370 $m^2$/g, average particle diameter: 13 nm, pH: 3.0), black toners (Tnr-Bk143) and (Tnr-Bk144) were obtained by an operation similar to that of the above manufacturing example 4 of black toner.

Comparative Example 14

Standard black toners each used as the standard of evaluation and comparative black toners were prepared by the following methods.

Manufacturing Example 2 of Standard Black Toner

Except that the compound (101) having an azo skeleton structure was not added, a standard black toner (Tnr-Bk145) was obtained by an operation similar to that in the above manufacturing example 4 of black toner.

Manufacturing Example 3 of Standard Black Toner

Except that the compound (101) having an azo skeleton structure was not added, standard black toners (Tnr-Bk146) and (Tnr-Bk147) were obtained by an operation similar to that in the above manufacturing example 6 of black toner.

Manufacturing Example 2 of Comparative Black Toner

Except that the compound (101) having an azo skeleton structure was changed to the comparative compound (1)

disclosed in PTL 1, the styrene/butyl acrylate [copolymer ratio (mass ratio)=95/5] block copolymer disclosed in PTL 2 (Mw: 9,718) (comparative compound 2), the comparative compound (3) disclosed in PTL 3, the high molecular dispersant [product name: Disparlon DA-703-50, manufactured by Kusumoto Chemicals, Ltd.] disclosed in PTL 4 (comparative compound 4), and the methyl methacrylate/sodium styrene sulfonate copolymer (Mw: 14,600) (comparative compound 5), comparative black toners (Tnr-Bk148) to (Tnr-Bk152) were obtained by an operation similar to that in the above manufacturing example 4 of black toner.

Example 15

The yellow toners, the magenta toners, the cyan toners, and the black toners obtained in the above Examples 7 to 14 were evaluated by the following methods.
Evaluation of Coloring Power of Toner By the use of the yellow toners (Tnr-Y1) to (Tnr-Y52) and (Tnr-Y101) to (Tnr-Y152), the magenta toners (Tnr-M1) to (Tnr-M52) and (Tnr-M101) to (Tnr-M152), the cyan toners (Tnr-C1) to (Tnr-C52) and (Tnr-C101) to (Tnr-C152), and the black toners (Tnr-Bk1) to (Tnr-Bk52) and (Tnr-bk101) to (Tnr-bk152), image samples were output, and the image properties, which will be described later, were comparatively evaluated. For comparative evaluation of image properties, paper passing durability was evaluated using a modified apparatus of LBP-5300 [manufactured by CANON KABUSHIKI KAISHA] as an image forming apparatus (hereinafter also referred to as "LBP" in some cases). As the modified points, a development blade provided in a process cartridge (hereinafter also referred to as "CRG" in some cases) was changed to a SUS blade having a thickness of 8 [μm]. In addition, a blade bias of −200 [V] was configured to be applied to a development bias applied to a development roller functioning as a toner carrier.

Under ordinary temperature and humidity conditions [N/N (23.5° C., 60% RH)], a solid image was formed on a transfer paper sheet (75 g/m² sheet) with a toner amount of 0.5 mg/cm². The density of the solid image was measured by a reflection densitometer Spectrolino [manufactured by GretagMacbeth]. The coloring power of toner was evaluated based on the improvement rate of solid image density.

The improvement rate of solid image density of each of the yellow toners (Tnr-Y1) to (Tnr-Y42) was obtained using the solid image density of the above standard yellow toner (Tnr-Y45) as the standard value. The improvement rate of solid image density of the yellow toner (Tnr-Y43) was obtained using the solid image density of the above standard yellow toner (Tnr-Y46) as the standard value. The improvement rate of solid image density of the yellow toner (Tnr-Y44) was obtained using the solid image density of the above standard yellow toner (Tnr-Y47) as the standard value.

The improvement rate of solid image density of each of the yellow toners (Tnr-Y101) to (Tnr-Y142) was obtained using the solid image density of the above standard yellow toner (Tnr-Y145) as the standard value. The improvement rate of solid image density of the yellow toner (Tnr-Y143) was obtained using the solid image density of the above standard yellow toner (Tnr-Y146) as the standard value. The improvement rate of solid image density of the yellow toner (Tnr-Y144) was obtained using the solid image density of the above standard yellow toner (Tnr-Y147) as the standard value.

The improvement rate of solid image density of each of the magenta toners (Tnr-M1) to (Tnr-M42) was obtained using the solid image density of the above standard magenta toner (Tnr-M45) as the standard value. The improvement rate of solid image density of the magenta toner (Tnr-M43) was obtained using the solid image density of the above standard magenta toner (Tnr-M46) as the standard value. The improvement rate of solid image density of the magenta toner (Tnr-M44) was obtained using the solid image density of the above standard magenta toner (Tnr-M47) as the standard value.

The improvement rate of solid image density of each of the magenta toners (Tnr-M101) to (Tnr-M142) was obtained using the solid image density of the above standard magenta toner (Tnr-M145) as the standard value. The improvement rate of solid image density of the magenta toner (Tnr-M143) was obtained using the solid image density of the above standard magenta toner (Tnr-M146) as the standard value. The improvement rate of solid image density of the magenta toner (Tnr-M144) was obtained using the solid image density of the above standard magenta toner (Tnr-M147) as the standard value.

The improvement rate of solid image density of each of the cyan toners (Tnr-C1) to (Tnr-C42) was obtained using the solid image density of the above standard cyan toner (Tnr-C45) as the standard value. The improvement rate of solid image density of the cyan toner (Tnr-C43) was obtained using the solid image density of the above standard cyan toner (Tnr-C46) as the standard value. The improvement rate of solid image density of the cyan toner (Tnr-C44) was obtained using the solid image density of the above standard cyan toner (Tnr-C47) as the standard value.

The improvement rate of solid image density of each of the cyan toners (Tnr-C101) to (Tnr-C142) was obtained using the solid image density of the above standard cyan toner (Tnr-C145) as the standard value. The improvement rate of solid image density of the cyan toner (Tnr-C143) was obtained using the solid image density of the above standard cyan toner (Tnr-C146) as the standard value. The improvement rate of solid image density of the cyan toner (Tnr-C144) was obtained using the solid image density of the above standard cyan toner (Tnr-C147) as the standard value.

The improvement rate of solid image density of each of the black toners (Tnr-Bk1) to (Tnr-Bk42) was obtained using the solid image density of the above standard black toner (Tnr-Bk45) as the standard value. The improvement rate of solid image density of the black toner (Tnr-Bk43) was obtained using the solid image density of the above standard black toner (Tnr-Bk46) as the standard value. The improvement rate of solid image density of the black toner (Tnr-Bk44) was obtained using the solid image density of the above standard black toner (Tnr-Bk47) as the standard value.

The improvement rate of solid image density of each of the black toners (Tnr-Bk101) to (Tnr-Bk142) was obtained using the solid image density of the above standard black toner (Tnr-Bk145) as the standard value. The improvement rate of solid image density of the black toner (Tnr-Bk143) was obtained using the solid image density of the above standard black toner (Tnr-Bk146) as the standard value. The improvement rate of solid image density of the black toner (Tnr-Bk144) was obtained using the solid image density of the above standard black toner (Tnr-Bk147) as the standard value.

Hereinafter, the evaluation standard of improvement rate of solid image density of each color are shown below.

Evaluation Standard of Solid Image Density of Yellow Toner
- A: The improvement rate of solid image density is 5% or more.
- B: The improvement rate of solid image density is 1% to less than 5%.
- C: The improvement rate of solid image density is 0% to less than 1%.
- D: The solid image density is decreased.

When the improvement rate of solid image density is 1% or more, the hue is evaluated as good.

Evaluation Standard of Solid Image Density of Magenta Toner
- A: The improvement rate of solid image density is 20% or more.
- B: The improvement rate of solid image density is 10% to less than 20%.
- C: The improvement rate of solid image density is 5% to less than 10%.
- D: The improvement rate of solid image density is less than 5%.

When the improvement rate of solid image density is 10% or more, the coloring power is evaluated as good.

Evaluation Standard of Solid Image Density of Cyan Toner
- A: The improvement rate of solid image density is 30% or more.
- B: The improvement rate of solid image density is 20% to less than 30%.
- C: The improvement rate of solid image density is 10% to less than 20%.
- D: The improvement rate of solid image density is less than 10%.

When the improvement rate of solid image density is 20% or more, the coloring power is evaluated as good.

Evaluation Standard of Solid Image Density of Black Toner
- A: The improvement rate of solid image density is 60% or more.
- B: The improvement rate of solid image density is 40% to less than 60%.
- C: The improvement rate of solid image density is 20% to less than 40%.
- D: The improvement rate of solid image density is less than 20%.

When the improvement rate of solid image density is 40% or more, the coloring power is evaluated as good.

Comparative Example 15

The coloring power of each of the comparative yellow toners (Tnr-Y48) to (Tnr-Y52) and (Tnr-Y148) to (Tnr-Y152), the comparative magenta toners (Tnr-M48) to (Tnr-M52) and (Tnr-M148) to (Tnr-M152), the comparative cyan toners (Tnr-C48) to (Tnr-C52) and (Tnr-C148) to (Tnr-C152), and the comparative black toners (Tnr-Bk48) to (Tnr-Bk52) and (Tnr-Bk148) to (Tnr-Bk152) was evaluated by a method similar to that in Example 15.

The improvement rate of solid image density of each of the comparative yellow toners (Tnr-Y48) to (Tnr-Y52) was obtained based on the standard value of the solid image density of the standard yellow toner (Tnr-Y45).

The improvement rate of solid image density of each of the comparative yellow toners (Tnr-Y148) to (Tnr-Y152) was obtained based on the standard value of the solid image density of the standard yellow toner (Tnr-Y145).

The improvement rate of solid image density of each of the comparative magenta toners (Tnr-M48) to (Tnr-M52) was obtained based on the standard value of the solid image density of the standard magenta toner (Tnr-M45).

The improvement rate of solid image density of each of the comparative magenta toners (Tnr-M148) to (Tnr-M152) was obtained based on the standard value of the solid image density of the standard magenta toner (Tnr-M145).

The improvement rate of solid image density of each of the comparative cyan toners (Tnr-C48) to (Tnr-C52) was obtained based on the standard value of the solid image density of the standard cyan toner (Tnr-C45).

The improvement rate of solid image density of each of the comparative cyan toners (Tnr-C148) to (Tnr-C152) was obtained based on the standard value of the solid image density of the standard cyan toner (Tnr-C145).

The improvement rate of solid image density of each of the comparative black toners (Tnr-Bk48) to (Tnr-Bk52) was obtained based on the standard value of the solid image density of the standard black toner (Tnr-Bk45).

The improvement rate of solid image density of each of the comparative black toners (Tnr-Bk148) to (Tnr-Bk152) was obtained based on the standard value of the solid image density of the standard black toner (Tnr-Bk145).

The evaluation results of coloring powers of the individual color toners each obtained by the suspension polymerization method are shown in Tables 4-1 to 4-4, and the evaluation results of coloring powers of the individual color toners each obtained by the suspension granulation method are shown in Tables 5-1 to 5-4.

TABLE 4-1

Evaluation Result of Toner of Present Invention Obtained by Suspension Polymerization

| Toner | Pigment | Compound | Coloring Power |
|---|---|---|---|
| Tnr-Y1 | Present invention | Pig-A | 101 | A |
| Tnr-Y2 | Present invention | Pig-A | 102 | A |
| Tnr-Y3 | Present invention | Pig-A | 103 | A |
| Tnr-Y4 | Present invention | Pig-A | 104 | A |
| Tnr-Y5 | Present invention | Pig-A | 105 | A |
| Tnr-Y6 | Present invention | Pig-A | 106 | A |
| Tnr-Y7 | Present invention | Pig-A | 107 | A |
| Tnr-Y8 | Present invention | Pig-A | 108 | A |
| Tnr-Y9 | Present invention | Pig-A | 109 | A |
| Tnr-Y10 | Present invention | Pig-A | 110 | A |
| Tnr-Y11 | Present invention | Pig-A | 111 | A |
| Tnr-Y12 | Present invention | Pig-A | 112 | A |
| Tnr-Y13 | Present invention | Pig-A | 113 | A |
| Tnr-Y14 | Present invention | Pig-A | 114 | A |
| Tnr-Y15 | Present invention | Pig-A | 115 | A |
| Tnr-Y16 | Present invention | Pig-A | 116 | A |
| Tnr-Y17 | Present invention | Pig-A | 117 | A |
| Tnr-Y18 | Present invention | Pig-A | 118 | A |
| Tnr-Y19 | Present invention | Pig-A | 119 | A |
| Tnr-Y20 | Present invention | Pig-A | 120 | A |
| Tnr-Y21 | Present invention | Pig-A | 121 | A |
| Tnr-Y22 | Present invention | Pig-A | 122 | A |
| Tnr-Y23 | Present invention | Pig-A | 123 | A |
| Tnr-Y24 | Present invention | Pig-A | 124 | A |
| Tnr-Y25 | Present invention | Pig-A | 125 | A |
| Tnr-Y26 | Present invention | Pig-A | 126 | A |
| Tnr-Y27 | Present invention | Pig-A | 127 | A |
| Tnr-Y28 | Present invention | Pig-A | 128 | A |
| Tnr-Y29 | Present invention | Pig-A | 129 | A |
| Tnr-Y30 | Present invention | Pig-A | 130 | A |
| Tnr-Y31 | Present invention | Pig-A | 131 | A |
| Tnr-Y32 | Present invention | Pig-A | 132 | A |
| Tnr-Y33 | Present invention | Pig-A | 133 | A |
| Tnr-Y34 | Present invention | Pig-A | 134 | A |
| Tnr-Y35 | Present invention | Pig-A | 135 | A |

TABLE 4-1-continued

Evaluation Result of Toner of Present Invention Obtained by Suspension Polymerization

| Toner | | Pigment | Compound | Coloring Power |
|---|---|---|---|---|
| Tnr-Y36 | Present invention | Pig-A | 136 | A |
| Tnr-Y37 | Present invention | Pig-A | 137 | A |
| Tnr-Y38 | Present invention | Pig-A | 138 | A |
| Tnr-Y39 | Present invention | Pig-A | 139 | A |
| Tnr-Y40 | Present invention | Pig-A | 140 | A |
| Tnr-Y41 | Present invention | Pig-A | 141 | A |
| Tnr-Y42 | Present invention | Pig-A | 142 | A |
| Tnr-Y43 | Present invention | Pig-B | 101 | A |
| Tnr-Y44 | Present invention | Pig-C | 101 | A |
| Tnr-Y45 | Standard | Pig-A | None | |
| Tnr-Y46 | Standard | Pig-B | None | |
| Tnr-Y47 | Standard | Pig-C | None | |
| Tnr-Y48 | Comparative Example | Pig-A | Comparative Compound (1) | B |
| Tnr-Y49 | Comparative Example | Pig-A | Comparative Compound (2) | D |
| Tnr-Y50 | Comparative Example | Pig-A | Comparative Compound (3) | B |
| Tnr-Y51 | Comparative Example | Pig-A | Comparative Compound (4) | D |
| Tnr-Y52 | Comparative Example | Pig-A | Comparative Compound (5) | D |

TABLE 4-2

Evaluation Result of Toner of Present Invention Obtained by Suspension Polymerization

| Toner | | Pigment | Compound | Coloring Power |
|---|---|---|---|---|
| Tnr-M1 | Present invention | Pig-D | 101 | A |
| Tnr-M2 | Present invention | Pig-D | 102 | A |
| Tnr-M3 | Present invention | Pig-D | 103 | A |
| Tnr-M4 | Present invention | Pig-D | 104 | A |
| Tnr-M5 | Present invention | Pig-D | 105 | A |
| Tnr-M6 | Present invention | Pig-D | 106 | A |
| Tnr-M7 | Present invention | Pig-D | 107 | A |
| Tnr-M8 | Present invention | Pig-D | 108 | A |
| Tnr-M9 | Present invention | Pig-D | 109 | A |
| Tnr-M10 | Present invention | Pig-D | 110 | A |
| Tnr-M11 | Present invention | Pig-D | 111 | A |
| Tnr-M12 | Present invention | Pig-D | 112 | A |
| Tnr-M13 | Present invention | Pig-D | 113 | A |
| Tnr-M14 | Present invention | Pig-D | 114 | A |
| Tnr-M15 | Present invention | Pig-D | 115 | A |
| Tnr-M16 | Present invention | Pig-D | 116 | A |
| Tnr-M17 | Present invention | Pig-D | 117 | A |
| Tnr-M18 | Present invention | Pig-D | 118 | A |
| Tnr-M19 | Present invention | Pig-D | 119 | A |
| Tnr-M20 | Present invention | Pig-D | 120 | A |
| Tnr-M21 | Present invention | Pig-D | 121 | A |
| Tnr-M22 | Present invention | Pig-D | 122 | A |
| Tnr-M23 | Present invention | Pig-D | 123 | A |
| Tnr-M24 | Present invention | Pig-D | 124 | A |
| Tnr-M25 | Present invention | Pig-D | 125 | A |
| Tnr-M26 | Present invention | Pig-D | 126 | A |
| Tnr-M27 | Present invention | Pig-D | 127 | A |
| Tnr-M28 | Present invention | Pig-D | 128 | A |
| Tnr-M29 | Present invention | Pig-D | 129 | A |
| Tnr-M30 | Present invention | Pig-D | 130 | A |
| Tnr-M31 | Present invention | Pig-D | 131 | A |
| Tnr-M32 | Present invention | Pig-D | 132 | A |
| Tnr-M33 | Present invention | Pig-D | 133 | A |
| Tnr-M34 | Present invention | Pig-D | 134 | A |
| Tnr-M35 | Present invention | Pig-D | 135 | A |
| Tnr-M36 | Present invention | Pig-D | 136 | A |
| Tnr-M37 | Present invention | Pig-D | 137 | A |
| Tnr-M38 | Present invention | Pig-D | 138 | A |
| Tnr-M39 | Present invention | Pig-D | 139 | A |
| Tnr-M40 | Present invention | Pig-D | 140 | A |

TABLE 4-2-continued

Evaluation Result of Toner of Present Invention Obtained by Suspension Polymerization

| Toner | | Pigment | Compound | Coloring Power |
|---|---|---|---|---|
| Tnr-M41 | Present invention | Pig-D | 140 | A |
| Tnr-M42 | Present invention | Pig-D | 140 | A |
| Tnr-M43 | Present invention | Pig-E | 101 | A |
| Tnr-M44 | Present invention | Pig-F | 101 | A |
| Tnr-M45 | Standard | Pig-D | None | |
| Tnr-M46 | Standard | Pig-E | None | |
| Tnr-M47 | Standard | Pig-F | None | |
| Tnr-M48 | Comparative Example | Pig-D | Comparative Compound (1) | C |
| Tnr-M49 | Comparative Example | Pig-D | Comparative Compound (2) | D |
| Tnr-M50 | Comparative Example | Pig-D | Comparative Compound (3) | A |
| Tnr-M51 | Comparative Example | Pig-D | Comparative Compound (4) | B |
| Tnr-M52 | Comparative Example | Pig-D | Comparative Compound (5) | D |

TABLE 4-3

Evaluation Result of Toner of Present Invention Obtained by Suspension Polymerization

| Toner | | Pigment | Compound | Coloring Power |
|---|---|---|---|---|
| Tnr-C1 | Present invention | Pig-G | 101 | A |
| Tnr-C2 | Present invention | Pig-G | 102 | A |
| Tnr-C3 | Present invention | Pig-G | 103 | A |
| Tnr-C4 | Present invention | Pig-G | 104 | A |
| Tnr-C5 | Present invention | Pig-G | 105 | A |
| Tnr-C6 | Present invention | Pig-G | 106 | A |
| Tnr-C7 | Present invention | Pig-G | 107 | A |
| Tnr-C8 | Present invention | Pig-G | 108 | A |
| Tnr-C9 | Present invention | Pig-G | 109 | A |
| Tnr-C10 | Present invention | Pig-G | 110 | A |
| Tnr-C11 | Present invention | Pig-G | 111 | A |
| Tnr-C12 | Present invention | Pig-G | 112 | A |
| Tnr-C13 | Present invention | Pig-G | 113 | A |
| Tnr-C14 | Present invention | Pig-G | 114 | A |
| Tnr-C15 | Present invention | Pig-G | 115 | A |
| Tnr-C16 | Present invention | Pig-G | 116 | A |
| Tnr-C17 | Present invention | Pig-G | 117 | A |
| Tnr-C18 | Present invention | Pig-G | 118 | A |
| Tnr-C19 | Present invention | Pig-G | 119 | A |
| Tnr-C20 | Present invention | Pig-G | 120 | A |
| Tnr-C21 | Present invention | Pig-G | 121 | A |
| Tnr-C22 | Present invention | Pig-G | 122 | A |
| Tnr-C23 | Present invention | Pig-G | 123 | A |
| Tnr-C24 | Present invention | Pig-G | 124 | A |
| Tnr-C25 | Present invention | Pig-G | 125 | A |
| Tnr-C26 | Present invention | Pig-G | 126 | A |
| Tnr-C27 | Present invention | Pig-G | 127 | A |
| Tnr-C28 | Present invention | Pig-G | 128 | A |
| Tnr-C29 | Present invention | Pig-G | 129 | A |
| Tnr-C30 | Present invention | Pig-G | 130 | A |
| Tnr-C31 | Present invention | Pig-G | 131 | A |
| Tnr-C32 | Present invention | Pig-G | 132 | A |
| Tnr-C33 | Present invention | Pig-G | 133 | A |
| Tnr-C34 | Present invention | Pig-G | 134 | A |
| Tnr-C35 | Present invention | Pig-G | 135 | A |
| Tnr-C36 | Present invention | Pig-G | 136 | A |
| Tnr-C37 | Present invention | Pig-G | 137 | A |
| Tnr-C38 | Present invention | Pig-G | 138 | A |
| Tnr-C39 | Present invention | Pig-G | 139 | A |
| Tnr-C40 | Present invention | Pig-G | 140 | A |
| Tnr-C41 | Present invention | Pig-G | 141 | A |
| Tnr-C42 | Present invention | Pig-G | 142 | A |
| Tnr-C43 | Present invention | Pig-H | 101 | A |
| Tnr-C44 | Present invention | Pig-I | 101 | A |
| Tnr-C45 | Standard | Pig-G | None | |

TABLE 4-3-continued

Evaluation Result of Toner of Present Invention Obtained by Suspension Polymerization

| Toner | Pigment | Compound | Coloring Power |
|---|---|---|---|
| Tnr-C46 | Standard | Pig-H | None | |
| Tnr-C47 | Standard | Pig-I | None | |
| Tnr-C48 | Comparative Example | Pig-G | Comparative Compound (1) | D |
| Tnr-C49 | Comparative Example | Pig-G | Comparative Compound (2) | D |
| Tnr-C50 | Comparative Example | Pig-G | Comparative Compound (3) | B |
| Tnr-C51 | Comparative Example | Pig-G | Comparative Compound (4) | D |
| Tnr-C52 | Comparative Example | Pig-G | Comparative Compound (5) | C |

TABLE 4-4

Evaluation Result of Toner of Present Invention Obtained by Suspension Polymerization

| Toner | Pigment | Compound | Coloring Power |
|---|---|---|---|
| Tnr-Bk1 | Present invention | Pig-J | 101 | A |
| Tnr-Bk2 | Present invention | Pig-J | 102 | A |
| Tnr-Bk3 | Present invention | Pig-J | 103 | A |
| Tnr-Bk4 | Present invention | Pig-J | 104 | A |
| Tnr-Bk5 | Present invention | Pig-J | 105 | A |
| Tnr-Bk6 | Present invention | Pig-J | 106 | A |
| Tnr-Bk7 | Present invention | Pig-J | 107 | A |
| Tnr-Bk8 | Present invention | Pig-J | 108 | A |
| Tnr-Bk9 | Present invention | Pig-J | 109 | A |
| Tnr-Bk10 | Present invention | Pig-J | 110 | A |
| Tnr-Bk11 | Present invention | Pig-J | 111 | A |
| Tnr-Bk12 | Present invention | Pig-J | 112 | A |
| Tnr-Bk13 | Present invention | Pig-J | 113 | A |
| Tnr-Bk14 | Present invention | Pig-J | 114 | A |
| Tnr-Bk15 | Present invention | Pig-J | 115 | A |
| Tnr-Bk16 | Present invention | Pig-J | 116 | A |
| Tnr-Bk17 | Present invention | Pig-J | 117 | A |
| Tnr-Bk18 | Present invention | Pig-J | 118 | A |
| Tnr-Bk19 | Present invention | Pig-J | 119 | A |
| Tnr-Bk20 | Present invention | Pig-J | 120 | A |
| Tnr-Bk21 | Present invention | Pig-J | 121 | A |
| Tnr-Bk22 | Present invention | Pig-J | 122 | A |
| Tnr-Bk23 | Present invention | Pig-J | 123 | A |
| Tnr-Bk24 | Present invention | Pig-J | 124 | A |
| Tnr-Bk25 | Present invention | Pig-J | 125 | A |
| Tnr-Bk26 | Present invention | Pig-J | 126 | A |
| Tnr-Bk27 | Present invention | Pig-J | 127 | A |
| Tnr-Bk28 | Present invention | Pig-J | 128 | A |
| Tnr-Bk29 | Present invention | Pig-J | 129 | A |
| Tnr-Bk30 | Present invention | Pig-J | 130 | A |
| Tnr-Bk31 | Present invention | Pig-J | 131 | A |
| Tnr-Bk32 | Present invention | Pig-J | 132 | A |
| Tnr-Bk33 | Present invention | Pig-J | 133 | A |
| Tnr-Bk34 | Present invention | Pig-J | 134 | A |
| Tnr-Bk35 | Present invention | Pig-J | 135 | A |
| Tnr-Bk36 | Present invention | Pig-J | 136 | A |
| Tnr-Bk37 | Present invention | Pig-J | 137 | A |
| Tnr-Bk38 | Present invention | Pig-J | 138 | A |
| Tnr-Bk39 | Present invention | Pig-J | 139 | A |
| Tnr-Bk40 | Present invention | Pig-J | 140 | A |
| Tnr-Bk41 | Present invention | Pig-J | 141 | A |
| Tnr-Bk42 | Present invention | Pig-J | 142 | A |
| Tnr-Bk43 | Present invention | Pig-K | 101 | A |
| Tnr-Bk44 | Present invention | Pig-L | 101 | A |
| Tnr-Bk45 | Standard | Pig-J | None | |
| Tnr-Bk46 | Standard | Pig-K | None | |
| Tnr-Bk47 | Standard | Pig-L | None | |
| Tnr-Bk48 | Comparative Example | Pig-J | Comparative Compound (1) | D |
| Tnr-Bk49 | Comparative Example | Pig-J | Comparative Compound (2) | D |
| Tnr-Bk50 | Comparative Example | Pig-J | Comparative Compound (3) | A |
| Tnr-Bk51 | Comparative Example | Pig-J | Comparative Compound (4) | D |
| Tnr-Bk52 | Comparative Example | Pig-J | Comparative Compound (5) | D |

TABLE 5-1

Evaluation Result of Toner of Present Invention Obtained by Suspension Granulation

| Toner | Pigment | Compound | Coloring Power |
|---|---|---|---|
| Tnr-Y101 | Present invention | Pig-A | 101 | A |
| Tnr-Y102 | Present invention | Pig-A | 102 | A |
| Tnr-Y103 | Present invention | Pig-A | 103 | A |
| Tnr-Y104 | Present invention | Pig-A | 104 | A |
| Tnr-Y105 | Present invention | Pig-A | 105 | A |
| Tnr-Y106 | Present invention | Pig-A | 106 | A |
| Tnr-Y107 | Present invention | Pig-A | 107 | A |
| Tnr-Y108 | Present invention | Pig-A | 108 | A |
| Tnr-Y109 | Present invention | Pig-A | 109 | A |
| Tnr-Y110 | Present invention | Pig-A | 110 | A |
| Tnr-Y111 | Present invention | Pig-A | 111 | A |
| Tnr-Y112 | Present invention | Pig-A | 112 | A |
| Tnr-Y113 | Present invention | Pig-A | 113 | A |
| Tnr-Y114 | Present invention | Pig-A | 114 | A |
| Tnr-Y115 | Present invention | Pig-A | 115 | A |
| Tnr-Y116 | Present invention | Pig-A | 116 | A |
| Tnr-Y117 | Present invention | Pig-A | 117 | A |
| Tnr-Y118 | Present invention | Pig-A | 118 | A |
| Tnr-Y119 | Present invention | Pig-A | 119 | A |
| Tnr-Y120 | Present invention | Pig-A | 120 | A |
| Tnr-Y121 | Present invention | Pig-A | 121 | A |
| Tnr-Y122 | Present invention | Pig-A | 122 | A |
| Tnr-Y123 | Present invention | Pig-A | 123 | A |
| Tnr-Y124 | Present invention | Pig-A | 124 | A |
| Tnr-Y125 | Present invention | Pig-A | 125 | A |
| Tnr-Y126 | Present invention | Pig-A | 126 | A |
| Tnr-Y127 | Present invention | Pig-A | 127 | A |
| Tnr-Y128 | Present invention | Pig-A | 128 | A |
| Tnr-Y129 | Present invention | Pig-A | 129 | A |
| Tnr-Y130 | Present invention | Pig-A | 130 | A |
| Tnr-Y131 | Present invention | Pig-A | 131 | A |
| Tnr-Y132 | Present invention | Pig-A | 132 | A |
| Tnr-Y133 | Present invention | Pig-A | 133 | A |
| Tnr-Y134 | Present invention | Pig-A | 134 | A |
| Tnr-Y135 | Present invention | Pig-A | 135 | A |
| Tnr-Y136 | Present invention | Pig-A | 136 | A |
| Tnr-Y137 | Present invention | Pig-A | 137 | A |
| Tnr-Y138 | Present invention | Pig-A | 138 | A |
| Tnr-Y139 | Present invention | Pig-A | 139 | A |
| Tnr-Y140 | Present invention | Pig-A | 140 | A |
| Tnr-Y141 | Present invention | Pig-A | 141 | A |
| Tnr-Y142 | Present invention | Pig-A | 142 | A |
| Tnr-Y143 | Present invention | Pig-B | 101 | A |
| Tnr-Y144 | Present invention | Pig-C | 101 | A |
| Tnr-Y145 | Standard | Pig-A | None | |
| Tnr-Y146 | Standard | Pig-B | None | |
| Tnr-Y147 | Standard | Pig-C | None | |
| Tnr-Y148 | Comparative Example | Pig-A | Comparative Compound (1) | B |
| Tnr-Y149 | Comparative Example | Pig-A | Comparative Compound (2) | D |
| Tnr-Y150 | Comparative Example | Pig-A | Comparative Compound (3) | B |

TABLE 5-1-continued

Evaluation Result of Toner of Present Invention Obtained by Suspension Granulation

| Toner | | Pigment | Compound | Coloring Power |
|---|---|---|---|---|
| Tnr-Y151 | Comparative Example | Pig-A | Comparative Compound (4) | D |
| Tnr-Y152 | Comparative Example | Pig-A | Comparative Compound (5) | D |

TABLE 5-2

Evaluation Result of Toner of Present Invention Obtained by Suspension Granulation

| Toner | | Pigment | Compound | Coloring Power |
|---|---|---|---|---|
| Tnr-M101 | Present invention | Pig-D | 101 | A |
| Tnr-M102 | Present invention | Pig-D | 102 | A |
| Tnr-M103 | Present invention | Pig-D | 103 | A |
| Tnr-M104 | Present invention | Pig-D | 104 | A |
| Tnr-M105 | Present invention | Pig-D | 105 | A |
| Tnr-M106 | Present invention | Pig-D | 106 | A |
| Tnr-M107 | Present invention | Pig-D | 107 | A |
| Tnr-M108 | Present invention | Pig-D | 108 | A |
| Tnr-M109 | Present invention | Pig-D | 109 | A |
| Tnr-M110 | Present invention | Pig-D | 110 | A |
| Tnr-M111 | Present invention | Pig-D | 111 | A |
| Tnr-M112 | Present invention | Pig-D | 112 | A |
| Tnr-M113 | Present invention | Pig-D | 113 | A |
| Tnr-M114 | Present invention | Pig-D | 114 | A |
| Tnr-M115 | Present invention | Pig-D | 115 | A |
| Tnr-M116 | Present invention | Pig-D | 116 | A |
| Tnr-M117 | Present invention | Pig-D | 117 | A |
| Tnr-M118 | Present invention | Pig-D | 118 | A |
| Tnr-M119 | Present invention | Pig-D | 119 | A |
| Tnr-M120 | Present invention | Pig-D | 120 | A |
| Tnr-M121 | Present invention | Pig-D | 121 | A |
| Tnr-M122 | Present invention | Pig-D | 122 | A |
| Tnr-M123 | Present invention | Pig-D | 123 | A |
| Tnr-M124 | Present invention | Pig-D | 124 | A |
| Tnr-M125 | Present invention | Pig-D | 125 | A |
| Tnr-M126 | Present invention | Pig-D | 126 | A |
| Tnr-M127 | Present invention | Pig-D | 127 | A |
| Tnr-M128 | Present invention | Pig-D | 128 | A |
| Tnr-M129 | Present invention | Pig-D | 129 | A |
| Tnr-M130 | Present invention | Pig-D | 130 | A |
| Tnr-M131 | Present invention | Pig-D | 131 | A |
| Tnr-M132 | Present invention | Pig-D | 132 | A |
| Tnr-M133 | Present invention | Pig-D | 133 | A |
| Tnr-M134 | Present invention | Pig-D | 134 | A |
| Tnr-M135 | Present invention | Pig-D | 135 | A |
| Tnr-M136 | Present invention | Pig-D | 136 | A |
| Tnr-M137 | Present invention | Pig-D | 137 | A |
| Tnr-M138 | Present invention | Pig-D | 138 | A |
| Tnr-M139 | Present invention | Pig-D | 139 | A |
| Tnr-M140 | Present invention | Pig-D | 140 | A |
| Tnr-M141 | Present invention | Pig-D | 141 | A |
| Tnr-M142 | Present invention | Pig-D | 142 | A |
| Tnr-M143 | Present invention | Pig-E | 101 | A |
| Tnr-M144 | Present invention | Pig-F | 101 | A |
| Tnr-M145 | Standard | Pig-D | None | |
| Tnr-M146 | Standard | Pig-E | None | |
| Tnr-M147 | Standard | Pig-F | None | |
| Tnr-M148 | Comparative Example | Pig-D | Comparative Compound (1) | C |
| Tnr-M149 | Comparative Example | Pig-D | Comparative Compound (2) | D |
| Tnr-M150 | Comparative Example | Pig-D | Comparative Compound (3) | A |
| Tnr-M151 | Comparative Example | Pig-D | Comparative Compound (4) | B |
| Tnr-M152 | Comparative Example | Pig-D | Comparative Compound (5) | D |

TABLE 5-3

Evaluation Result of Toner of Present Invention Obtained by Suspension Granulation

| Toner | | Pigment | Compound | Coloring Power |
|---|---|---|---|---|
| Tnr-C101 | Present invention | Pig-G | 101 | A |
| Tnr-C102 | Present invention | Pig-G | 102 | A |
| Tnr-C103 | Present invention | Pig-G | 103 | A |
| Tnr-C104 | Present invention | Pig-G | 104 | A |
| Tnr-C105 | Present invention | Pig-G | 105 | A |
| Tnr-C106 | Present invention | Pig-G | 106 | A |
| Tnr-C107 | Present invention | Pig-G | 107 | A |
| Tnr-C108 | Present invention | Pig-G | 108 | A |
| Tnr-C109 | Present invention | Pig-G | 109 | A |
| Tnr-C110 | Present invention | Pig-G | 110 | A |
| Tnr-C111 | Present invention | Pig-G | 111 | A |
| Tnr-C112 | Present invention | Pig-G | 112 | A |
| Tnr-C113 | Present invention | Pig-G | 113 | A |
| Tnr-C114 | Present invention | Pig-G | 114 | A |
| Tnr-C115 | Present invention | Pig-G | 115 | A |
| Tnr-C116 | Present invention | Pig-G | 116 | A |
| Tnr-C117 | Present invention | Pig-G | 117 | A |
| Tnr-C118 | Present invention | Pig-G | 118 | A |
| Tnr-C119 | Present invention | Pig-G | 119 | A |
| Tnr-C120 | Present invention | Pig-G | 120 | A |
| Tnr-C121 | Present invention | Pig-G | 121 | A |
| Tnr-C122 | Present invention | Pig-G | 122 | A |
| Tnr-C123 | Present invention | Pig-G | 123 | A |
| Tnr-C124 | Present invention | Pig-G | 124 | A |
| Tnr-C125 | Present invention | Pig-G | 125 | A |
| Tnr-C126 | Present invention | Pig-G | 126 | A |
| Tnr-C127 | Present invention | Pig-G | 127 | A |
| Tnr-C128 | Present invention | Pig-G | 128 | A |
| Tnr-C129 | Present invention | Pig-G | 129 | A |
| Tnr-C130 | Present invention | Pig-G | 130 | A |
| Tnr-C131 | Present invention | Pig-G | 131 | A |
| Tnr-C132 | Present invention | Pig-G | 132 | A |
| Tnr-C133 | Present invention | Pig-G | 133 | A |
| Tnr-C134 | Present invention | Pig-G | 134 | A |
| Tnr-C135 | Present invention | Pig-G | 135 | A |
| Tnr-C136 | Present invention | Pig-G | 136 | A |
| Tnr-C137 | Present invention | Pig-G | 137 | A |
| Tnr-C138 | Present invention | Pig-G | 138 | A |
| Tnr-C139 | Present invention | Pig-G | 139 | A |
| Tnr-C140 | Present invention | Pig-G | 140 | A |
| Tnr-C141 | Present invention | Pig-G | 141 | A |
| Tnr-C142 | Present invention | Pig-G | 142 | A |
| Tnr-C143 | Present invention | Pig-H | 101 | A |
| Tnr-C144 | Present invention | Pig-I | 101 | A |
| Tnr-C145 | Standard | Pig-G | None | |
| Tnr-C146 | Standard | Pig-H | None | |
| Tnr-C147 | Standard | Pig-I | None | |
| Tnr-C148 | Comparative Example | Pig-G | Comparative Compound (1) | D |
| Tnr-C149 | Comparative Example | Pig-G | Comparative Compound (2) | D |
| Tnr-C150 | Comparative Example | Pig-G | Comparative Compound (3) | B |
| Tnr-C151 | Comparative Example | Pig-G | Comparative Compound (4) | D |
| Tnr-C152 | Comparative Example | Pig-G | Comparative Compound (5) | B |

TABLE 5-4

Evaluation Result of Toner of Present Invention Obtained by Suspension Granulation

| Toner | | Pigment | Compound | Coloring Power |
|---|---|---|---|---|
| Tnr-Bk101 | Present invention | Pig-J | 101 | A |
| Tnr-Bk102 | Present invention | Pig-J | 102 | A |
| Tnr-Bk103 | Present invention | Pig-J | 103 | A |
| Tnr-Bk104 | Present invention | Pig-J | 104 | A |
| Tnr-Bk105 | Present invention | Pig-J | 105 | A |

TABLE 5-4-continued

Evaluation Result of Toner of Present Invention Obtained by Suspension Granulation

| Toner | Pigment | Compound | Coloring Power |
|---|---|---|---|
| Tnr-Bk106 | Present invention | Pig-J | 106 | A |
| Tnr-Bk107 | Present invention | Pig-J | 107 | A |
| Tnr-Bk108 | Present invention | Pig-J | 108 | A |
| Tnr-Bk109 | Present invention | Pig-J | 109 | A |
| Tnr-Bk110 | Present invention | Pig-J | 110 | A |
| Tnr-Bk111 | Present invention | Pig-J | 111 | A |
| Tnr-Bk112 | Present invention | Pig-J | 112 | A |
| Tnr-Bk113 | Present invention | Pig-J | 113 | A |
| Tnr-Bk114 | Present invention | Pig-J | 114 | A |
| Tnr-Bk115 | Present invention | Pig-J | 115 | A |
| Tnr-Bk116 | Present invention | Pig-J | 116 | A |
| Tnr-Bk117 | Present invention | Pig-J | 117 | A |
| Tnr-Bk118 | Present invention | Pig-J | 118 | A |
| Tnr-Bk119 | Present invention | Pig-J | 119 | A |
| Tnr-Bk120 | Present invention | Pig-J | 120 | A |
| Tnr-Bk121 | Present invention | Pig-J | 121 | A |
| Tnr-Bk122 | Present invention | Pig-J | 122 | A |
| Tnr-Bk123 | Present invention | Pig-J | 123 | A |
| Tnr-Bk124 | Present invention | Pig-J | 124 | A |
| Tnr-Bk125 | Present invention | Pig-J | 125 | A |
| Tnr-Bk126 | Present invention | Pig-J | 126 | A |
| Tnr-Bk127 | Present invention | Pig-J | 127 | A |
| Tnr-Bk128 | Present invention | Pig-J | 128 | A |
| Tnr-Bk129 | Present invention | Pig-J | 129 | A |
| Tnr-Bk130 | Present invention | Pig-J | 130 | A |
| Tnr-Bk131 | Present invention | Pig-J | 131 | A |
| Tnr-Bk132 | Present invention | Pig-J | 132 | A |
| Tnr-Bk133 | Present invention | Pig-J | 133 | A |
| Tnr-Bk134 | Present invention | Pig-J | 134 | A |
| Tnr-Bk135 | Present invention | Pig-J | 135 | A |
| Tnr-Bk136 | Present invention | Pig-J | 136 | A |
| Tnr-Bk137 | Present invention | Pig-J | 137 | A |
| Tnr-Bk138 | Present invention | Pig-J | 138 | A |
| Tnr-Bk139 | Present invention | Pig-J | 139 | A |
| Tnr-Bk140 | Present invention | Pig-J | 140 | A |
| Tnr-Bk141 | Present invention | Pig-J | 141 | A |
| Tnr-Bk142 | Present invention | Pig-J | 142 | A |
| Tnr-Bk143 | Present invention | Pig-K | 101 | A |
| Tnr-Bk144 | Present invention | Pig-L | 101 | A |
| Tnr-Bk145 | Standard | Pig-J | None | |
| Tnr-Bk146 | Standard | Pig-K | None | |
| Tnr-Bk147 | Standard | Pig-L | None | |
| Tnr-Bk148 | Comparative | Pig-J | Comparative Compound (1) | D |
| Tnr-Bk149 | Comparative | Pig-J | Comparative Compound (2) | D |
| Tnr-Bk150 | Comparative | Pig-J | Comparative Compound (3) | A |
| Tnr-Bk151 | Comparative | Pig-J | Comparative Compound (4) | D |
| Tnr-Bk152 | Comparative | Pig-J | Comparative Compound (5) | D |

As apparent from Tables 3-1 to 3-4, it was confirmed that when the compound having an azo skeleton structure of the present invention was used, a pigment composition and a pigment dispersion, each having preferable pigment dispersibility, could be obtained.

In addition, as apparent from Tables 4-1 to 4-4 and Tables 5-1 to 5-4, when the compound having an azo skeleton structure of the present invention was used, the dispersibility of the pigment in the binder resin could be improved. Accordingly, it was confirmed that a yellow toner, a magenta toner, a cyan toner, and a black toner, each having a high coloring power, could be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-178556, filed Aug. 29, 2013, which is hereby incorporated by reference herein in its entirety.

The invention claimed is:

1. A compound comprising a polymer having a repeating unit represented by the formula (2), the polymer further having a partial structure represented by the following formula (1), and the partial structure being bonded with a linking group;

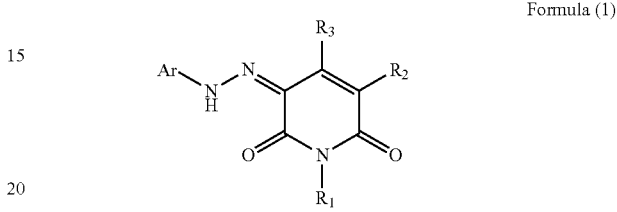

Formula (1)

in the formula (1),

Ar represents an aryl group,

Ar and $R_1$ to $R_3$ satisfy at least one of the following conditions (i) and (ii):

(i) Ar has the linking group which is bonded to a carbon atom in the aryl group and is constituting a bonding moiety with the polymer; and (ii) at least one of $R_1$ to $R_3$ is the linking group which is constituting a bonding moiety with the polymer, when $R_1$ has not the linking group, $R_1$ represents a hydrogen atom, an amino group, an alkyl group, a phenyl group, or an aralkyl group, when $R_2$ has not the linking group, $R_2$ represents a hydrogen atom, a sulfonic acid group, a $CONR_4R_5$ group, or a $COOR_6$ group, when $R_3$ has not the linking group, $R_3$ represents an alkyl group, a phenyl group, a hydroxyl group, a $NR_7R_8$ group, a $CONR_9R_{10}$ group, a $COOR_{11}$ group, a $CH_2COOR_{12}$ group, or a $C_2H_4COOR_{13}$ group, $R_4$, $R_5$, and $R_7$ to $R_{10}$ each independently represent a hydrogen atom, an alkyl group, a phenyl group, or an aralkyl group, and $R_6$ and $R_{11}$ to $R_{13}$ each independently represent a hydrogen atom, an alkyl group, a phenyl group, an aralkyl group, or a cation forming a salt with a carboxylic acid anion;

$$\mathrm{-(CH_2-}\underset{\underset{R_{15}}{|}}{\overset{\overset{R_{14}}{|}}{C}})\mathrm{-}$$

Formula (2)

in the formula (2), $R_{14}$ represents a hydrogen atom or an alkyl group, and $R_{15}$ represents a phenyl group, a carboxyl group, a carboxylic acid ester group, or a carboxylic acid amide group.

2. The compound according to claim 1, wherein the partial structure is the structure represented by the following formula (3):

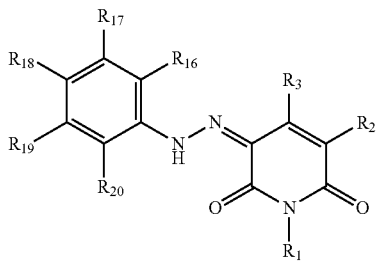

Formula (3)

[in the forumula (3),

R$_1$ to R$_3$ and R$_{16}$ to R$_{20}$ satisfy at least one of the following conditions (iii) and (iv):

(iii) at least one of R$_{16}$ to R$_{20}$ has a linking group constituting a bonding moiety with the polymer; and (iv) at least one of R$_1$ to R$_3$ has a linking group constituting a bonding moiety with to the polymer, when R$_1$ has not the linking group, R$_1$ represents a hydrogen atom, an amino group, an alkyl group, a phenyl group, or an aralkyl group, when R$_2$ has not the linking group, R$_2$ represents a hydrogen atom, a sulfonic acid group, a CONR$_4$R$_5$ group, or a COOR$_6$ group, when R$_3$ has not the linking group, R$_3$ represents an alkyl group, a phenyl group, a hydroxyl group, a NR$_7$R$_8$ group, a CONR$_9$R$_{10}$ group, a COOR$_{11}$ group, a CH$_2$COOR$_{12}$ group, or a C$_2$H$_4$COOR$_{13}$ group, R$_4$, R$_5$, and R$_7$ to R$_{10}$ each independently represent a hydrogen atom, an alkyl group, a phenyl group, or an aralkyl group, R$_6$ and R$_{11}$ to R$_{13}$ each independently represent a hydrogen atom, an alkyl group, a phenyl group, an aralkyl group, or a cation which forms a salt with a carboxylic acid anion, when R$_{16}$ to R$_{20}$ each has not the linking froup, R$_{16}$ to R$_{20}$ each independently represent a hydrogen atom, an alkyl group, a COOR$_{21}$ group, an OR$_{22}$ group, or a CONR$_{23}$R$_{24}$ group, and R$_{21}$ to R$_{24}$ each independently represent a hydrogen atom, an alkyl group, a phenyl group, or an aralkyl group].

3. The compound according to claim 1, wherein Ar in the formula (1) has the linking group.

4. The compound according to claim 1, wherein the linking group includes a carboxylic acid ester bond or a carboxylic acid amide bond.

5. The compound according to claim 1, wherein R$_3$ in the formula (1) represents an alkyl group, a NR$_{78}$ group, or a COOR$_{11}$ group.

6. The compound according to claim 1, wherein R$_2$ in the formula (1) represents a sulfonic acid group or a CONR$_4$R$_5$ group.

7. The compound according to claim 1, wherein R$_1$ in the formula (1) represents a hydrogen atom.

8. The compound according to claim 1, wherein the number of the partial structures in the compound is 0.5 to 10 with respect to 100 monomer units which form the polymer.

9. A pigment dispersant comprising: the compound according to claim 1.

10. A pigment composition comprising: the compound according to claim 1; and a pigment.

11. A pigment dispersion comprising: the pigment composition according to claim 10; and a non-aqueous solvent.

12. The pigment dispersion according to claim 11, wherein the non-aqueous solvent includes styrene.

13. A toner comprising: toner particles which contain a binder resin and a colorant, wherein the colorant includes the pigment composition according to claim 10.

14. The toner according to claim 13, wherein the toner particles are manufactured by a suspension polymerization method or a suspension granulation method.

* * * * *